United States Patent
Ohzawa

[19]

[11] Patent Number: 6,123,425
[45] Date of Patent: Sep. 26, 2000

[54] PROJECTING OPTICAL SYSTEM

[75] Inventor: Soh Ohzawa, Toyonaka, Japan

[73] Assignee: Minolta Co., Ltd., Osaka, Japan

[21] Appl. No.: 08/847,894

[22] Filed: Apr. 28, 1997

[30] Foreign Application Priority Data

| Apr. 26, 1996 | [JP] | Japan | 8-107936 |
| May 22, 1996 | [JP] | Japan | 8-126974 |
| May 14, 1996 | [JP] | Japan | 8-118765 |
| May 15, 1996 | [JP] | Japan | 8-120104 |

[51] Int. Cl.[7] .................................................. G03B 21/14
[52] U.S. Cl. ............................ 353/69; 353/101; 359/433
[58] Field of Search ............................... 353/69, 70, 101; 359/433, 432, 740

[56] References Cited

U.S. PATENT DOCUMENTS

| 2,354,614 | 7/1944 | Reason | 353/70 |
| 3,963,337 | 6/1976 | Lundberg | 353/70 |
| 5,032,022 | 7/1991 | Sato et al. | 353/70 |
| 5,096,288 | 3/1992 | Yano et al. | 353/69 |
| 5,220,363 | 6/1993 | Sato et al. | 353/70 |
| 5,302,983 | 4/1994 | Sato et al. | 353/70 |
| 5,422,691 | 6/1995 | Ninomiya et al. | 353/70 |
| 5,442,413 | 8/1995 | Tejima et al. | 353/70 |
| 5,479,224 | 12/1995 | Yasugaki et al. | 353/69 |
| 5,587,836 | 12/1996 | Takahashi et al. | 359/630 |
| 5,709,445 | 1/1998 | Takamoto | 353/70 |
| 5,716,118 | 2/1998 | Sato et al. | 353/69 |
| 5,820,240 | 10/1998 | Ohzawa | 353/70 |

FOREIGN PATENT DOCUMENTS

| 5-100312 | 4/1993 | Japan . |
| 5-113600 | 5/1993 | Japan . |
| 5-119283 | 5/1993 | Japan . |
| 5-119395 | 5/1993 | Japan . |
| 6-324285 | 11/1994 | Japan . |

*Primary Examiner*—William Dowling
*Attorney, Agent, or Firm*—Sidley & Austin

[57] ABSTRACT

A projecting optical system projects an image formed on a primary image plane obliquely onto a secondary image plane. The projecting optical system has a plurality of partial optical systems decentered from each other. The projecting optical system also has a plurality of zoom optical systems. The zoom optical systems are moved to continuously vary an image magnification. During the movement, the secondary image plane is kept in a fixed position.

19 Claims, 48 Drawing Sheets

Y=-18.811, Z=18.8852

Y=-18.8703, Z=0

Y=-18.811, Z=-18.8852

Y=-0.0675682, Z=19.0168

Y=-0.0147562, Z=0

Y=-0.0675682, Z=-19.0168

Y=18.7304, Z=18.9997

Y=18.8546, Z=-3.31551e-19

Y=18.7304, Z=-18.9997

Y=-18.758, Z=18.813

Y=-18.8402, Z=5.68374e-19

Y=-18.758, Z=-18.813

Y=-0.0835606, Z=18.9857

Y=-0.0226619, Z=-9.40867e-19

Y=-0.0835606, Z=-18.9857

Y=18.7677, Z=19.0404

Y=18.8474, Z=8.05196e-19

Y=18.7677, Z=-19.0404

Y=-18.0356, Z=18.6602

Y=-18.3067, Z=-7.57831e-19

Y=-18.0356, Z=-18.6602

Y=-0.12904, Z=18.8576

Y=-0.0364331, Z=3.76347e-19

Y=-0.12904, Z=-18.8576

Y=18.153, Z=18.9953

Y=18.0211, Z=0

Y=18.153, Z=-18.9953

2.5mm

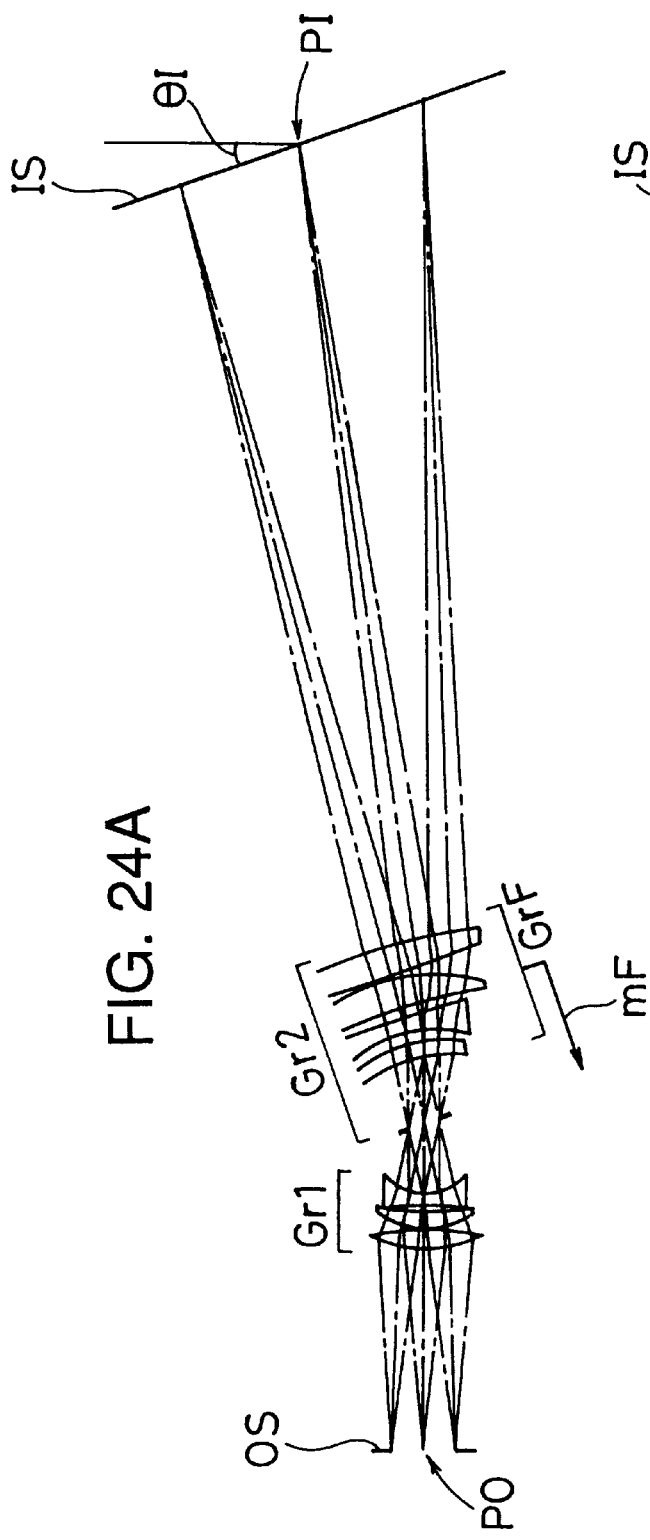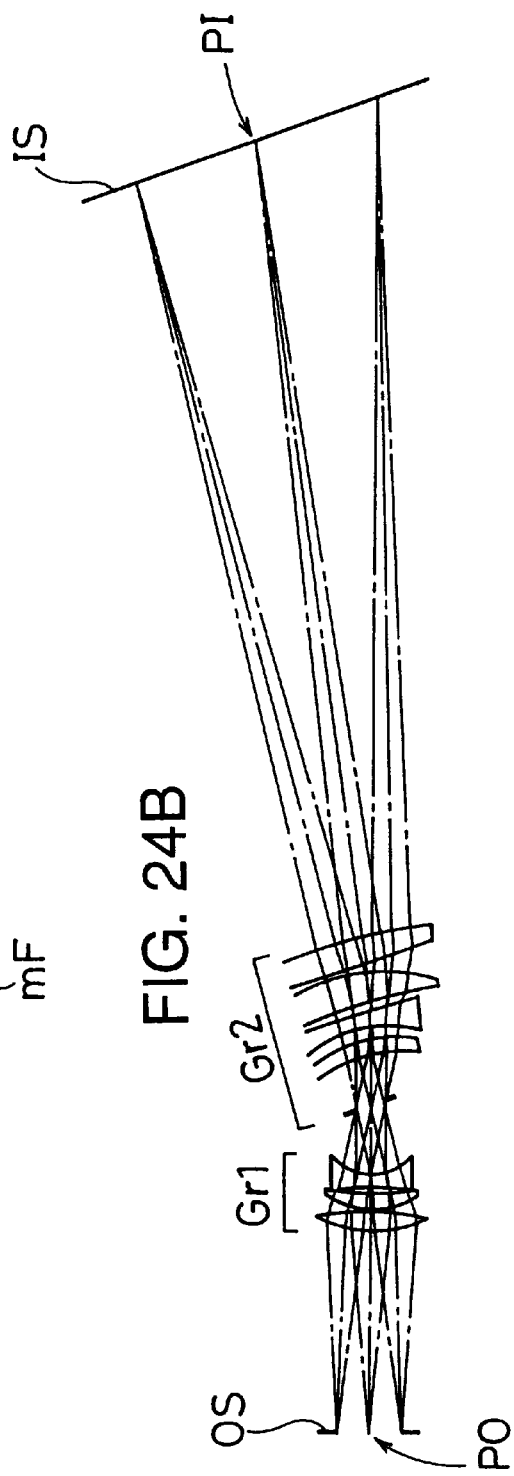

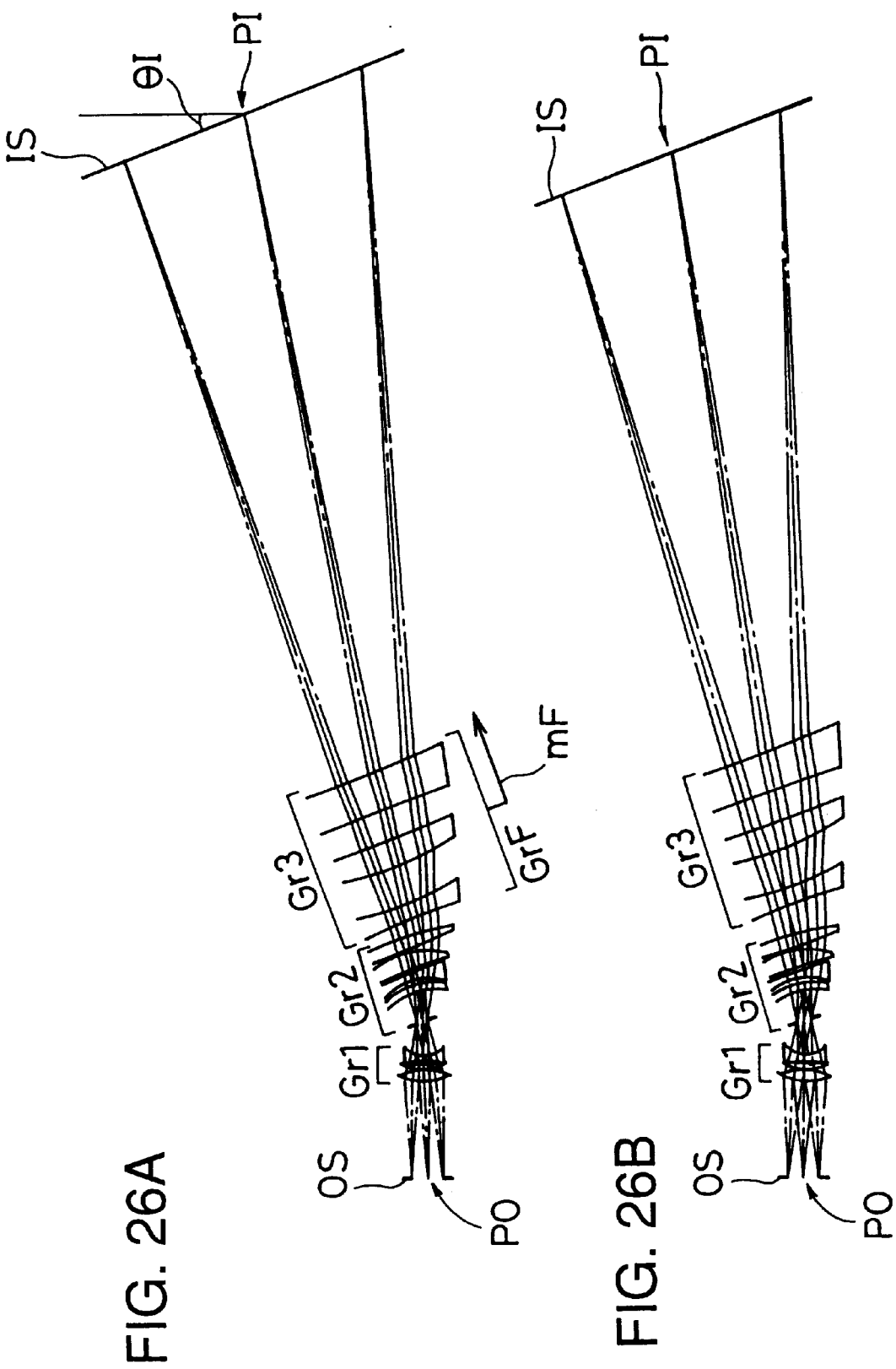

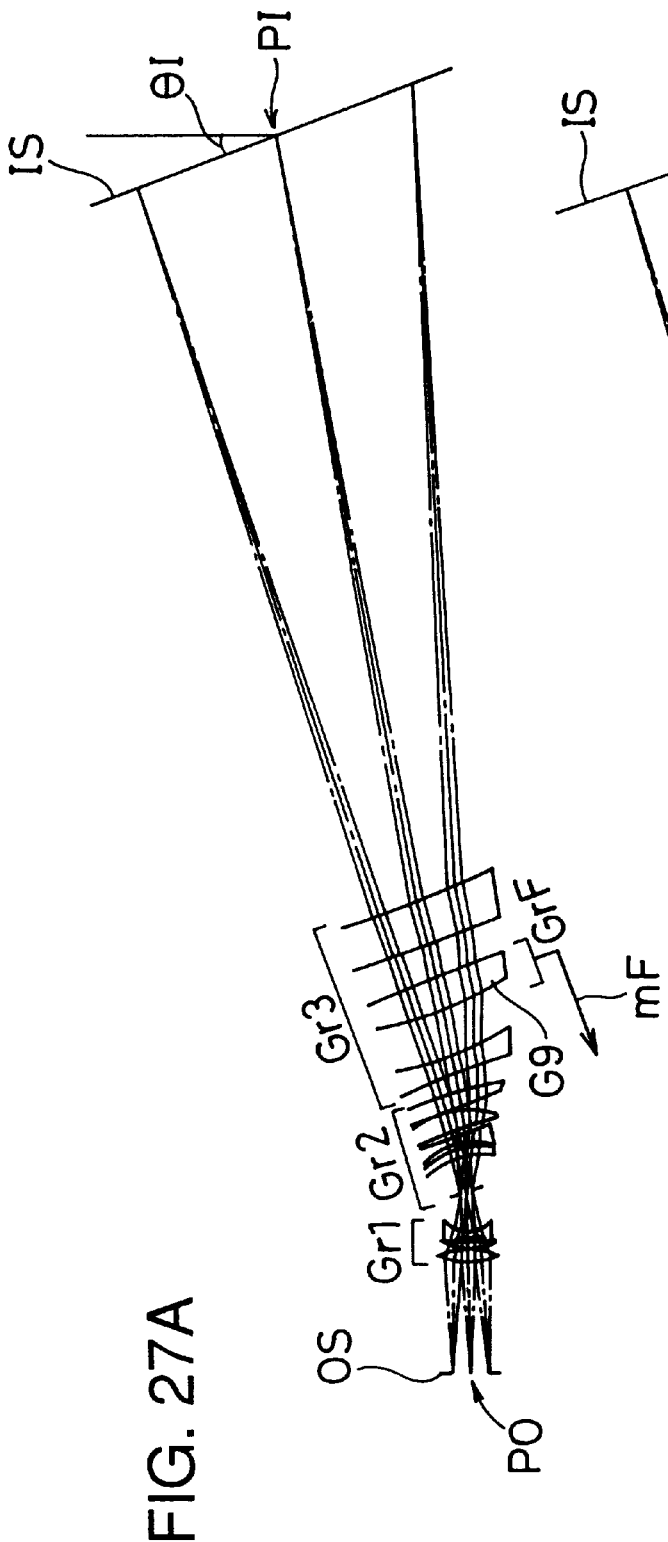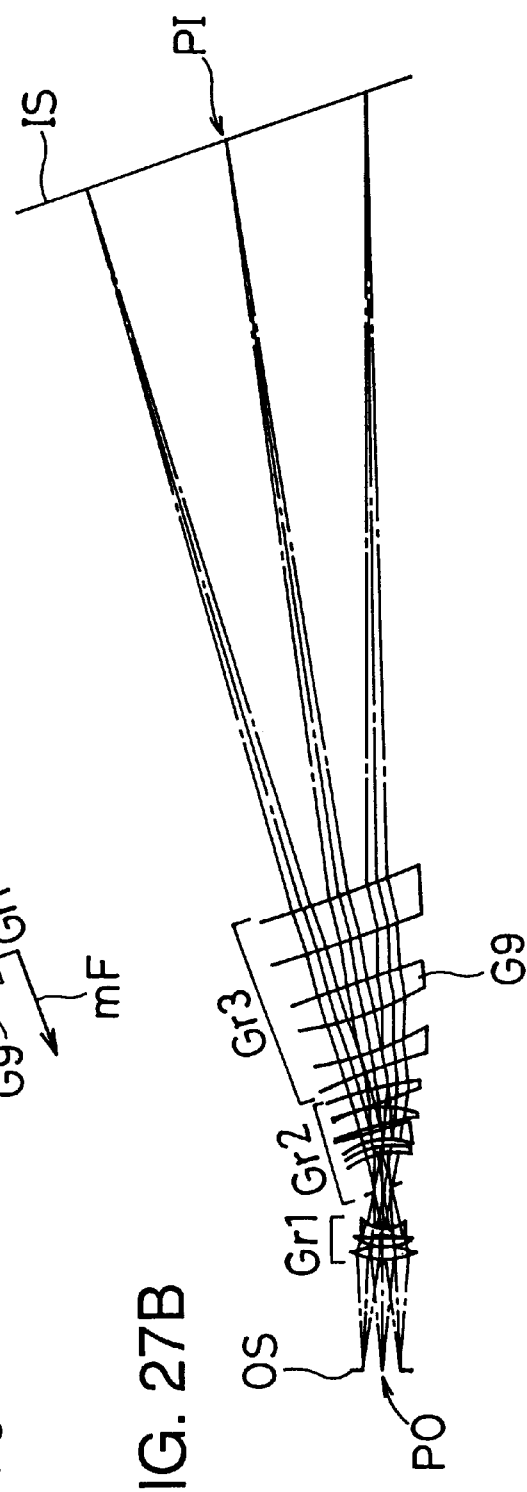

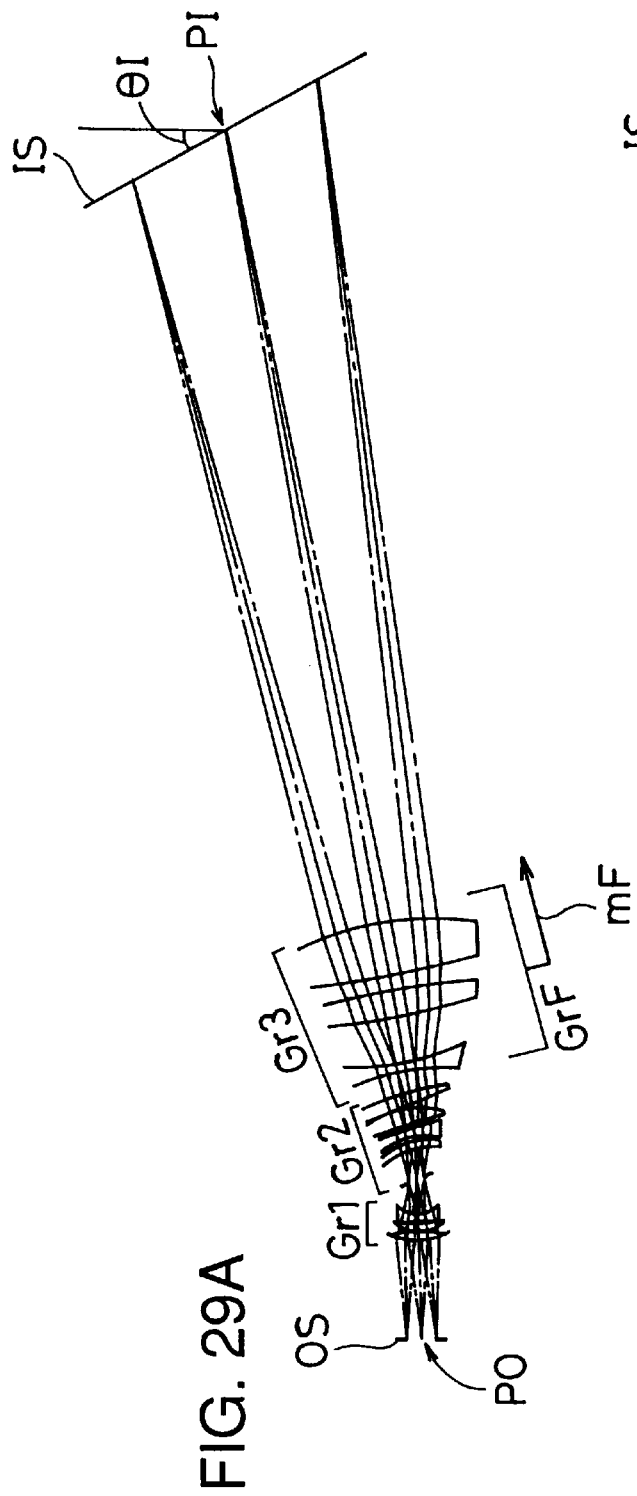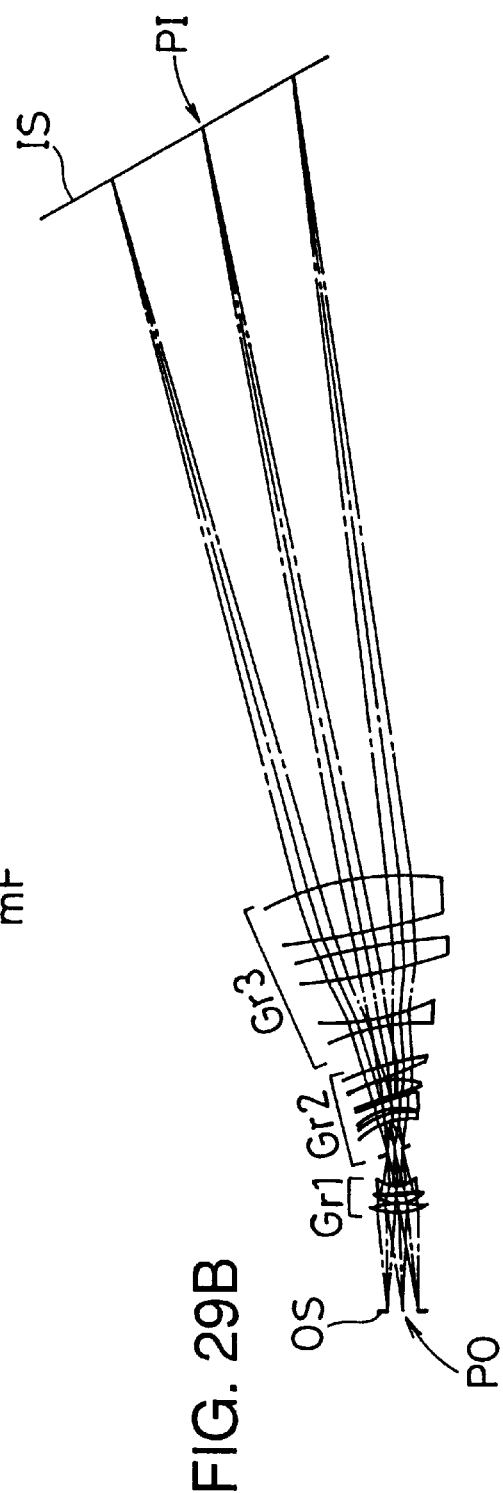

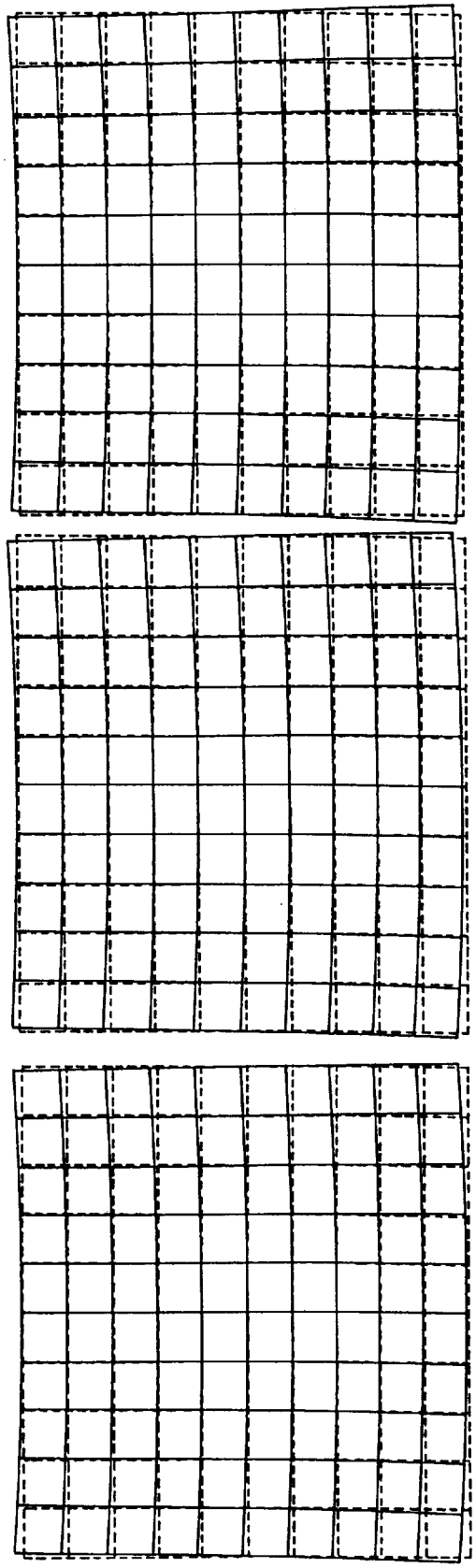

Y=-111.994, Z=-1.37065e-18

Y=-112.646, Z=-113.945

Y=0.0626549, Z=4.79726e-18

Y=0.610793, Z=-113.705

Y=114.778, Z=-6.68809e-19

Y=116.252, Z=-115.489

Y=-81.5104, Z=-1.37065e-18

Y=-81.7083, Z=-82.5323

Y=0.0523199, Z=0

Y=0.287506, Z=-82.1711

Y=82.0034, Z=6.68809e-19

Y=82.4469, Z=-82.4079

Y=-59.2226, Z=1.37065e-18

Y=-59.215, Z=-59.7606

Y=0.0501395, Z=-2.05597e-18

Y=0.143835, Z=-59.3978

Y=58.8284, Z=0

Y=58.8691, Z=-59.0531

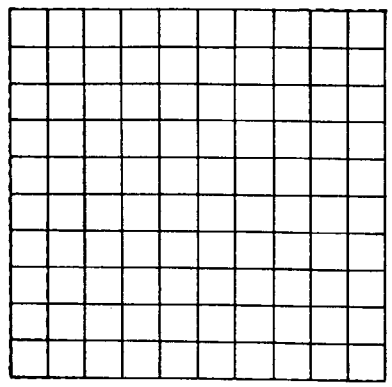
FIG. 41C
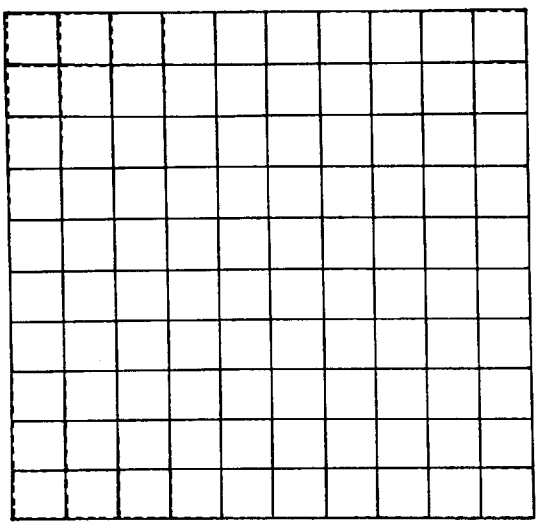
FIG. 41B
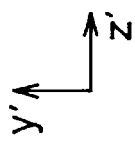
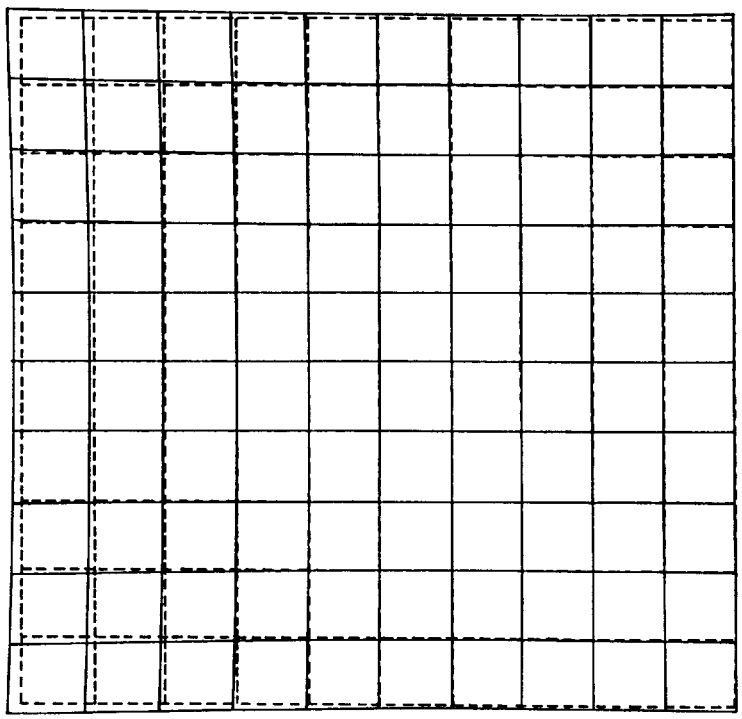
FIG. 41A

Y=-46.9648, Z=1.71331e-18

Y=-46.9644, Z=-46.874

Y=-0.0217648, Z=-6.85323e-19

Y=0.0254485, Z=-46.9642

Y=47.3166, Z=4.4546e-18

Y=47.4305, Z=-47.1715

Y=-34.156, Z=-2.74129e-18

Y=-34.1649, Z=-34.1018

Y=-0.0297286, Z=-2.05597e-18

Y=-0.0218959, Z=-34.1376

Y=34.2296, Z=0

Y=34.2595, Z=-34.2145

Y=-24.8217, Z=-6.85323e-19

Y=-24.8308, Z=-24.7915

Y=-0.0230468, Z=-1.37065e-18

Y=-0.0325356, Z=-24.7999

Y=24.7882, Z=0

Y=24.7858, Z=-24.8176

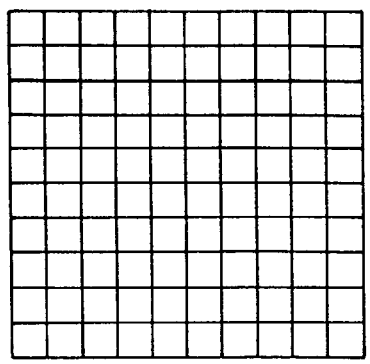
FIG. 47C
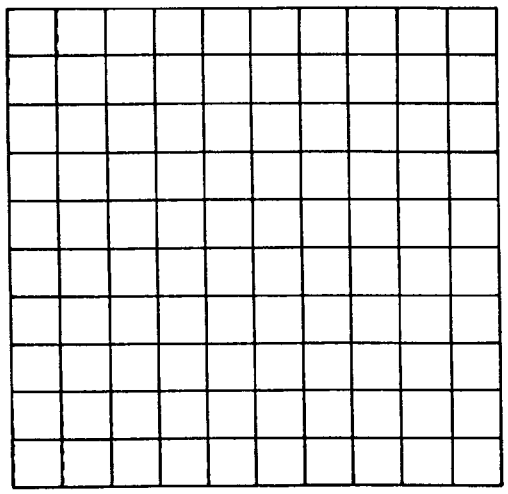
FIG. 47B
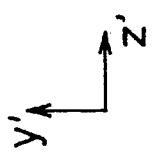
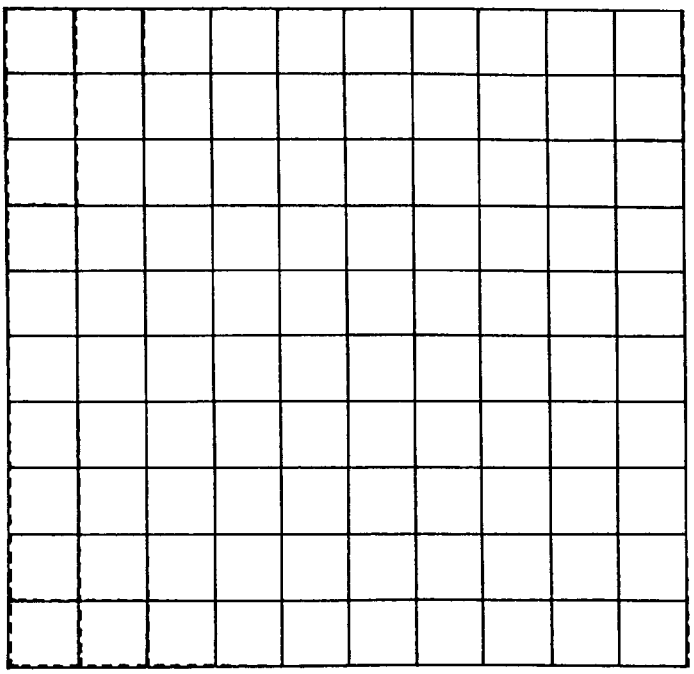
FIG. 47A

PROJECTING OPTICAL SYSTEM

BACKGROUND OF THE INVENTION

1. Field of the Invention

The present invention relates to a projecting optical system such as used in an image projecting apparatus to project an image formed on a primary image plane onto a secondary image plane.

2. Description of the Prior Art

Image projecting apparatuses employ a projecting optical system to project an image formed on a primary image plane, such as a liquid crystal display, onto a secondary image plane, such as a screen.

A projecting optical system which obliquely projects the image formed on the primary image plane onto the secondary image plane is well known.

Backward-projection-type projectors, for example, Head-Mounted Displays (HMDs), employ such obliquely projecting optical systems. HMDs and Heads Up Displays (HUDs) employ projecting optical systems that use a decentered mirror to secure a wide angle of view. In such projecting optical systems, a decentered combination of centered optical systems is used to cancel out asymmetric distortion (so-called trapezoid distortion) due to the inclination of the secondary image plane or caused by the decentered mirror. In other words, trapezoid distortion occurring in such projecting optical systems is corrected by the use of an optical system that is not symmetrical about its optical axis, that is, an optical system consisting of a plurality of centered optical systems that are combined such that their optical axes (axes of symmetry) do not coincide with one another.

When an optical system that is not symmetrical about its optical axis as described above is provided with a magnification varying function (for example, a zoom function) for varying the image magnification without changing the position of the secondary image plane (for example, in order to constantly obtain a sharp image on a plane on which the image is projected), it is essential that trapezoid distortion not appear even when the image magnification is varied.

For example, Japanese Laid-open Patent Application No. H5-119395 proposes a projection display apparatus that can vary the image magnification without causing trapezoid distortion. This apparatus is provided with a first projecting optical system that forms an intermediate image including trapezoid distortion, and a second projecting optical system that converts the intermediate image into an image free from trapezoid distortion. In this apparatus, the image magnification is varied by moving the second projecting optical system along the principal ray direction, and, at the same time, both of the first and second projecting optical systems are rotated to correct trapezoid distortion without changing the position of the secondary image plane.

On the other hand, Japanese Laid-open Patent Application No. H6-324285 proposes a visual display apparatus that varies the image magnification with a simple mechanism. This apparatus is provided with a decentered optical system, which includes a magnification varying lens unit so arranged as to be movable along its optical axis. In this apparatus, the image magnification is switched by moving the magnification varying lens unit along its optical axis such that its magnification becomes β or 1/β.

However, such complicated movement of optical elements as required in the apparatus proposed in Japanese Laid-open Patent Application No. H5-119395 can be achieved only by the use of a complicated mechanism, and thus it is impossible to realize a compact and inexpensive projecting optical system according to this proposal. On the other hand, in the apparatus proposed in Japanese Laid-open Patent Application No. H6-324285, the switching of the image magnification is possible only in two steps, and thus it is impossible to obtain continuously varying image magnifications in a projecting optical system according to this proposal.

SUMMARY OF THE INVENTION

An object of the present invention is to provide a projecting optical system that offers a high magnification despite having a relatively small lens diameter and a relatively short overall length.

Another object of the present invention is to provide a projecting optical system in which trapezoid distortion is corrected effectively by a small amount of decentering.

A further object of the present invention is to provide an obliquely projecting optical system in which focusing is achieved by the use of a simple mechanism without causing trapezoid distortion in the projected image.

A still further object of the present invention is to provide a variable-magnification, decentered optical system that can continuously vary the image magnification by the use of a simple mechanism and that does not suffer from trapezoid distortion even when the image magnification is varied.

To achieve the above objects, according to one aspect of the present invention, a projecting optical system for projecting an image formed on a primary image plane obliquely onto a secondary image plane while reducing or enlarging the image is provided with an aperture diaphragm, and two or more optical systems decentered from each other. In addition, in this projecting optical system, the following condition is satisfied:

$$-0.3 < \frac{Sr}{Se} < \frac{1}{|\beta r|}$$

where

Sr represents a sum of optical powers of each lens element in said optical systems disposed on an enlarged image plane side of the aperture diaphragm, Se represents a sum of optical powers of each lens element in said optical systems disposed on a reduced image plane side of the aperture diaphragm, and βr represents a magnification of a reduced image plane side part of the projecting optical system.

According to another aspect of the present invention, a projecting optical system for projecting an image formed on a primary image plane onto a secondary image plane is provided with an aperture diaphragm, and optical systems including a partial optical system capable of being decentered rotationally. In addition, in this projecting optical system, when the partial optical system included in the optical systems is rotated and thus decentered rotationally, at least one of the primary and secondary image planes is rotated with image distortion on the secondary image plane being kept substantially unchanged.

According to still another aspect of the present invention, a projecting optical system for projecting an image formed on a primary image plane obliquely onto a secondary image plane is provided with two or more partial optical systems decentered from each other, and a focusing optical system included and movably disposed in one of the partial optical systems, the focusing optical system being moved to achieve focusing with the secondary image plane kept inclined at a fixed angle to the primary image plane.

According to a further object of the present invention, a projecting optical system for projecting an image formed on a primary image plane obliquely onto a secondary image plane is provided with two or more partial optical systems decentered from each other, and two or more zoom optical systems each included and movably disposed in different one of the partial optical systems, the zoom optical systems being moved to continuously vary a magnification of the image with the secondary image plane kept in a fixed position.

BRIEF DESCRIPTION OF THE DRAWINGS

This and other objects and features of this invention will become clear from the following description, taken in conjunction with the preferred embodiments with reference to the accompanied drawings in which:

FIGS. 24A and 24B are diagrams showing the optical paths through the projecting optical system of the sixth embodiment, as observed when it is focused for the secondary image plane placed at a reference position and at a close position;

FIGS. 26A and 26B are diagrams showing the optical paths through the projecting optical system of the seventh embodiment, as observed when it is focused for the secondary image plane placed at a reference position and at a close position;

FIGS. 27A and 27B are diagrams showing the optical paths through the projecting optical system of the eighth embodiment, as observed when it is focused for the secondary image plane placed at a reference position and at a close position;

FIGS. 29A and 29B are diagrams showing the optical paths through the projecting optical system of the ninth embodiment, as observed when it is focused for the secondary image plane placed at a reference position and at a close position;

FIGS. 32A and 32C are spot diagrams obtained in the eighth embodiment when it is focused for the secondary image plane placed at the reference position and at the lose position;

FIGS. 33A and 33B are diagrams showing the distortion observed in the seventh embodiment when it is focused for the secondary image plane placed at the reference position and at the close position;

FIGS. 33A and 33C are diagrams showing the distortion observed in the eighth embodiment when is for the secondary image plane placed at the reference position and at the close position;

FIGS. 41A to 41C are diagrams showing the distortion observed in the tenth embodiment, in different focal-length states;

FIGS. 47A to 47C are diagrams showing the distortion observed in the eleventh embodiment, in different focal-length states;

DESCRIPTION OF THE PREFERRED EMBODIMENTS

Hereinafter, projecting optical systems embodying the present invention will be described with reference to the drawings. It is to be noted that, throughout the present specification, the words "optical power" is used to refer to any optical power exerted by optical elements, such as the power of refraction of a lens, the power of reflection of a mirror, and the power of diffraction of a diffracting optical element.

Figure 1:
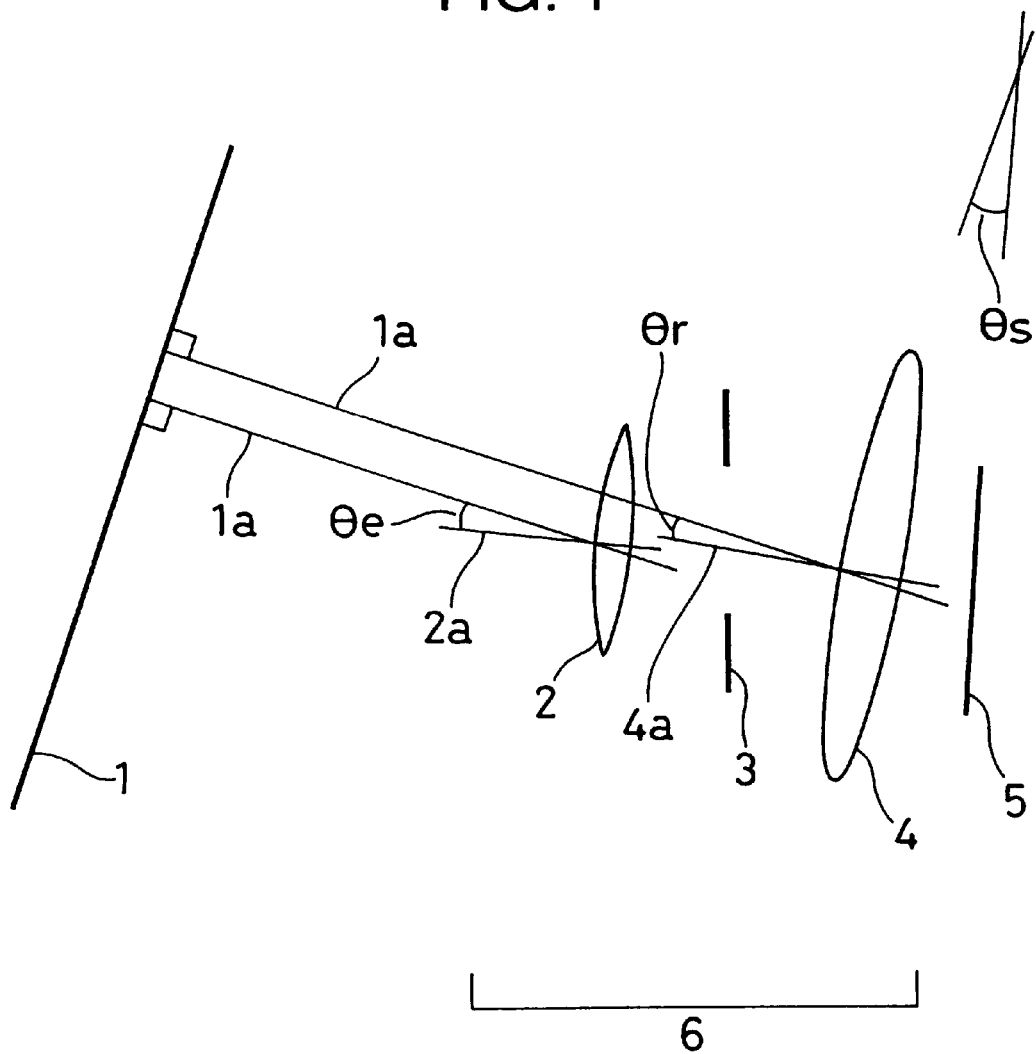
FIG. 1 is a diagram showing the outline of the projecting optical system according to the present invention.

FIG. 1 shows the outline of a projecting optical system 6 representing the embodiments of the present invention for projecting an image formed on a primary image plane 1, such as a screen or a document, obliquely onto a secondary image plane 5, such as a line sensor or an area sensor, while reducing the image. The primary image plane 1 and the projecting optical system 6 are each disposed at a specific angle to the secondary image plane 5, and the projecting optical system 6 projects the image formed on the primary image plane 1 directly onto the secondary image plane 5 without forming an intermediate image. The projecting optical system 6 is constituted of an aperture diaphragm 3, an enlargement side lens unit 2 that is disposed on the enlarged image plane side of the aperture diaphragm 3, and a reduction side lens unit 4 that is disposed on the reduced image plane side of the aperture diaphragm 3. The enlargement side lens unit 2 and the reduction side lens unit 4 are disposed decentered from each other such that the trapezoid distortion resulting from the projection of the image formed on the primary image plane 1 onto the secondary image plane 5 is corrected properly.

In such a projecting optical system, it is preferable that condition (A) below be satisfied:

$$-0.3 < \frac{Sr}{Se} < \frac{1}{|\beta r|} \qquad (A)$$

where $\beta r$ represents the magnification of the reduced image plane side part of the projecting optical system 6, Se represents the a sum of optical powers of each lens element in said the optical elements composing the enlargement side lens unit 2, and Sr represents the a sum of optical powers of each lens element in said the optical elements composing the reduction side lens unit 4. In cases where the reduced image plane side part of the projecting optical system 6 exhibits different magnifications between in the direction parallel to FIG. 1 and in the direction perpendicular thereto, the average of the magnifications in both directions is used as $\beta r$.

If the upper limit of condition (A) is exceeded, only a small amount of decentering is required between the enlargement side and reduction side lens units 2 and 4 for the correction of trapezoid distortion. In this case, however, to obtain a sufficiently high magnification, either the projecting optical system 6 needs to be extremely long, and thus it is necessary to sacrifice the compactness, or the reduction side lens unit 4 needs to have extremely strong optical power, and thus it is difficult to correct aberration other than trapezoid distortion properly. By contrast, if the lower limit of condition (A) is exceeded, an extremely large amount of decentering is required to correct trapezoid distortion. This causes light rays to enter each lens unit with extremely large angles of incidence, and thus makes proper correction of aberration other than trapezoid distortion difficult.

Moreover, it is preferable that the composite optical power of the reduction side lens unit 4 be weaker than that of the enlargement side lens unit 2, that is, the upper limit of condition (A) be set to 1.0. This reduces the degree to which light rays need to be bent in the reduction side lens unit 4, and thus makes it possible to secure a sufficiently long distance between the reduction side lens unit 4 and the secondary image plane 5.

Moreover, it is preferable that the inclination angles of the enlargement side lens unit 2, the reduction side lens unit 4, and the secondary image plane 5 with respect to the primary image plane 1 satisfy conditions (B) and (C) below:

$$\theta_r < \theta_e \qquad (B)$$

$$\theta_r < \theta_s \qquad (C)$$

where $\theta_e$ represents the angle between the normal 1$a$ to the primary image plane 1 and the axis of symmetry 2$a$ of the enlargement side lens unit 2, $\theta_r$ represents the angle between the normal 1$a$ and the axis of symmetry 4$a$ of the reduction side lens unit 4, and $\theta_s$ represents an angle between the primary image plane 1 and the secondary image plane 5. In cases where the enlargement side lens unit 2 or the reduction side lens unit 4 is composed of a plurality of lens units decentered from each other, $\theta_e$ is defined as the average value of the angle between the normal 1a and the axis of symmetry of the lens units that form a centered optical system on the enlargement side, and $\theta_r$ is defined as the average value of the angle between the normal 1a and the axis of symmetry of the lens units that form a centered optical system on the reduction side.

When conditions (B) and (C) above are satisfied, the enlargement side and reduction side lens units 2 and 4 can be arranged such that the rear focal point of the former coincides with the front focal point of the latter. This not only makes it possible to reduce the optical power of the reduction side lens unit 4, and thus makes correction of aberration easy, but also helps make the lens system compact as a whole.

Moreover, by designing the projecting optical system to have its reduced image plane side pupil at a position opposite to the aperture diaphragm 3 across the reduced image plane, it is possible to reduce the diameter of the enlargement side lens unit 2.

Furthermore, it is preferable that the enlargement side lens unit 2 and the reduction side lens unit 4 each include at least one negative lens. Because the enlargement side and reduction side lens units 2 and 4 are decentered from each other, the chromatic aberration and image-surface curvature occurring in each of these lens units should preferably be corrected within each lens unit. Correction of such aberration can be achieved by providing at least one negative lens in each of the enlargement side and reduction side lens units 2 and 4, because both lens unit have positive power. In this case, it is preferable that at least one of these negative lenses satisfy condition (D) below:

$$\nu d < 40 \quad (D)$$

where vd represents the dispersive power of the negative lens.

If the upper limit of condition (D) is exceeded, it is not possible to properly correct the chromatic aberration occurring in the positive lenses by the dispersive power of the negative lens.

Furthermore, it is preferable that any negative lens disposed on the reduced image plane side of the aperture diaphragm 3 be placed in the vicinity of the aperture diaphragm 3, and that the reduction side lens unit 4 have a negative-positive power arrangement as a whole. When the reduction side lens unit 4 has a negative-positive optical power arrangement (corresponding to a retrofocus arrangement in a centered optical system), its principal point is located close to the aperture diaphragm 3, and thus it is possible to secure a sufficiently long distance between the reduction side lens unit 4 and the secondary image plane 5.

Moreover, it is preferable that the enlargement side lens unit 2 include a so-called triplet-type arrangement of lenses characterized by a positive-negative-positive power arrangement. This construction allows most of the aberration, except trapezoid distortion, occurring in the enlargement side lens unit 2 to be corrected within that lens unit 2, and thus helps reduce the burden of the reduction side lens unit 4 in the correction of the aberration occurring in the enlargement side lens unit 2.

Moreover, the aperture diaphragm 3 may be placed within a specific one of the lens units constituting the projecting optical system.

Furthermore, the primary image plane 1 and the secondary image plane 5 may be arranged parallel to each other.

The projecting optical system described so far projects an image formed on a primary image plane, such as a screen or a document, obliquely onto a secondary image plane, such as a line sensor or an area sensor, while reducing the image. It is to be noted, however, that the same projecting optical system can be used as an optical system for projecting an image formed on a primary image plane, such as a liquid crystal display or film, obliquely onto a secondary image plane, such as a screen, while enlarging the image.

Figure 2:
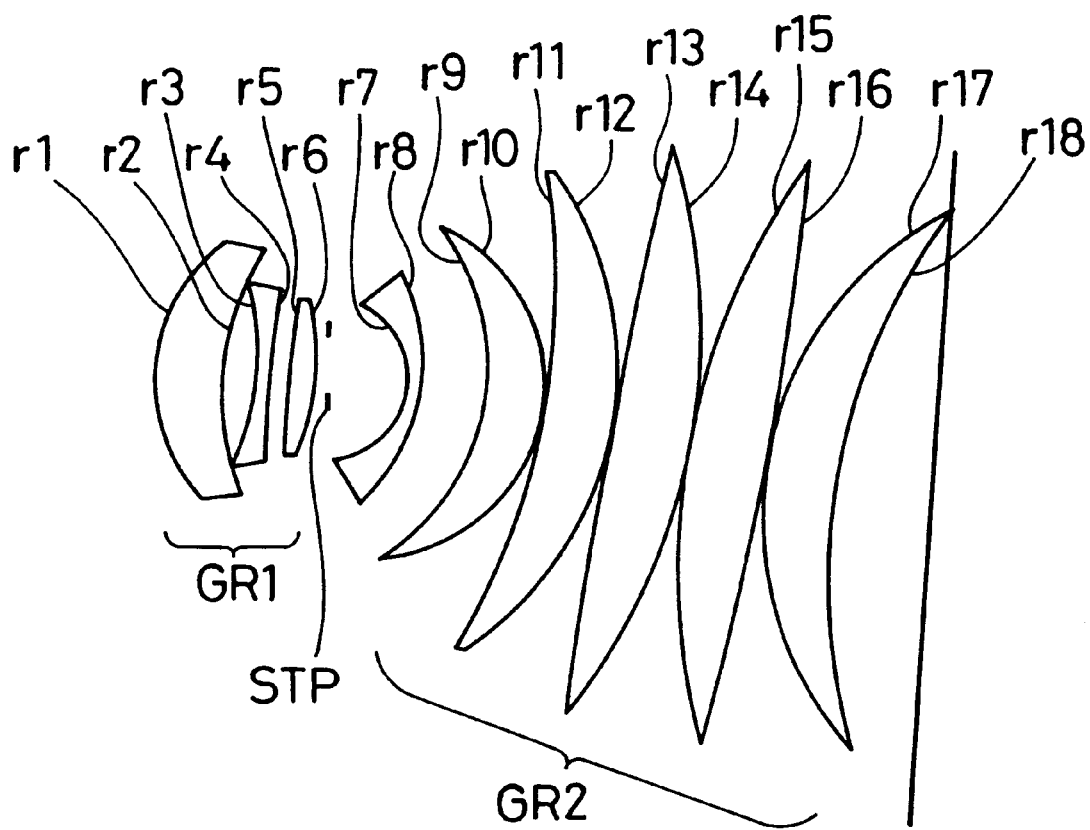
FIG. 2 is a diagram showing the lens arrangement of the projecting optical system of a first embodiment of the present invention.
Figure 3:
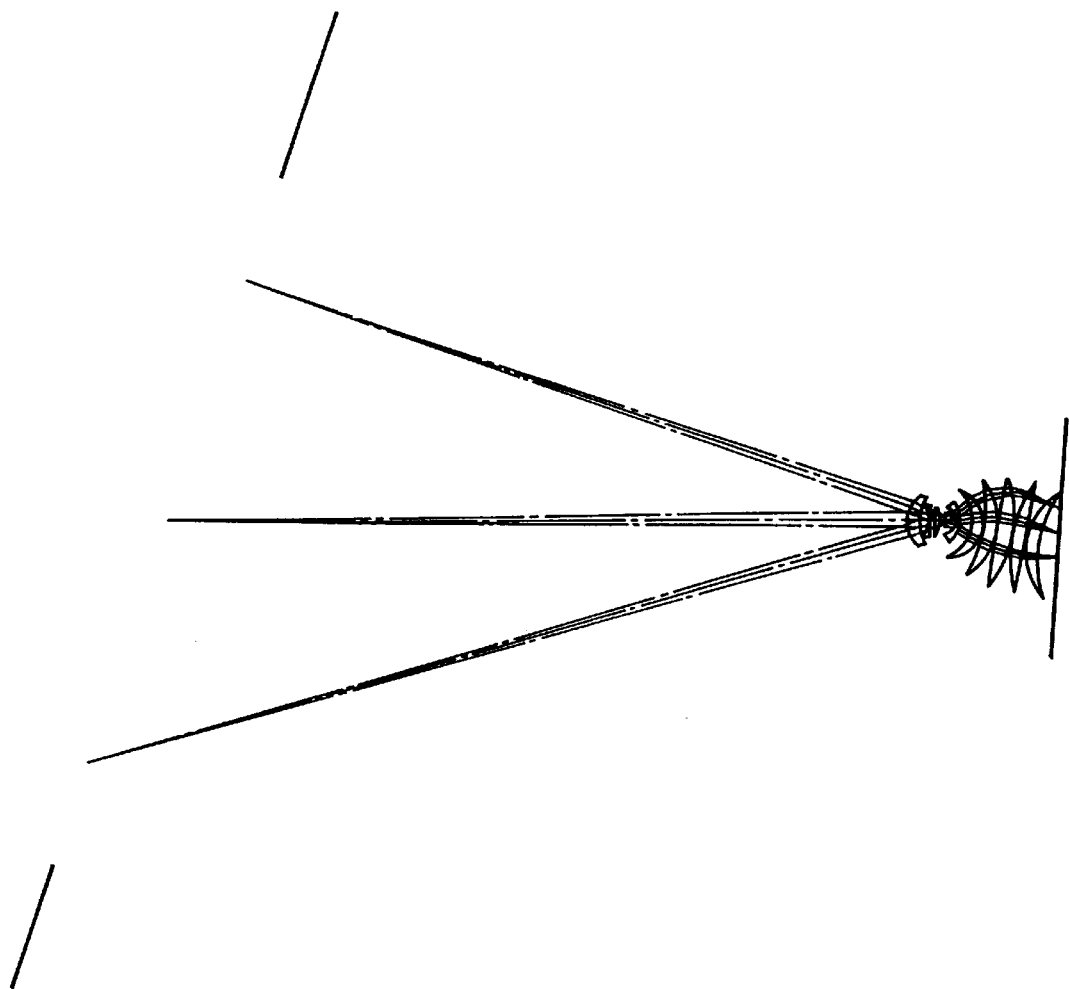
FIG. 3 is a diagram showing the optical paths through the projecting optical system of the first embodiment.

FIG. 2 shows the lens arrangement of the projecting optical system of a first embodiment of the present invention, and FIG. 3 shows the optical paths therethrough. The projecting optical system of the first embodiment is constituted of, from the enlargement side, a first lens unit GR1 having positive optical power, an aperture diaphragm STP, and a second lens unit GR2 having positive optical power. Here, the first lens unit GR1 serves as the enlargement side lens unit 2, and the second lens unit GR2 serves as the reduction side lens unit 4. In the first embodiment, the parameters related to conditions (A) to (D) take the following values:

Se=0.02113

Sr=0.003663

Sr/Se=0.17331

$1/|\beta r|$=10.71

$\theta_e$=13.018

$\theta_r$=7.490

$\theta_s$=13.890

Figure 4:
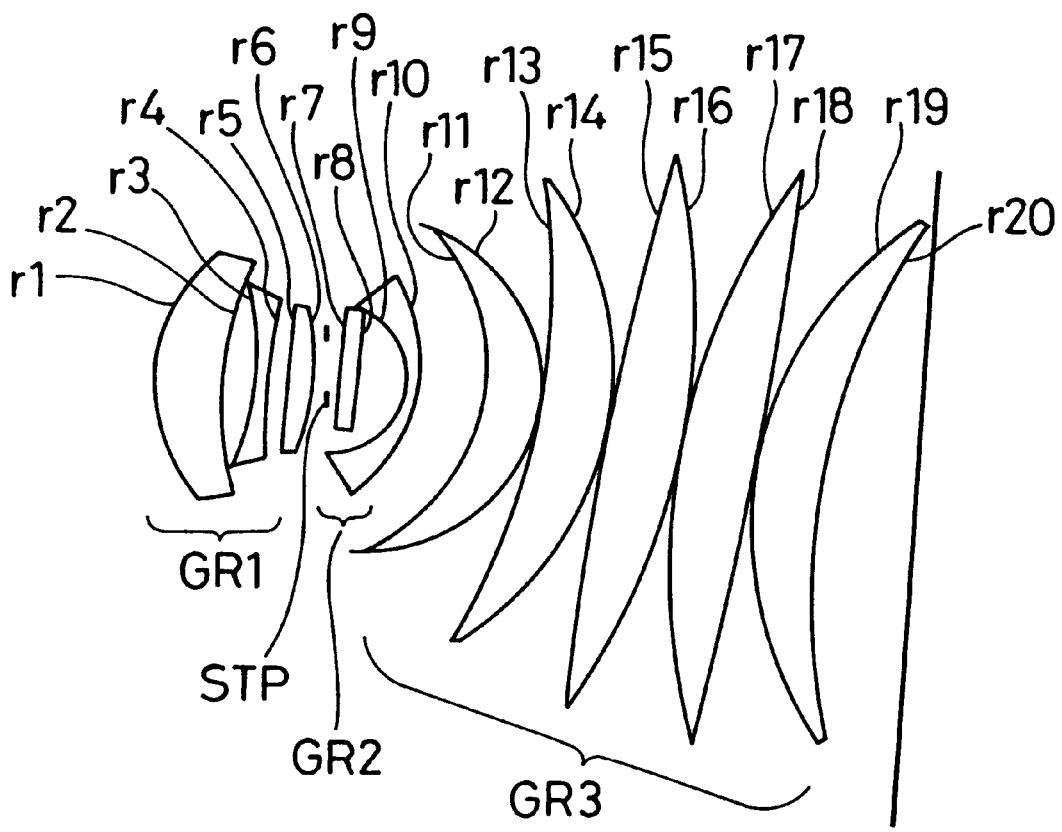
FIG. 4 is a diagram showing the lens arrangement of the projecting optical system of a second embodiment of the present invention.
Figure 5:
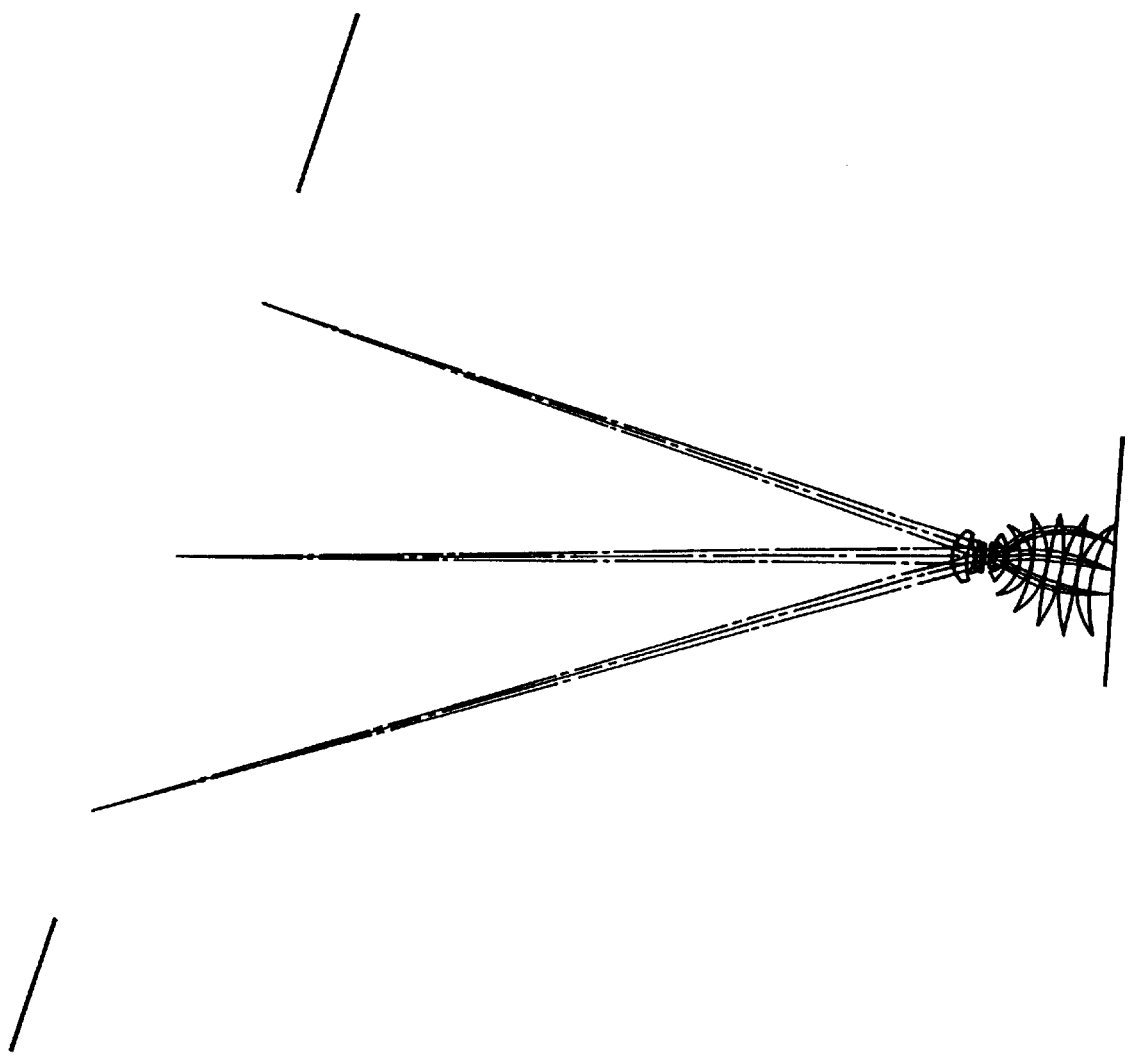
FIG. 5 is a diagram showing the optical paths through the projecting optical system of the second embodiment.

FIG. 4 shows the lens arrangement of the projecting optical system of a second embodiment of the present invention, and FIG. 5 shows the optical paths therethrough. The projecting optical system of the second embodiment is constituted of, from the enlargement side, a first lens unit GR1 having positive optical power, an aperture diaphragm STP, a second lens unit GR2 having positive optical power and composed of a single lens element, and a third lens unit GR3 having positive optical power. Here, the first lens unit GR1 serves as the enlargement side lens unit 2, and the second and third lens units GR2 and GR3 serve as the reduction side lens unit 4. In the second embodiment, the parameters related to conditions (A) to (D) take the following values:

Se=0.01934

Sr=0.0038496

Sr/Se=0.19902

$1/|\beta r|$=10.71

$\theta_e$=13.018

$\theta_r$=9.759

$\theta_s$=14.004

Figure 6:
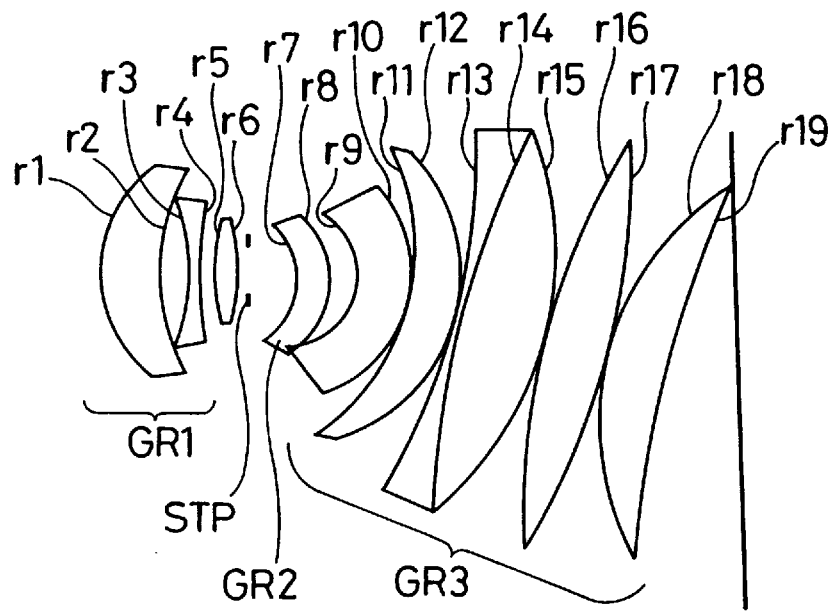
FIG. 6 is a diagram showing the lens arrangement of the projecting optical system of a third embodiment of the present invention.
Figure 7:
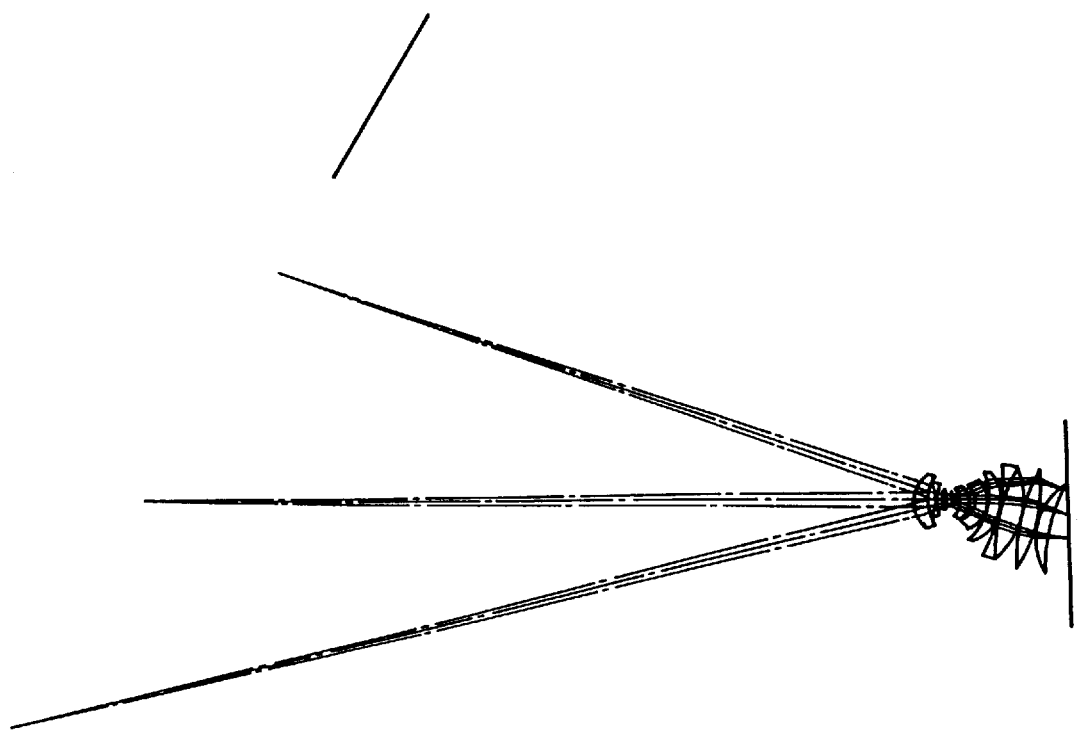
FIG. 7 is a diagram showing the optical paths through the projecting optical system of the third embodiment.
Figure 8A:
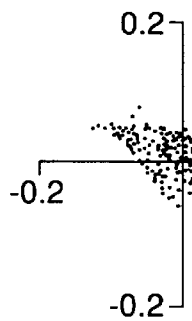
FIGS. 8A to 8I are spot diagrams obtained in the first embodiment.
Figure 8B:
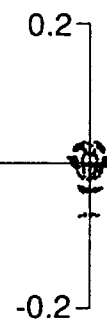
Figure 8C:
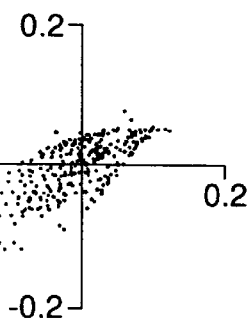
Figure 8D:
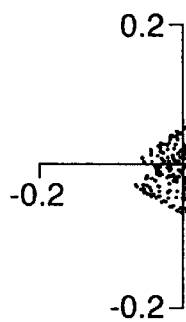
Figure 8E:
Figure 8F:
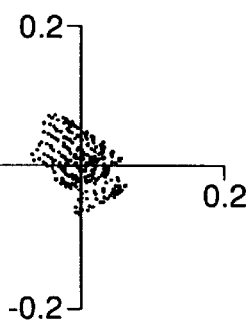
Figure 8G:
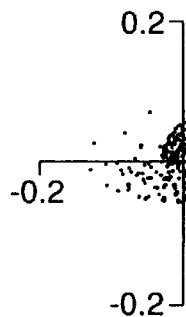
Figure 8H:
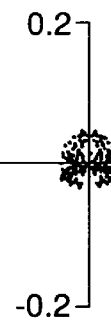
Figure 8I:
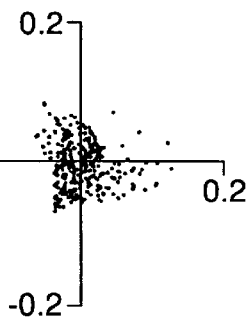
Figure 9A:
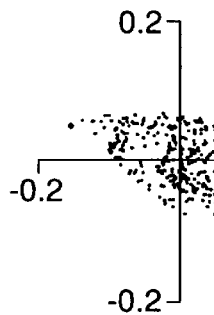
FIGS. 9A to 9I are spot diagrams obtained in the second embodiment.
Figure 9B:
Figure 9C:
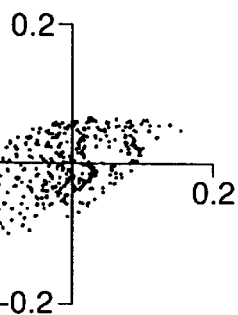
Figure 9D:
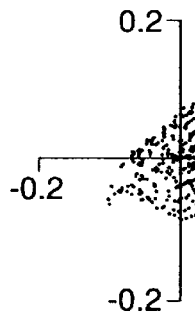
Figure 9E:
Figure 9F:
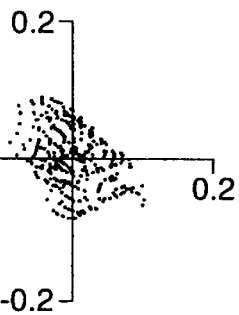
Figure 9G:
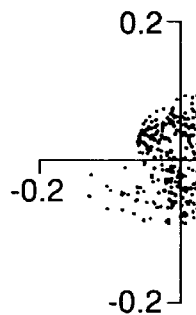
Figure 9H:
Figure 9I:
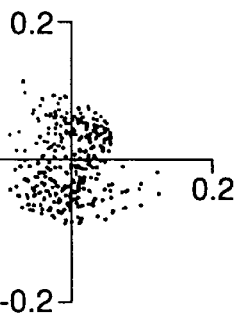
Figure 10A:
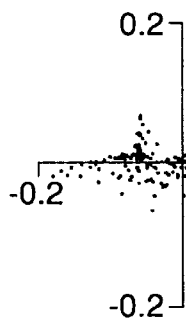
FIGS. 10A to 10I are spot diagrams obtained in the third embodiment.
Figure 10B:
Figure 10C:
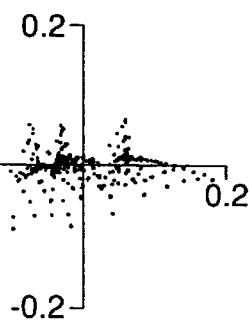
Figure 10D:
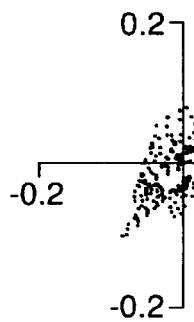
Figure 10E:
Figure 10F:
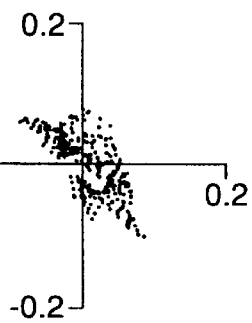
Figure 10G:
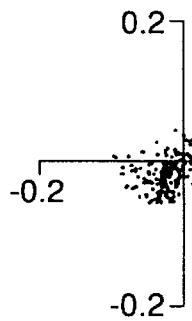
Figure 10H:
Figure 10I:
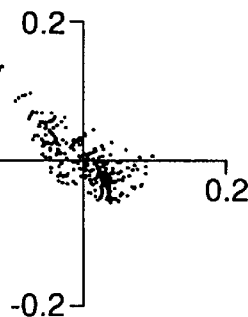

FIG. 6 shows the lens arrangement of the projecting optical system of a third embodiment of the present invention, and FIG. 7 shows the optical paths therethrough. The projecting optical system of the third embodiment is constituted of, from the enlargement side, a first lens unit GR1 having positive optical power, an aperture diaphragm STP, a second lens unit GR2 having positive optical power and composed of a single lens element, and a third lens unit GR3 having positive optical power. Here, the first lens unit GR1 serves as the enlargement side lens unit 2, and the second and third lens units GR2 and GR3 serve as the reduction side lens unit 4. In the third embodiment, the parameters related to conditions (A) to (D) take the following values:

Se=0.02433

Sr=0.01726

Sr/Se=0.70915

$1/|\beta r|=10.92$ $\theta_e=18.000$ $\theta_r=8.860$ $\theta_s=19.488$

Tables 1 to 3 list the construction data of the projecting optical systems of the first to third embodiments, respectively. For each embodiment, the construction data is given on the assumption that the projecting optical system is used as a reduction projecting optical system having a primary image plane on its enlarged image plane side and having a secondary image plane on its reduced image plane side. In Tables 1 to 3, ri and GRi respectively represent the i-th lens surface and the i-th lens unit from the enlarged image plane side, and OBJ, STP, and IMG denote the enlargement side image plane, the aperture diaphragm, and the reduction side image plane, respectively.

In all of the first to third embodiments, the lens elements composing each lens unit share a common axis of symmetry without being decentered from each other, but the lens units are arranged at predetermined angles to each other.

Listed at the bottom of the construction data of each embodiment are the X-, Y-, and Z-coordinates X, Y, and Z of the lens units, enlargement side image plane, aperture diaphragm, and reduction side image plane, as represented in a three-dimensional absolute coordinate system having its origin at the center of the lens surface located at the enlargement side end of the first lens unit, together with the rotational angle ANG about the Z axis for each item named above.

FIGS. 8A to 8I, 9A to 9I, and 10A to 10I are spot diagrams of the first to third embodiments, respectively.

Figure 11:
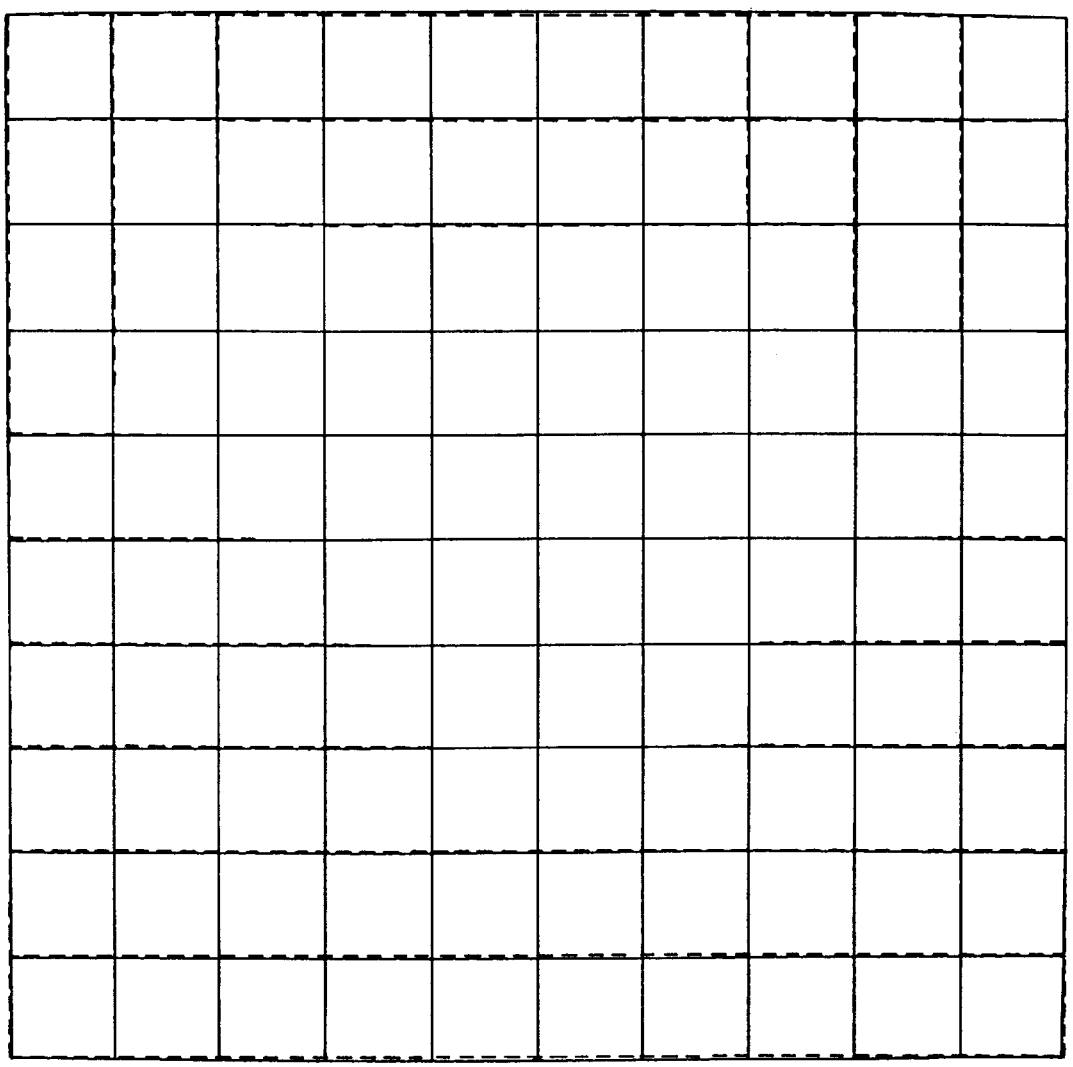
FIG. 11 is a diagram showing the distortion observed in the first embodiment.
Figure 12:
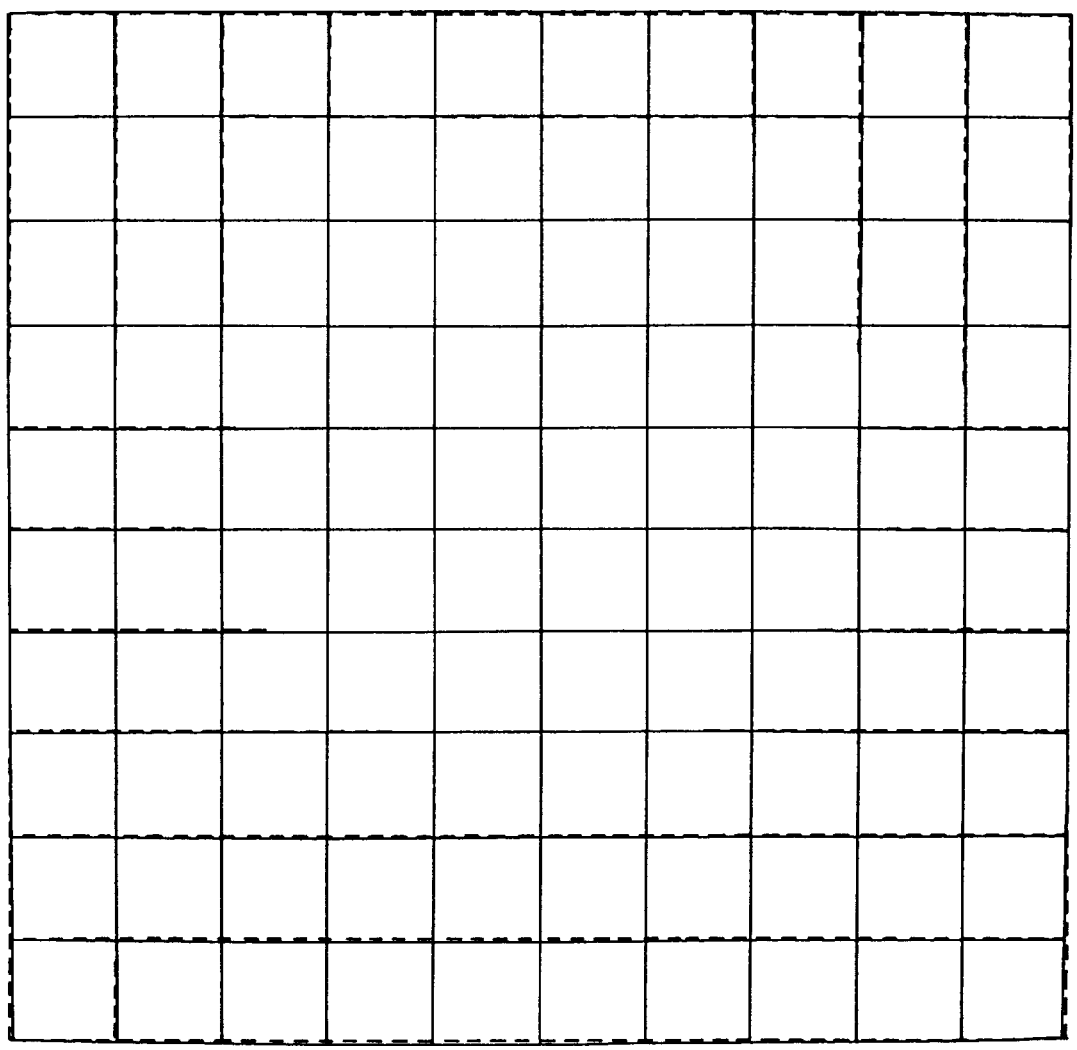
FIG. 12 is a diagram showing the distortion observed in the second embodiment.
Figure 13:
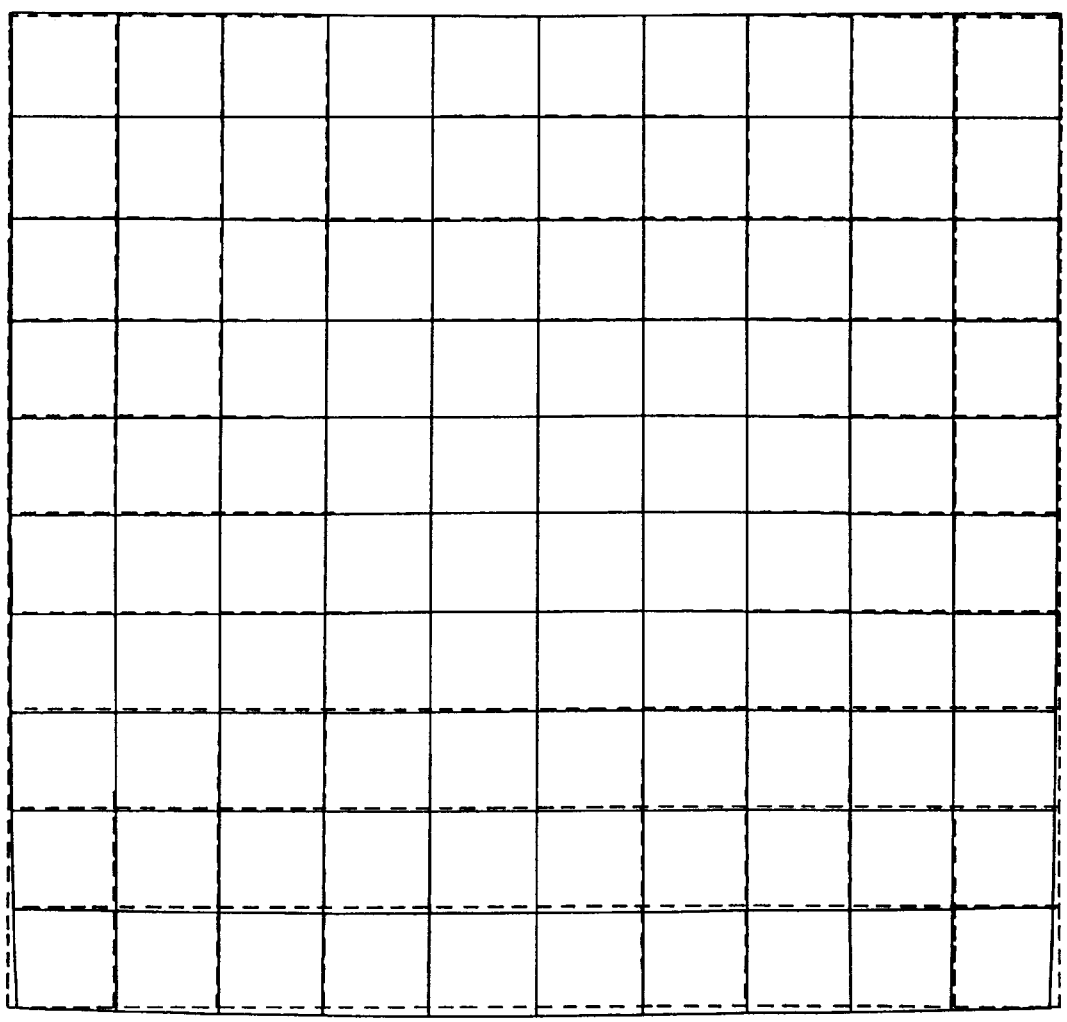
FIG. 13 is a diagram showing the distortion observed in the third embodiment.

FIGS. 11, 12, and 13 are diagrams showing the distortion observed in the first to third embodiments, respectively. These distortion diagrams show the distortion observed when an image having an area of 404 mm by 404 mm with a lattice pattern is placed on the enlargement side image plane. In these distortion diagrams, solid lines represents the image as actually observed, and broken lines represent, as a reference, the image as observed when no distortion is present.

Figure 14:
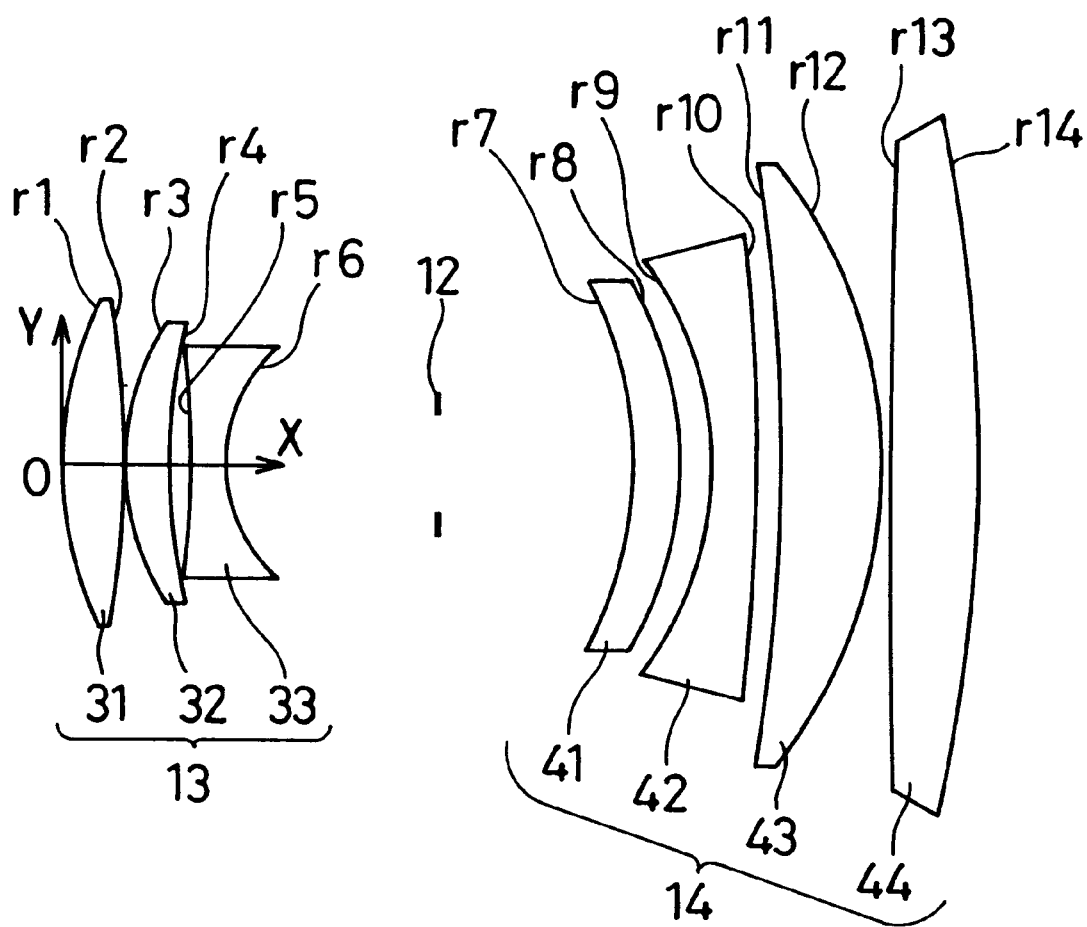
FIG. 14 is a diagram showing the lens arrangement of the projecting optical system of a fourth embodiment of the present invention.
Figure 15A:
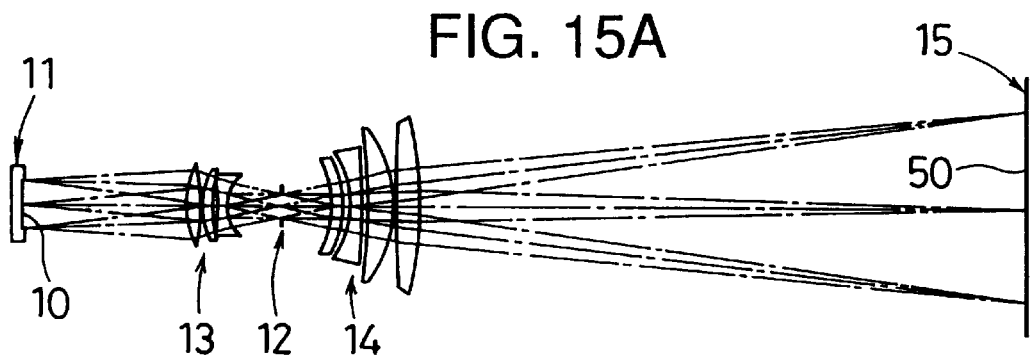
FIGS. 15A to 15C are diagrams showing the optical paths through the projecting optical system of the fourth embodiment.
Figure 15B:
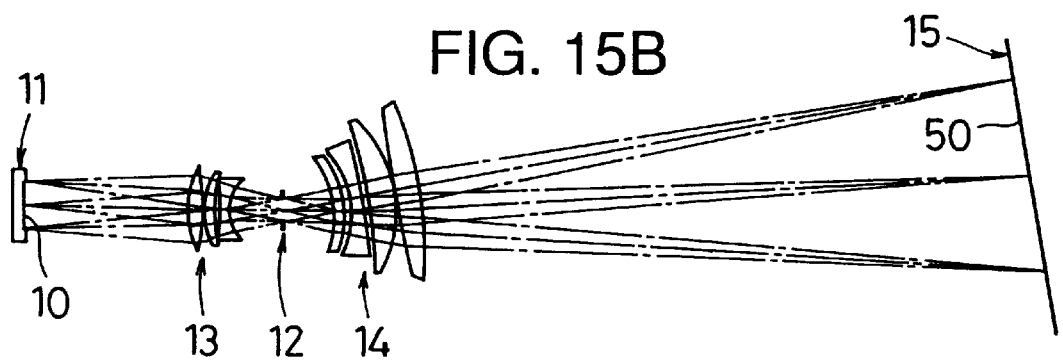
Figure 15C:
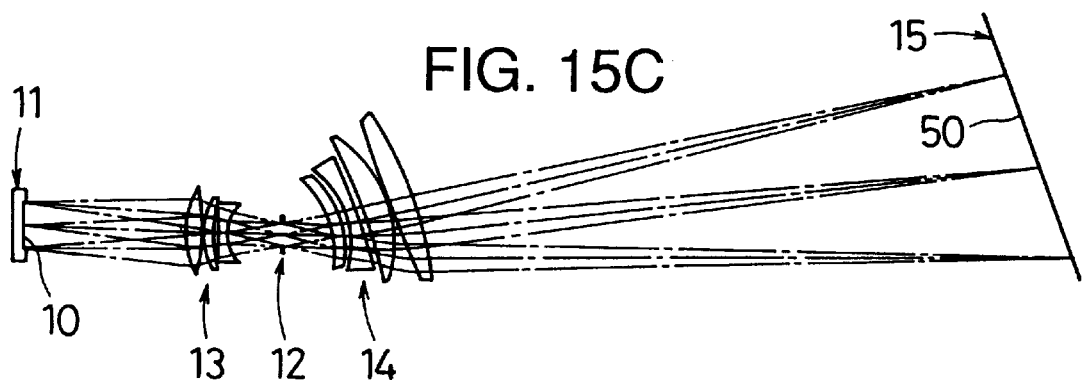
Figure 16C:
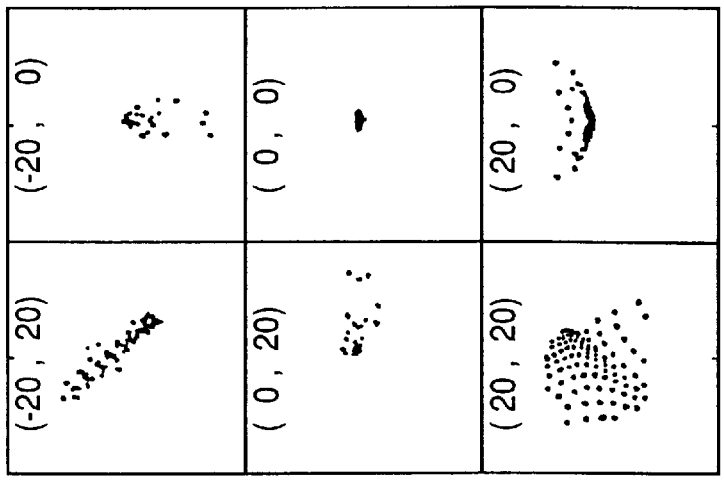
FIGS. 16A to 16C are spot diagrams obtained in the fourth embodiment.
Figure 16B:
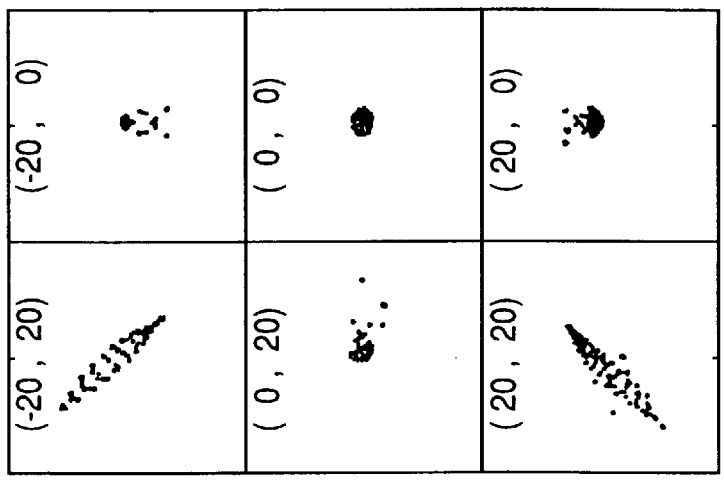
Figure 16A:
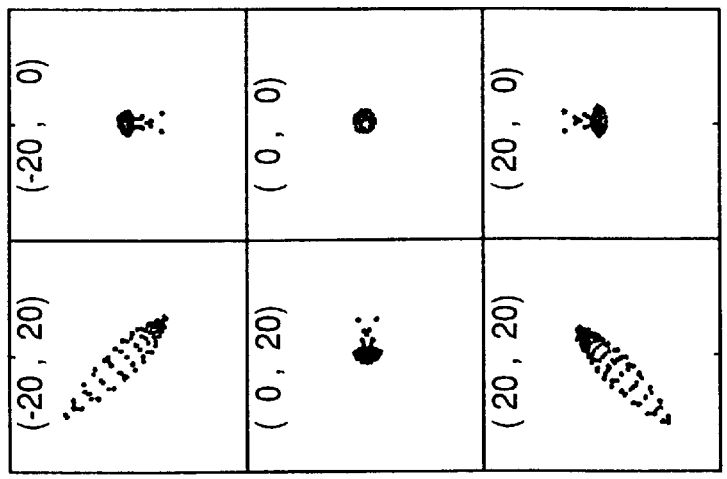
Figure 17C:
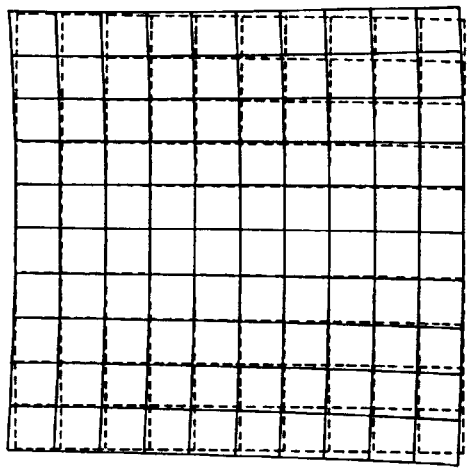
FIGS. 17A to 17C are diagrams showing the distortion observed in the fourth embodiment.
Figure 17B:
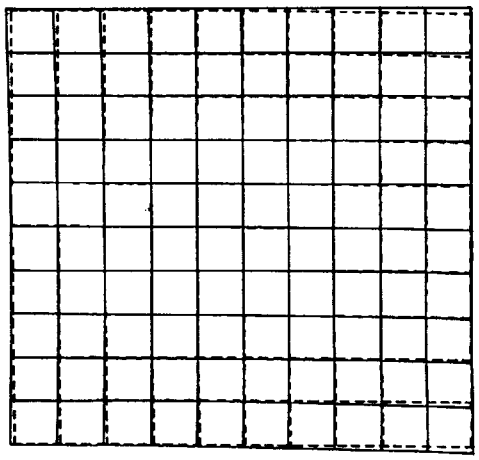
Figure 17A:
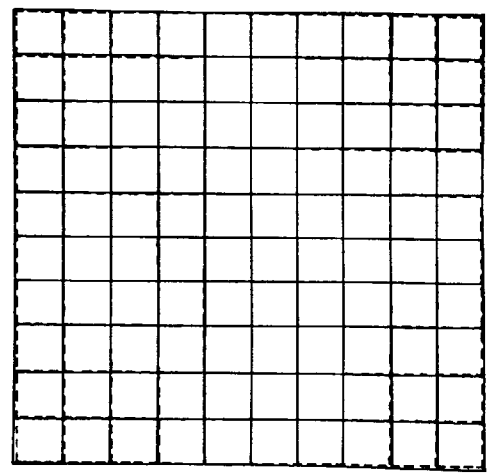

FIG. 14 shows the lens arrangement of the projecting optical system of a fourth embodiment of the present invention. In FIG. 14, ri (i=1, 2, 3, . . . ) represents the i-th lens surface from the primary image side. FIGS. 15A to 15C show the optical paths through the projecting optical system of the fourth embodiment, as observed when the secondary image plane is inclined at 0°, 10°, and 20°, respectively. FIGS. 16A to 16C are spot diagrams obtained in the fourth embodiment, and show the positions at which light rays from the primary image plane strike the secondary image plane, as observed when the secondary image plane is inclined at 0°, 10°, and 20°, respectively. FIGS. 17A to 17C are diagrams showing the distortion occurring in the fourth embodiment, as observed when the secondary image plane is inclined at 0°, 10°, and 20°, respectively. FIGS. 17A to 17C each show the actual image (solid lines) observed on the secondary image plane when an image with a lattice pattern (a 160.09 mm by 160.09 mm square) is placed on the primary image plane, together with the ideal image (broken lines) for reference.

As shown in FIGS. 15A to 15C, the projecting optical system projects an image formed on a primary image plane 10 by an image display apparatus 11 onto a secondary image plane 50 realized as a screen 15. Here, the primary image plane 10 is a 40 mm by 40 mm square area (having a lattice pattern). As shown in FIG. 14, the projecting optical system is constituted of, from the primary image side, a first lens unit 13, an aperture diaphragm 12, and a second lens unit 14.

Both of the first and second lens units 13 and 14 satisfy a f-θ characteristic. Specifically, the first lens unit 13 is arranged such that the angle at which a light ray exits from the first lens unit 13 (the angle that the exiting light ray makes with the optical axis of the first lens unit 13) is proportional to the height at which the light ray has left the image display apparatus 11 (the object height on the primary image plane 10); the second lens unit 14 is arranged such that the height at which a light ray reaches the screen 15 (the image height on the secondary image plane 50) is proportional to the angle at which the light ray has entered the second lens unit 14 (the angle that the incident light ray makes with the optical axis of the second lens unit 14).

In addition, the second lens unit 14 is so arranged as to be rotatable about the center of the light beam it receives. Specifically, the second lens unit 14 can be rotated and thereby decentered together with the aperture diaphragm 12 about an axis that passes through the intersection between the plane including the aperture diaphragm 12 and the optical axis of the second lens unit 14 (i.e. the center of the aperture diaphragm 12, since, in this embodiment, the aperture diaphragm 12 is circular) and that is parallel to a Z-axis as defined later. Thus, it is possible to rotate the secondary image plane 50 by rotating the second lens unit 14. The rotation of the second lens unit 14 is achieved by the use of a simple, inexpensive driving mechanism (not shown).

Moreover, the screen 15 is arranged in such a way that it can be rotated together with the second lens unit 14 about the center of the aperture diaphragm 12 without breaking the relative positional relationships between the screen 15 and the second lens unit 14. Thus, it is possible to adjust the inclination angle of the screen 15.

Table 4 lists the construction data of the fourth embodiment. In Table 4, ri (i=1, 2, 3, . . . ) represents the radius of curvature of the i-th lens surface from the primary image side (excluding the aperture diaphragm), di (i=1, 2, 3, . . . ) represents the i-th axial distance from the primary image side (including the aperture diaphragm), and Ni represents the refractive index of the i-th lens from the primary image side. Here, radii of curvature are given in mm, with positive and negative values respectively representing convex and concave surfaces as seen from light rays entering them; axial distances are given in mm; refractive indices represent the refractive indices of the materials existing between two adjacent surfaces, and therefore a refractive index of 1.00000 indicates that the material is air. The radii of curvature (=infinity ($\infty$)) of the both surfaces of the aperture diaphragm and the radius (in mm) of the aperture are also included in the construction data.

Listed together with the construction data, under the headings "X", "Y", and "Z" are the X-, Y-, and Z-coordinates of the centers of the first lens unit 13 (at the vertex of the surface r1), the second lens unit 14 (at the center of the aperture diaphragm 12), the primary image plane 10, and the secondary image plane 50, as represented in a coordinate system having its origin at the vertex of the surface r1, having its X-axis along the optical axis of the lens element including that surface r1, having its Y-axis perpendicular to the X-axis and in the plane of the figure, and having its Z-axis perpendicular to both the X- and Y-axes (perpendicular to the plane of the figure); in addition, under the heading "ANG" are listed, for the first lens unit 13 and for the second lens unit 14 including the aperture diaphragm 12, the angles (in degrees) at which they are decentered rotationally with respect to the X-axis, and, for the primary and secondary image planes, the angles (in degrees) at which they are inclined with respect to the X-axis. In Table 4, angles having positive values represent clockwise angles in FIGS. 14, and 15A to 15C.

Moreover, for the primary image plane, its upper and lower limits in the Y-axis direction ymax and ymin and its upper and lower limits in the Z-axis direction zmax and zmin are also listed.

Note that the construction data listed in Table 4 correspond to the state of the projecting optical system as shown in FIG. 15A, that is, with the second lens unit 14 and the secondary image plane 50 (screen 15) inclined at 0°, but that the state of the projecting optical system can be changed by rotating and thereby decentering the second lens unit 14 and the screen 15 so that the second lens unit 14 and the screen 15 are inclined, for example, at 10° or 20°, as shown in FIGS. 15B and 15C and in Table 5 below.

Table 5 lists, under the headings "grp.14 ANG", "IMG.X", "IMG.Y", "IMG.Z", and "IMG ANGLE", the angle at which the second lens unit 14 is decentered rotationally, the X-, Y-, and Z-coordinates of the center of the secondary image plane 50, and the inclination angle of the secondary image plane 50 (screen 15), as observed in the fourth embodiment when the secondary image plane is inclined at 0°, 10°, and 20°.

Table 6 lists the distortion factors observed on the secondary image plane 50 in the fourth embodiment. In Table 6, the "object height" of an object point is represented by its coordinates, that is, the distances (mm) in the previously defined Y- and Z-directions from the intersection between the previously defined X-axis and the primary image plane 10 to the object point. Moreover, the "image height" of an image point is represented by its coordinates (y, z) in a coordinate system having its origin at the position where a light ray from the center of the primary image plane (0, 0) strikes the secondary image plane 50, having its y-axis along the intersection line between the X-Y plane and the secondary image plane 50 (the positive direction of the y-axis is the same as that of the Y-axis projected onto the secondary image plane), and having its z-axis perpendicular to the y-axis (the positive direction of the z-axis is the direction from the plane of FIGS. 14 and 15A to 15C toward the reader). Ideal image heights are represented as (y, z), and actual image heights including distortion are represented as (y+dy, z+dz). Thus, the distortion factor in the y-axis direction is defined as dy/r, and the distortion factor in the z-axis direction is defined as dz/r, where $$r = \sqrt{y^2 + z^2}$$

Note that the actual image heights (including distortion) used to calculate the distortion factors listed in Table 6 are the gravity points of the spot diagrams (FIGS. 16A to 16C) for light rays from the corresponding object heights.

From Table 6 and FIGS. 17A to 17C, it will be understood that trapezoid distortion and other distortion are satisfactorily corrected in the image formed on the secondary image plane by the projecting optical system of the fourth embodiment. Moreover, it is also understood that, even when the second lens unit 14 is decentered rotationally in accordance with the inclination of the screen 15, the condition of distortion on the secondary image plane, as well as the image magnification, is kept substantially unchanged.

Figure 18:
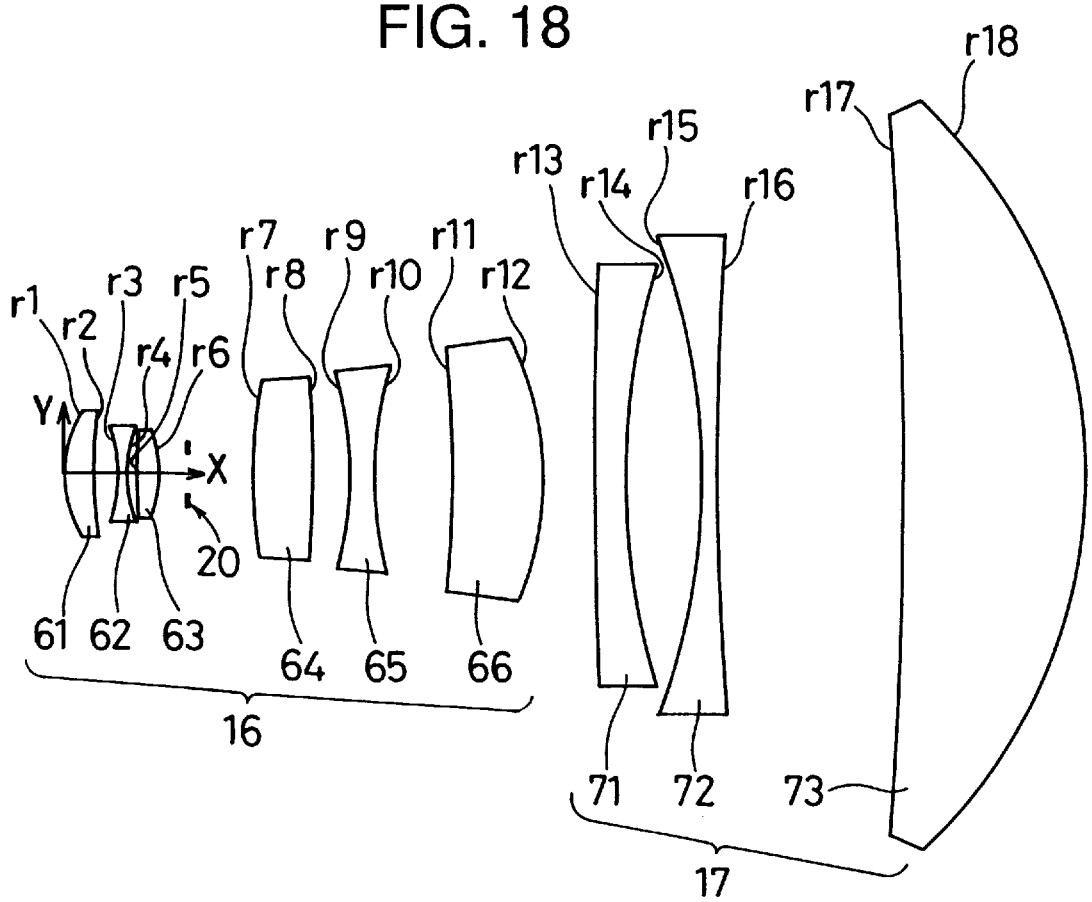
FIG. 18 is a diagram showing the lens arrangement of the projecting optical system of a fifth embodiment of the present invention.
Figure 19A:
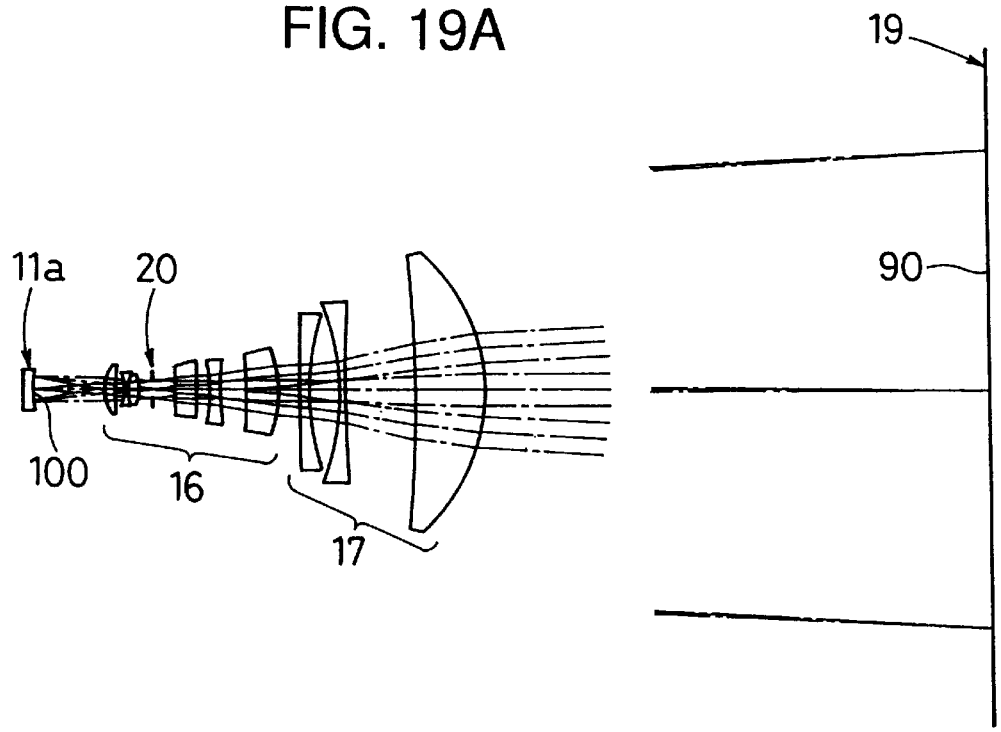
FIGS. 19A and 19B are diagrams showing the optical paths through the projecting optical system of the fifth embodiment.
Figure 19B:
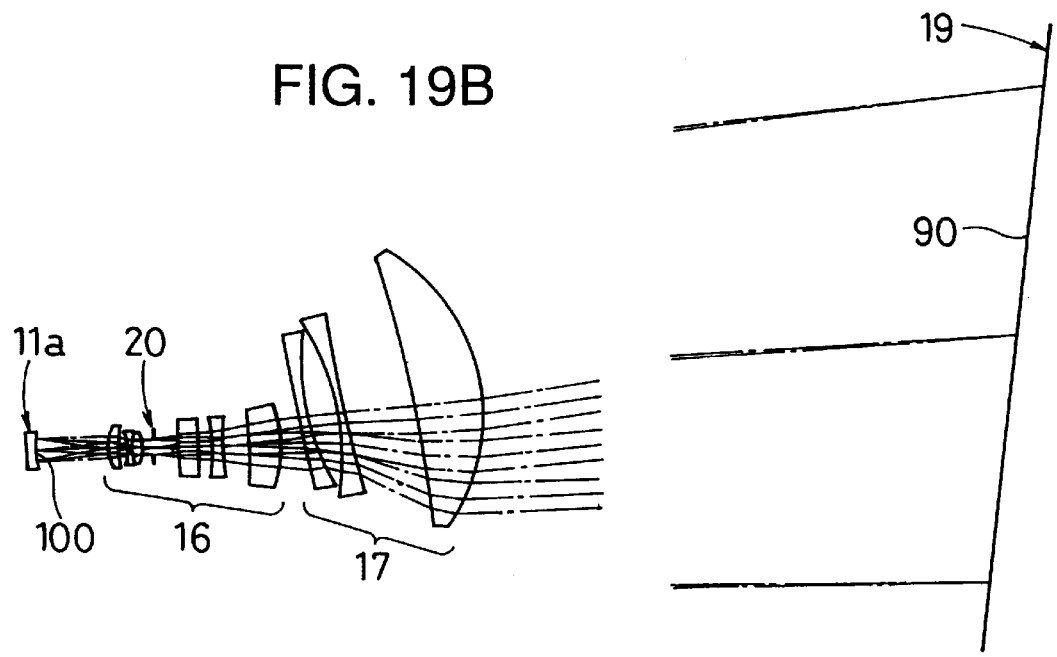
Figure 20B:
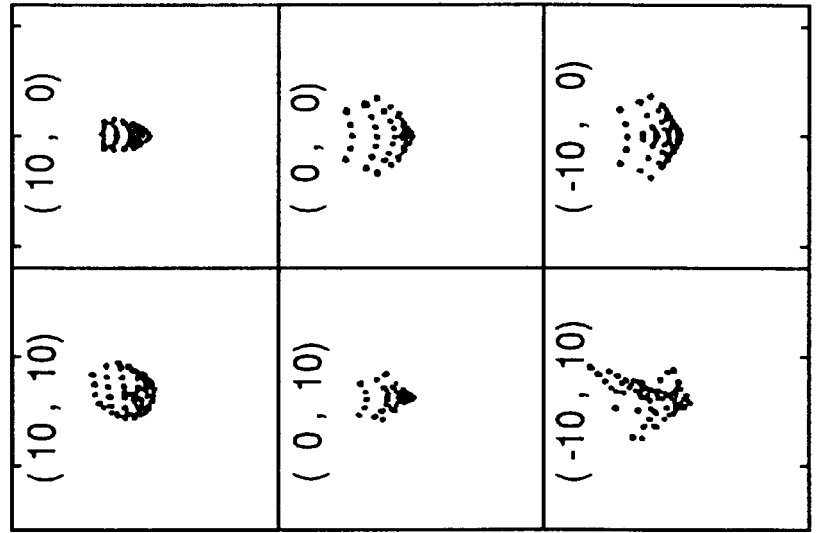
FIGS. 20A and 20B are spot diagrams obtained in the fifth embodiment.
Figure 20A:
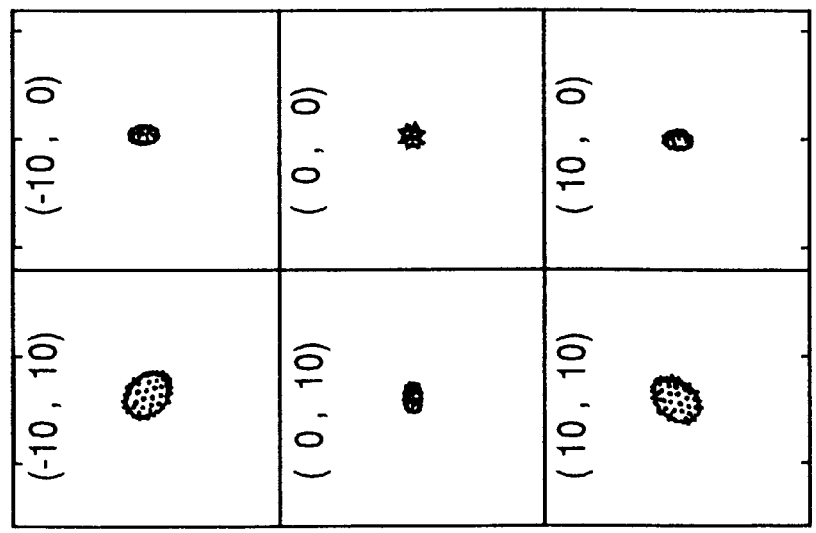
Figure 21B:
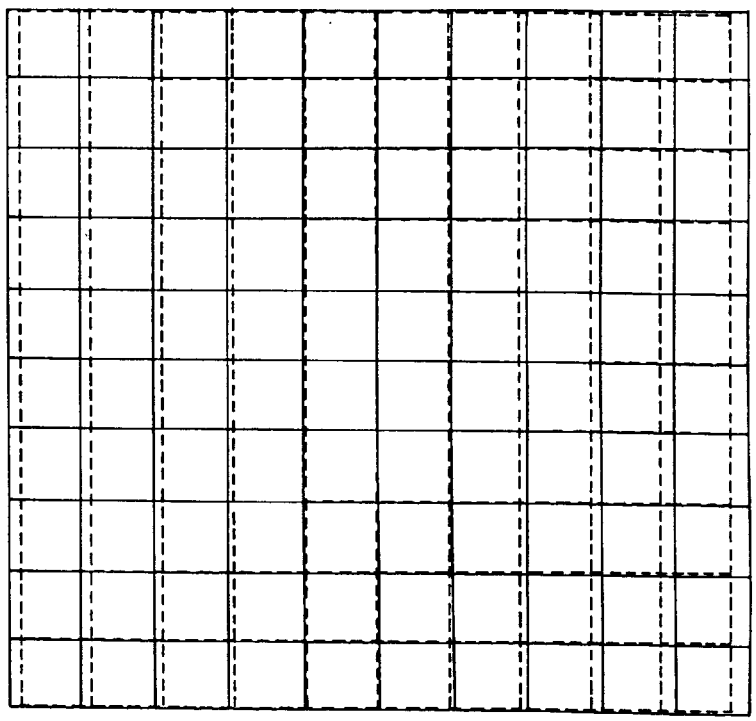
FIGS. 21A and 21B are diagrams showing the distortion observed in the fifth embodiment.
Figure 21A:
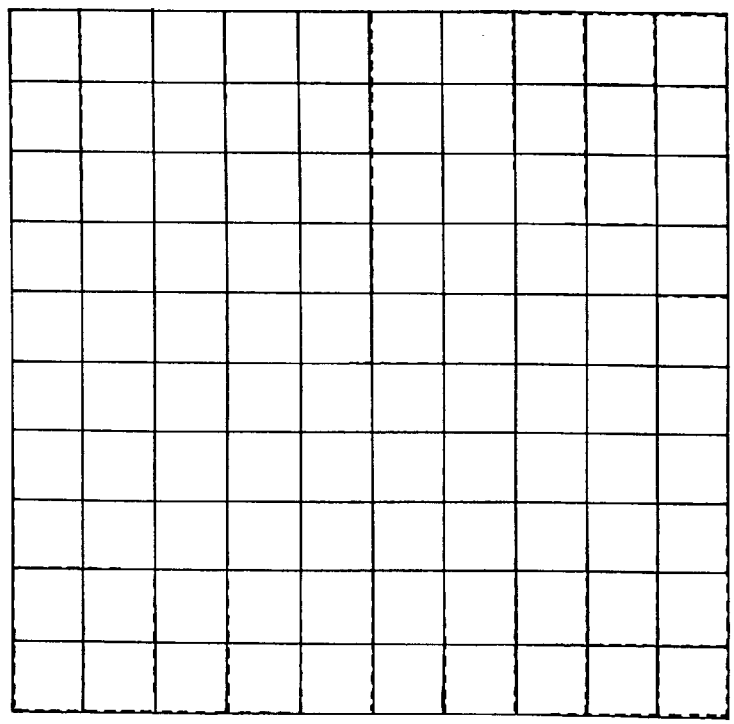

FIG. 18 shows the lens arrangement of the projecting optical system of a fifth embodiment of the present invention. In FIG. 18, ri (i=1, 2, 3, . . . ) represents the i-th lens surface from the primary image side. FIGS. 19A and 19B show the optical paths through the projecting optical system of the fifth embodiment, as observed when the secondary image plane is inclined at 0° and 6.687°, respectively. FIGS. 20A and 20B are spot diagrams obtained in the fifth embodiment, and show the positions at which light rays from the primary image plane strike the secondary image plane, as observed when the secondary image plane is inclined at 0°, and 6.687°, respectively. FIGS. 21A and 21B are diagrams showing the distortion occurring in the fifth embodiment, as observed when the secondary image plane is inclined at 0°, and 6.687°, respectively. FIGS. 21A and 21B each show the actual image (solid lines) observed on the secondary image plane when an image with a lattice pattern (a 425.20 mm by 425.20 mm square) is placed on the primary image plane, together with the ideal image (broken lines) for reference.

As shown in FIGS. 19A and 19B, the projecting optical system projects an image formed on a primary image plane 100 by an image display apparatus 11a onto a secondary image plane 90 realized as a screen 19. Here, the primary image plane 100 is a 20 mm by 20 mm square area (having a lattice pattern). As shown in FIG. 18, the projecting optical system is constituted of, from the primary image side, a first lens unit 16 composed of an aperture diaphragm 20 and lens units disposed on both sides thereof, and a second lens unit 17.

The second lens unit 17 is constructed as an afocal optical system, and is so arranged as to be rotatable about its entrance pupil. Thus, it is possible to rotate the secondary image plane 90 by rotating the second lens unit 17. The rotation of the second lens unit 17 is achieved by the use of a simple, inexpensive driving mechanism (not shown).

Moreover, the screen 19 is so arranged that its inclination angle can be adjusted by a driving mechanism (not shown).

Table 7 lists the construction data of the fifth embodiment. The same definitions of ri, di, and Ni as given in the description of Table 4 apply in Table 7. The radii of curvature (=infinity (∞)) of the both surfaces of the aperture diaphragm and the radius (in mm) of the aperture are also included in the construction data.

Listed together with the construction data, under the headings "X", "Y", and "Z" are the X-, Y-, and Z-coordinates of the centers of the first lens unit 16 (at the vertex of the surface r1), the second lens unit 17 (at the vertex of the surface r13), the primary image plane 100, and the secondary image plane 90, as represented in a coordinate system defined in the same way as for the fourth embodiment; in addition, under the heading "ANG" are listed, for the first and second lens units 16 and 17, the angles (in degrees) at which they are decentered rotationally with respect to the X-axis, and, for the primary and secondary image planes 100 and 90, the angles (in degrees) at which they are inclined with respect to the X-axis.

Moreover, for the primary image plane, its upper and lower limits in the Y-axis direction ymax and ymin and its upper and lower limits in the Z-axis direction zmax and zmin are also listed.

Note that the construction data listed in Table 7 correspond to the state of the projecting optical system as shown in FIG. 19A, that is, with the second lens unit 17 and the secondary image plane 90 (screen 19) inclined at 0°, but that the state of the projecting optical system can be changed by rotating and thereby decentering the second lens unit 17 so that the second lens unit 17 and the screen 19 are inclined, for example, at 6.687°, as shown in FIG. 19B and in Table 8 below.

Table 8 lists, under the headings "grp.17 ANG", "IMG.X", "IMG.Y", "IMG.Z", and "IMG ANGLE", the angle at which the second lens unit 17 is decentered rotationally, the X-, Y-, and Z-coordinates of the center of the secondary image plane 90, and the inclination angle of the secondary image plane 90 (screen 19), as observed in the fifth embodiment when the secondary image plane is inclined at 0°, and 6.687°.

Table 9 lists the distortion factors observed on the secondary image plane 90 in the fifth embodiment. The same definitions of symbols and expressions as given in the description of Table 6 apply in Table 9.

From Table 9 and FIGS. 21A and 21B, it will be understood that trapezoid distortion and other distortion are satisfactorily corrected in the image formed on the secondary image plane by the projecting optical system of the fifth embodiment. Moreover, it is also understood that, even when the second lens unit 17 is decentered rotationally in accordance with the inclination of the screen 19, the condition of distortion on the secondary image plane, as well as the image magnification, is kept substantially unchanged.

Figure 22A:
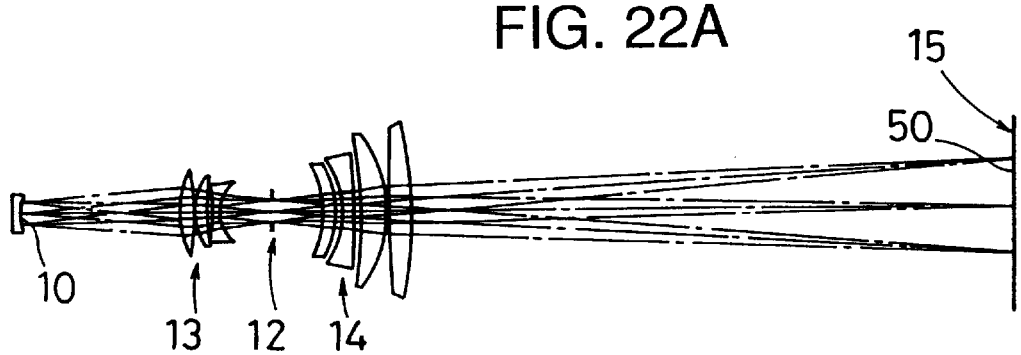
FIGS. 22A to 22C are diagrams showing examples in which the primary image plane is moved translationally in accordance with the rotation of the secondary image plane in the fifth embodiment.
Figure 22B:
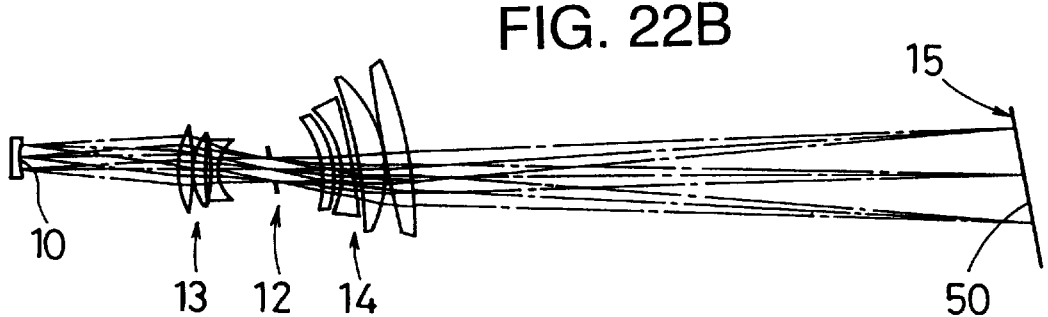
Figure 22C:
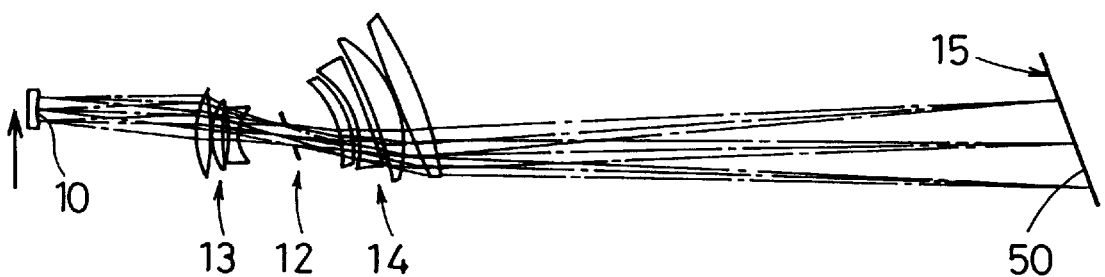

FIGS. 22A to 22C show how, in the fifth embodiment, the movement of the center of the secondary image plane due to its rotation is suppressed when the primary image plane 10 is moved translationally in accordance with the rotation of the secondary image plane by a driving mechanism (not shown). As seen from FIGS. 22A to 22C and Table 10, it is possible to suppress the movement of the center of the secondary image plane by moving the center of the primary image plane translationally. In Table 10, under the heading "OBJ.Y" are listed the distance by which the primary image plane 10 is moved translationally in the Y-axis direction.

Figure 23:
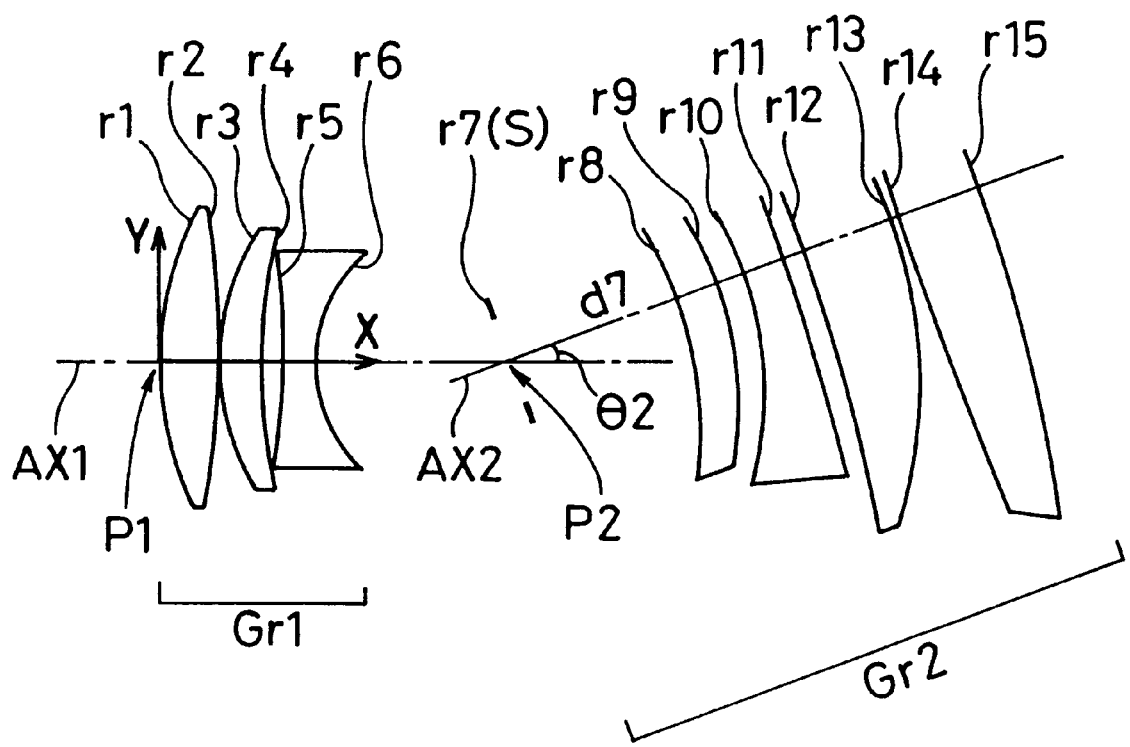
FIG. 23 is a diagram showing the lens arrangement of the projecting optical system of a sixth embodiment of the present invention.
Figure 25:
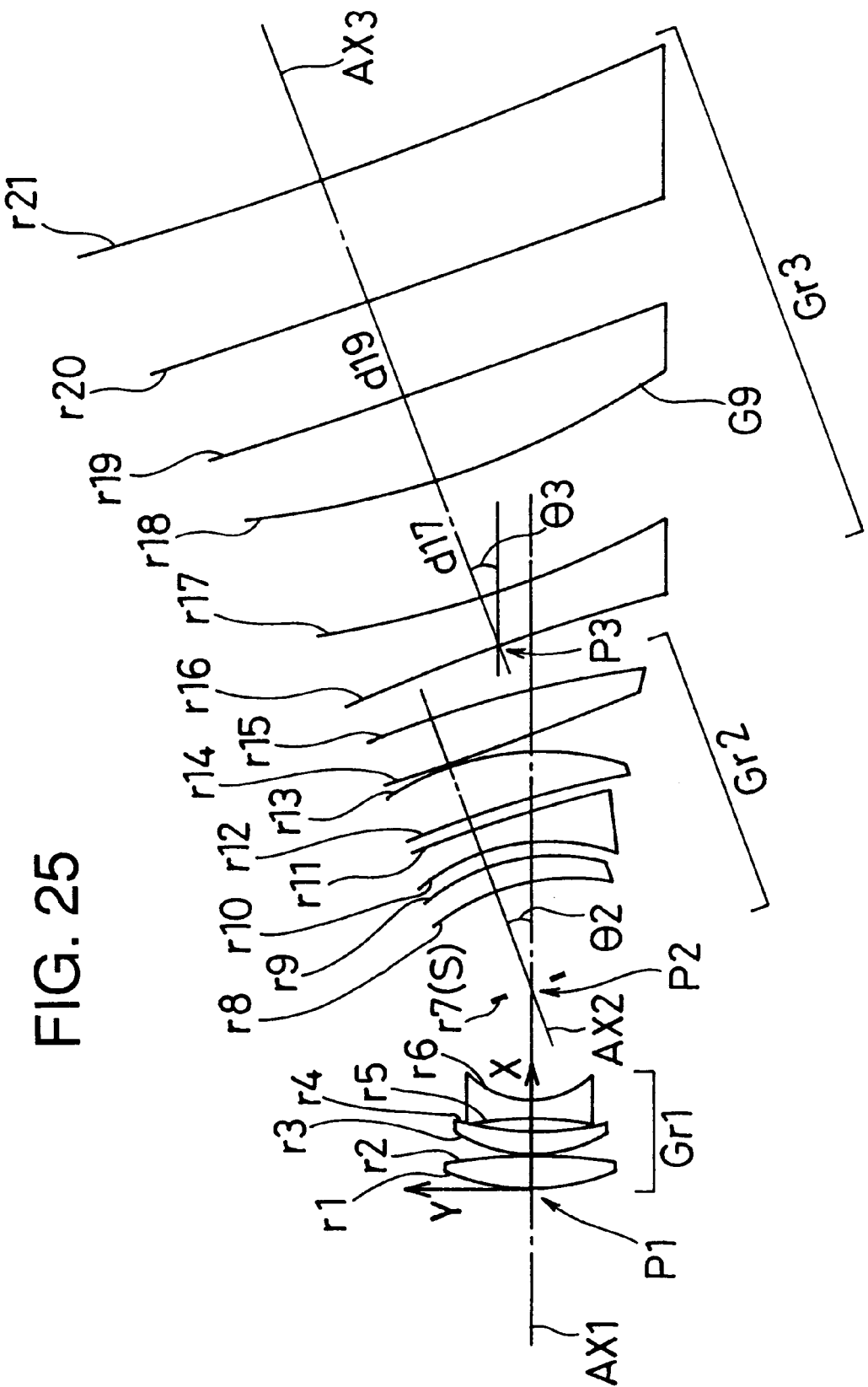
FIG. 25 is a diagram showing the lens arrangement of the projecting optical systems of seventh and eighth embodiments of the present invention.
Figure 28:
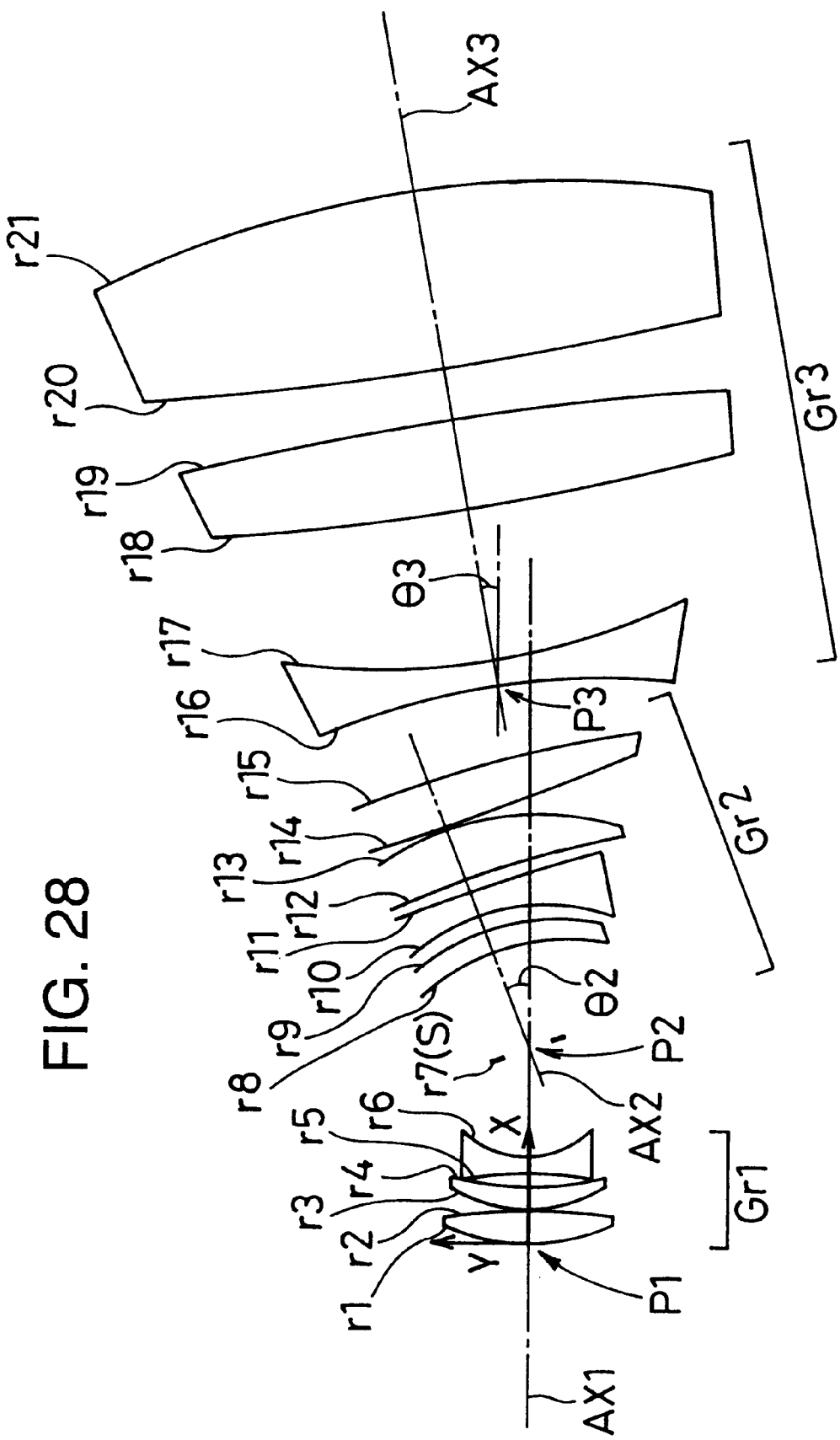
FIG. 28 is a diagram showing the lens arrangement of the projecting optical system of a ninth embodiment of the present invention.

FIG. 23 shows the lens arrangement of the projecting optical system of a sixth embodiment of the present invention, FIG. 25 shows the lens arrangement of the projecting optical systems of seventh and eight embodiments of the present invention, and FIG. 28 shows the lens arrangement of the projecting optical system of a ninth embodiment of the present invention, each figure illustrating the X-Y cross section of the projecting optical system. The projecting optical systems of the sixth to ninth embodiments are each constructed as an optical system that is not symmetrical about its optical axis, and accordingly the optical axes AX1 to AX3 (i.e. axes of symmetry) of the lens units Gr1 to Gr3 each constructed as a centered optical system do not coincide with one another. In the lens arrangement diagrams FIGS. 23, 25, and 28, the X-axis is perpendicular to the Y-axis (the X-Y plane is parallel to the plane of the figures), and the optical axis AX1 of the first lens unit Gr1 coincides with the X-axis.

FIGS. 24A and 24B, 26A and 26B, 27A and 27B, and 29A and 29B show the optical paths through the projecting optical systems of the sixth to ninth embodiments, respectively. In these diagrams, OS represents a primary image plane realized, for example, as a surface of an image display device, and IS represents a secondary image plane on which an image is projected in each embodiment. Of these optical path diagrams, FIGS. 24A, 26A, 27A, and 29A illustrate the optical paths as observed in each embodiment when the projecting optical system is focused for the secondary image plane placed at a reference position, and FIGS. 24B, 26B, 27B, and 29B illustrate the optical paths as observed in each embodiment when the projecting optical system is focused for the secondary image plane placed at a close position.

In the lens arrangement diagrams FIGS. 23, 25, and 28, ri (i=1, 2, 3, . . . ) represents the radius of curvature of the i-th surface from the primary image plane OS side, and P1 to P3 represent the vertex of the first surface of the lens units Gr1 to Gr3, respectively. In all of the sixth to ninth embodiments, the vertex P2 of the second lens unit Gr2 is located on the optical axis AX1. In seventh to ninth embodiments, the vertex P3 of the third lens unit Gr3 is located a predetermined distance away in the Y-axis direction from the optical axis AX1; in addition, the second and third lens units Gr2 and Gr3 are arranged at angles to the optical axis AX1 about their respective vertices P2 and P3. The angles that the optical axes AX2 and AX3 make with the optical axis AX1 are represented by θ2 and θ3, respectively.

In the optical path diagrams FIGS. 24A and 24B, 26A and 26B, 27A and 27C, and 29A and 29B, PO represents the center of the primary image plane OS, and PI represents the center of the secondary image plane. The optical axis AX1 of the first lens unit Gr1 is perpendicular to the primary image plane OS (i.e. the primary image plane OS coincides with the Y-Z plane), and an image on the primary image plane OS is projected on the secondary image plane IS such that the secondary image plane IS is inclined with respect to the primary image plane OS. In these optical path diagrams, the angle at which the secondary image plane IS is inclined with respect to the primary image plane is represented by θI.

The projecting optical system of the sixth embodiment is constituted of two lens units, that is, a first lens unit Gr1, and a second lens unit Gr2 including an aperture diaphragm S. The second lens unit Gr2 is decentered at an angle of θ2 with respect to the first lens unit Gr1. All the elements composing the second lens unit Gr2, except the aperture diaphragm S, are used as a focusing lens unit GrF. As shown in FIG. 24A, focusing is achieved by moving the focusing lens unit GrF translationally along the optical axis AX2 (in the direction indicated by arrow mF). The optical axis AX2 is perpendicular to the secondary image plane IS, and, during focusing, the secondary image plane IS is moved translationally from a reference position (FIG. 24A) to a close position (FIG. 24B) in the same direction as the movement of the focusing lens unit GrF, with the inclination angle θI kept unchanged.

The projecting optical system of the seventh embodiment is constituted of three lens units, that is, a first lens unit Gr1, a second lens unit Gr2 including an aperture diaphragm S, and a third lens unit Gr3. The second lens unit Gr2 is decentered at an angle of θ2 with respect to the first lens unit Gr1, and the third lens unit Gr3 is decentered at an angle of θ3 with respect to the first lens unit Gr1. The entire third lens unit Gr3 is used as a focusing lens unit GrF. As shown in FIG. 26A, focusing is achieved by moving the focusing lens unit GrF translationally along the optical axis AX3 (in the direction indicated by arrow mF). The optical axis AX3 is perpendicular to the secondary image plane IS, and, during focusing, the secondary image plane IS is moved translationally from a reference position (FIG. 26A) to a close position (FIG. 26B) in the direction opposite to the movement of the focusing lens unit GrF, with the inclination angle θI kept unchanged.

The projecting optical system of the eighth embodiment has the same construction as that of the seventh embodiment except for the focusing method it uses. Specifically, it is constituted of three lens units, that is, a first lens unit Gr1, a second lens unit Gr2 including an aperture diaphragm S, and a third lens unit Gr3. The second lens unit Gr2 is decentered at an angle of θ2 with respect to the first lens unit Gr1, and the third lens unit Gr3 is decentered at an angle of θ3 with respect to the first lens unit Gr1. A lens element G9 included in the third lens unit Gr3 is used as a focusing lens unit GrF. As shown in FIG. 27A, focusing is achieved by moving the focusing lens unit GrF translationally along the optical axis AX3 (in the direction indicated by arrow mF).

The optical axis AX3 is perpendicular to the secondary image plane IS, and, during focusing, the secondary image plane IS is moved translationally from a reference position (FIG. 27A) to a close position (FIG. 27B) in the same direction as the movement of the focusing lens unit GrF, with the inclination angle θI kept unchanged.

The projecting optical system of the ninth embodiment is constituted of three lens units, that is, a first lens unit Gr1, a second lens unit Gr2 including an aperture diaphragm S, and a third lens unit Gr3 constructed as a substantially afocal optical system. The second lens unit Gr2 is decentered at an angle of θ2 with respect to the first lens unit Gr1, and the third lens unit Gr3 is decentered at an angle of θ3 with respect to the first lens unit Gr1. The entire third lens unit Gr3 is used as a focusing lens unit GrF. As shown in FIG. 29A, focusing is achieved by moving the focusing lens unit GrF translationally along the optical axis AX3 (in the direction indicated by arrow mF). The optical axis AX3 is slanted with respect to the secondary image plane IS (i.e. not perpendicular thereto), and, during focusing, the secondary image plane IS is moved translationally from a reference position (FIG. 29A) to a close position (FIG. 29B) in the direction opposite to the movement of the focusing lens unit GrF, with the inclination angle θI kept unchanged.

As described above, in all of the sixth to ninth embodiments, the projecting optical system is constructed as an optical system that is not symmetrical about its optical axis and that includes centered optical systems of which at least one is decentered from the other, so that it projects an image formed on a primary image plane IS onto a secondary image plane such that the secondary image plane IS is inclined with respect to the primary image plane OS. Moreover, the projecting optical systems of these embodiments are characterized in that they achieve focusing by moving the focusing lens unit GrF translationally and thereby moving the secondary image plane IS translationally with its inclination angle with respect to the primary image plane OS kept unchanged.

In the sixth to ninth embodiments, since the secondary image plane IS is moved translationally with its inclination angle with respect to the primary image plane OS kept unchanged, movement of the focusing lens unit GrF does not cause trapezoid distortion in the projected image. The reason can be explained as follows, if we take the seventh embodiment as an example. In the seventh embodiment, the first and second lens units Gr1 and Gr2, which are disposed on the entrance side of the focusing lens unit GrF, first forms an intermediate image free from trapezoid distortion. As the focusing lens unit GrF is moved translationally, the secondary image plane IS changes its position but keeps its inclination angle θI equal to that of the plane on which the above intermediate image is formed. In other words, the focusing lens unit GrF serves as a centered relay optical system having the above intermediate image plane as its primary image plane and having the image plane corresponding to that plane as its secondary image plane. Accordingly, translational movement of the focusing lens unit GrF never causes trapezoid distortion.

Moreover, in the sixth to ninth embodiments, since focusing is achieved by the translational movement of the focusing lens unit GrF, driving the focusing lens unit GrF does not require the use of a complicated mechanism. That is, it is not necessary to use a driving mechanism for achieving complicated movement, including rotation, of the focusing lens unit GrF. Thus, since focusing is achieved by the use of a simple mechanism, it is possible to realize a compact and inexpensive projecting optical system.

In the ninth embodiment, where the focusing lens unit GrF (the third lens unit Gr3) is constructed as a substantially afocal optical system, even if the optical axis AX3 of the afocal optical system is slanted with respect to the intermediate image (i.e. not perpendicular thereto) formed by the first and second lens units Gr1 and Gr2, no trapezoid distortion appears in the image projected onto the corresponding secondary image plane IS, as long as the intermediate image is free from trapezoid distortion. Thus, the use of an afocal optical system as a relay optical system contributes to effective suppression of trapezoid distortion accompanying focusing. The reason is as follows.

When the focusing lens unit GrF is constructed as an afocal optical system, the angle between its input image plane (corresponding to the above intermediate image plane) from which it receives light of an image and its output image plane (corresponding to the above secondary image plane IS) to which it emits the light of the image depends on the angle between the input image plane and the optical axis (corresponding to the optical axis AX3 in the ninth embodiment) of the afocal optical system as well as on the magnification of the afocal optical system. Accordingly, when the afocal optical system is moved translationally without changing the angle between its input image plane and its optical axis, the output image plane of the afocal optical system changes its position but keeps its inclination angle. Thus, it is possible to move the secondary image plane IS translationally simply by moving translationally the focusing lens unit GrF constructed as an afocal optical system.

Furthermore, by inclining the afocal optical system with respect to its input image plane, it is possible to correct the inclination of its output image plane IS and anamorphic ratio. Moreover, during focusing by the use of an afocal optical system as in the ninth embodiment, the image magnification does not vary with the position of the secondary image plane IS. Accordingly, a projecting optical system employing an afocal optical system as its focusing lens unit GrF is suitable for use in apparatuses such as a backward-projection-type projector in which it is necessary to adjust the position of the secondary image plane IS without changing the image magnification.

It is preferable, as in the sixth, seventh, and ninth embodiments, that the focusing lens unit GrF be disposed at the secondary image plane IS side end. When the focusing lens unit GrF is disposed at the secondary image plane IS side end, there is not any lens unit that causes trapezoid distortion on the exit side of the focusing lens unit GrF. Accordingly, it is possible to use only the optical systems disposed on the entrance side of the focusing lens unit GrF for the correction of trapezoid distortion, and thus it is possible to separately design the focusing lens unit GrF as a lens unit dedicated to focusing.

Furthermore, as long as trapezoid distortion is corrected by the optical systems disposed on the entrance side of the focusing lens unit GrF, even when the optical axis AX3 of the afocal optical system is not perpendicular to the secondary image plane IS as in the ninth embodiment, it is possible to move the secondary image plane IS translationally, without causing trapezoid distortion in the projected image, simply by moving translationally the focusing lens unit GrF disposed on the secondary image plane IS side end. Moreover, when the focusing lens unit GrF is disposed at the secondary image plane IS side end, it is possible to adjust the inclination of the output image plane IS and the anamorphic ratio of the afocal optical system more easily.

To obtain a sufficient movement distance of the secondary image plane IS with a minimal movement distance of the focusing lens unit GrF during focusing, it is necessary to increase the image magnification by giving a certain degree of optical power to the focusing lens unit GrF. To make it possible to increase the image magnification by giving optical power to the focusing lens unit GrF without incurring variation of trapezoid distortion in the projected image during focusing, it is preferable, as in the sixth and seventh embodiments, that the primary image plane (input image plane) and the secondary image plane (output image plane) as seen from the focusing lens unit GrF be substantially centered with respect to the focusing lens unit GrF, that is, the input and output image planes be perpendicular to the optical axis of the focusing lens unit GrF. This is achieved by correcting as much trapezoid distortion as possible with the optical systems disposed on the entrance side of the focusing lens unit GrF, and in addition by disposing the focusing lens unit GrF perpendicularly to the secondary image plane IS. In this way, it is possible to suppress variation of trapezoid distortion during focusing.

Not only in the sixth and seventh embodiments, where the focusing lens unit GrF having optical power is disposed at the secondary image plane IS side end, but also in the eighth embodiment, where the lens element G9 included in the third lens unit Gr3 is used as the focusing lens unit GrF and the optical axis AX3 of the third lens unit Gr3 is substantially perpendicular to the secondary image plane IS (i.e. an optical system centered with the focusing lens unit GrF is disposed on the exit side of the focusing lens unit GrF), the primary image plane (input image plane) and the secondary image plane (output image plane) as seen from the focusing lens unit GrF are substantially centered with respect to the focusing lens unit GrF, just as described above. Thus, since there is no element, on the exit side of the focusing lens unit GrF, that causes trapezoid distortion in the projected image, it is possible to correct variation of trapezoid distortion in the projected image more easily.

It is preferable, as in the sixth to eighth embodiments, that the focusing lens unit GrF is moved along its optical axis (axis of symmetry). Moving the focusing lens unit GrF along its optical axis eliminates off-axial coma that might result from translational decentering of the focusing lens unit GrF. Thus, it is possible to achieve focusing without degrading optical performance.

Moreover, in the sixth embodiment, where focusing is achieved by the second lens unit Gr2 disposed at the secondary image plane IS side end, and where the focusing lens unit GrF receives, on its primary image plane OS side, substantially parallel light rays (from object points at infinity), the position of the secondary image plane IS changes with focusing, but the image magnification does not. Accordingly, this construction is suitable for use in apparatuses such as a backward-projection-type projector in which it is necessary to adjust the position of the secondary image plane IS without changing the image magnification.

Heretofore, the projecting optical systems of the sixth to ninth embodiments have been described as enlargement projecting optical systems for projecting an image onto a screen, but they can be used as reduction projecting optical systems as well (for example, as taking optical systems for projecting an image onto film, or as image input optical systems for projecting an image onto a CCD or the like). In other words, all of these projecting optical systems can achieve focusing even when the primary and secondary image planes OS and IS are interchanged, without any modification in their construction In projecting optical systems for use in HMDs (head-mounted displays) and HUDs (headup displays), a decentered mirror is used to widen their angle of view, and in some cases it causes trapezoid distortion. The projecting optical systems of the sixth to ninth embodiments can be used also in such HMDs and HUDs to achieve focusing without causing trapezoid distortion in the projected image.

Tables 11 to 13 list the construction data of the projecting optical systems of the sixth embodiment (FIG. 23), of the seventh and eighth embodiments (FIG. 25), and of the ninth embodiment (FIG. 28), respectively. In Tables 11 to 13, ri (i=1, 2, 3, . . . ) represents the radius of curvature of the i-th surface from the primary image plane OS side, di (i=1, 2, 3, . . . ) represents the i-th axial distance from the primary image plane OS side, and Ni (i=1, 2, 3, . . . ) represents the refractive index (Nd) for d-lines of the i-th lens element from the primary image plane OS side.

In Tables 11 to 13, the position of each element is represented by its absolute coordinate values (X, Y, Z) in a coordinate system as shown in the corresponding lens arrangement diagram (FIGS. 23, 25, and 28), that is, a coordinate system whose X- and Y-axes are perpendicular to each other (the X-Y plane is parallel to the plane of the figures) and whose Z-axis is perpendicular to both of the X- and Y-axes. As described previously, in the sixth to ninth embodiments, the lens units Gr1 to Gr3 are each constructed as an independent centered optical system, and, in the lens arrangement diagrams of these embodiments, AX1 represents the optical axis of the first lens unit Gr1 (this axis coincides with the X-axis), AX2 represents the optical axis of the second lens unit Gr2, and AX3 represents the optical axis of the third lens units Gr3.

Moreover, P1 represents the vertex of the first surface (having a radius of curvature of r1) of the first lens unit Gr1, P2 represents the vertex of the first surface (having a radius of curvature of r7) of the second lens unit Gr2, and P3 represents the vertex of the first surface (having a radius of curvature of r16) of the third lens unit Gr3. The coordinates (X, Y, Z) of the vertex P1 are represented as (X1, Y1, Z1), those of the vertex P2 as (X2, Y2, Z2), and those of the vertex P3 as (X3, Y3, Z3). Note that the vertex P1 is used as the origin of the above-noted coordinate system, and therefore has the coordinate values (X1, Y1, Z1)=(0.000, 0.000, 0.000).

As described previously, the optical axis AX1 of the first lens unit Gr1 coincides with the X-axis, and the angles of the optical axes AX2 and AX3 of the second and third lens units Gr2 and Gr3 with respect to the optical axis AX1 of the first lens unit Gr1 are represented by θ2 and θ3 (°), respectively. In other words, the inclination angles θ2 and θ3 (°) of the optical axes AX2 and AX3 are represented by the rotational angles (with clockwise rotation angles positive) through which the second and third lens units Gr2 and Gr3 are rotated about their respective vertices P2 and P3 in the X-Y plane with respect to the inclination angle θ1 (=0.000) of the optical axis AX1.

As described previously, in the optical path diagrams of the sixth to ninth embodiments (FIGS. 24A and 24B, 26A and 26B, 27A and 27C, and 29A and 29B), PO represents the center of the primary image plane OS, and PI represents the center of the secondary image plane. The coordinates (X, Y, Z) of the center PO are represented as (XO, YO, ZO), and those of the center PI as (XI, YI, ZI). Since the primary image plane OS is realized as the display surface or the like of an image display device, it is convenient to represent the size of the display surface with the coordinates of its four corners. Specifically, the maximum and minimum Y-coordinates of the display surface on the primary image plane OS are represented as Ymax and Ymin, and the maximum and minimum Z-coordinates of the display surface on the primary image plane OS are represented as Zmax and Zmin.

Moreover, as described previously, since the optical axis AX1 is perpendicular to the primary image plane OS (i.e. the primary image plane OS coincides with the Y-Z plane), the inclination of the secondary image plane IS is represented by its inclination angle with respect to the primary image plane OS. In other words, the inclination angle θI (°) of the secondary image plane IS is represented by the rotation angle (with a clockwise rotation angle positive) through which the secondary image plane IS is rotated about its center PI in the X-Y plane.

Of the axial distances, the positions of the lens units, and the position of the secondary image plane listed in the construction data of the sixth to ninth embodiments (Tables 11 to 13), those that vary with the movement of the focusing lens unit GrF are each represented with two or more values obtained in different focus states as shown in the corresponding optical path diagrams (FIGS. 24A and 24B, 26A and 26B, 27A and 27C, and 29A and 29B). Specifically, the values obtained when the secondary image plane IS is placed at the reference position are marked with (A), and those obtained when the secondary image plane IS is placed at the close position are marked with (B) or (C).

In the sixth embodiment, as shown in FIGS. 24A and 24B, focusing is achieved by moving the focusing lens unit GrF (composed of all the elements other than the aperture diaphragm S of the second lens unit Gr2) included in the second lens unit Gr2 in the direction indicated by arrow mF (along the optical axis AX2). By focusing, the secondary image plane IS is moved from the reference position (FIG. 24A) to the close position (FIG. 24B) through a distance of 9.189 mm in the same direction as the movement (indicated by arrow mF) of the focusing lens unit GrF.

In the seventh embodiment, as shown in FIGS. 26A and 26B, focusing is achieved by moving the entire third lens unit Gr3 as the focusing lens unit GrF in the direction indicated by arrow mF (along the optical axis AX3). By focusing, the secondary image plane IS is moved from the reference position (FIG. 26A) to the close position (FIG. 26B) through a distance of 60.514 mm in the direction opposite to the movement (indicated by arrow mF) of the focusing lens unit GrF.

In the eighth embodiment, as shown in FIGS. 27A and 27C, focusing is achieved by moving the lens element G9 included in the third lens unit Gr3 as the focusing lens unit GrF in the direction indicated by arrow mF (along the optical axis AX3). By focusing, the secondary image plane IS is moved from the reference position (FIG. 27A) to the close position (FIG. 27B) through a distance of 15.475 mm in the same direction as the movement (indicated by arrow mF) of the focusing lens unit GrF.

In the ninth embodiment, as shown in FIGS. 29A and 29B, focusing is achieved by moving the entire third lens unit Gr3 as the focusing lens unit GrF in the direction indicated by arrow mF (along the optical axis AX3). By focusing, the secondary image plane IS is moved from the reference position (FIG. 29A) to the close position (FIG. 29B) through a distance of 31.654 mm in the direction opposite to the movement (indicated by arrow mF) of the focusing lens unit GrF.

Figure 30A:
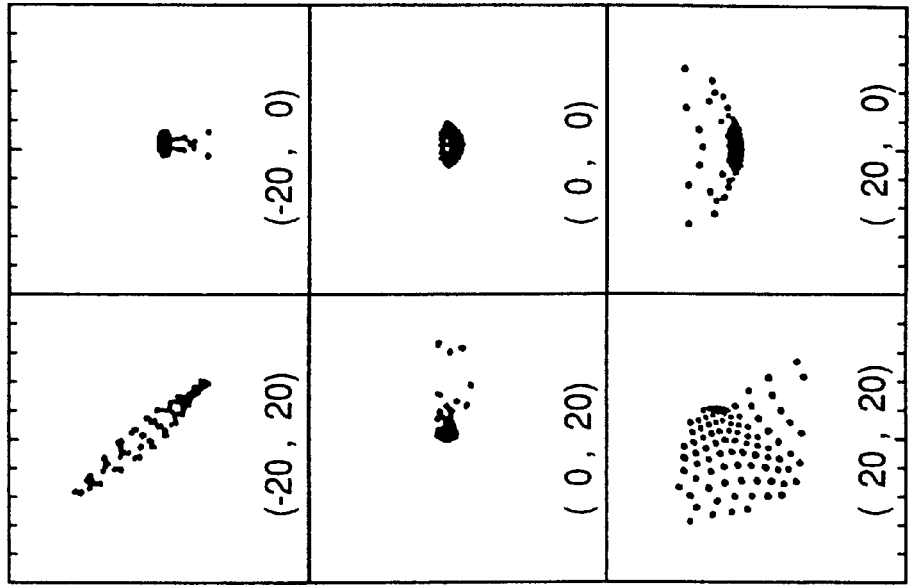
FIGS. 30A and 30B are spot diagrams obtained in the sixth embodiment when the projecting optical system is focused for the secondary image plane placed at the reference position and at the close position.
Figure 30B:
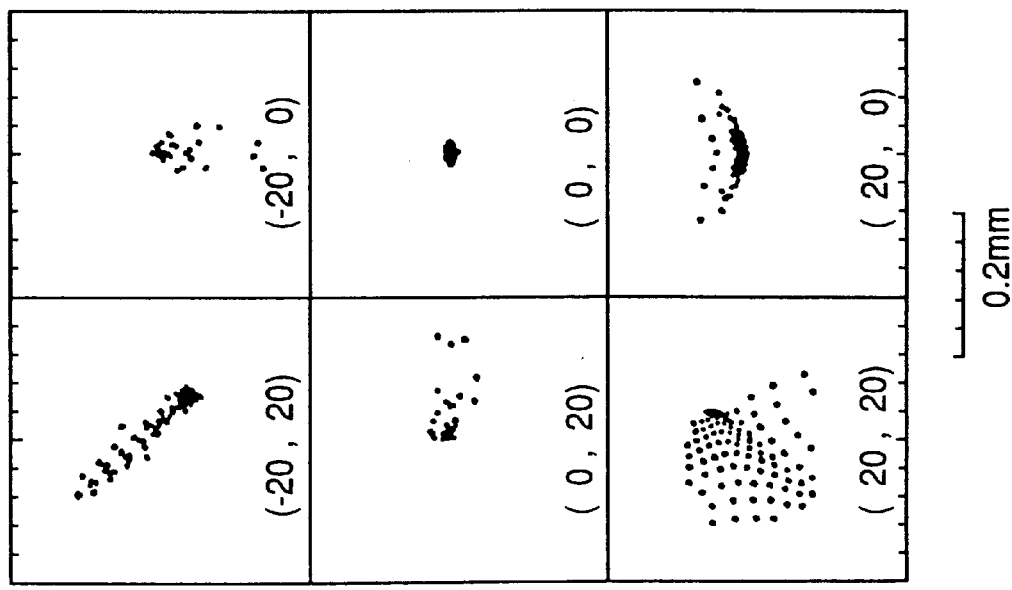
Figure 32C:
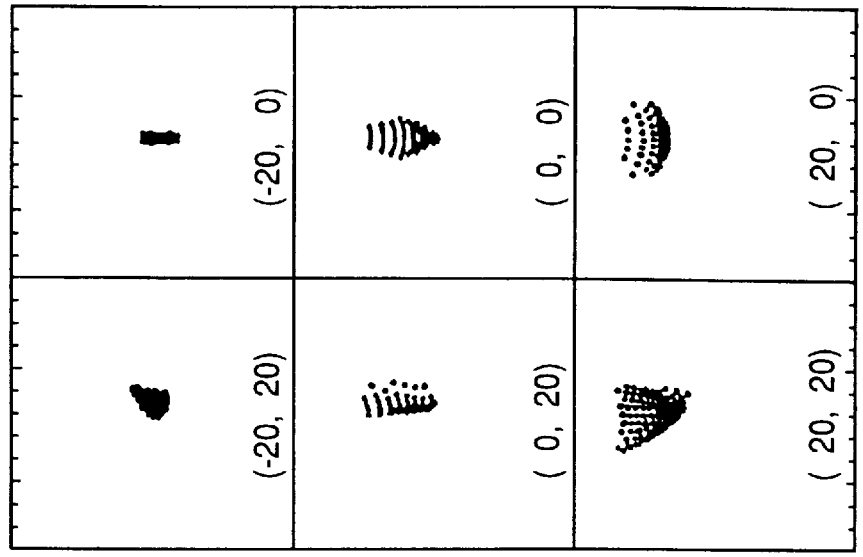
Figure 32B:
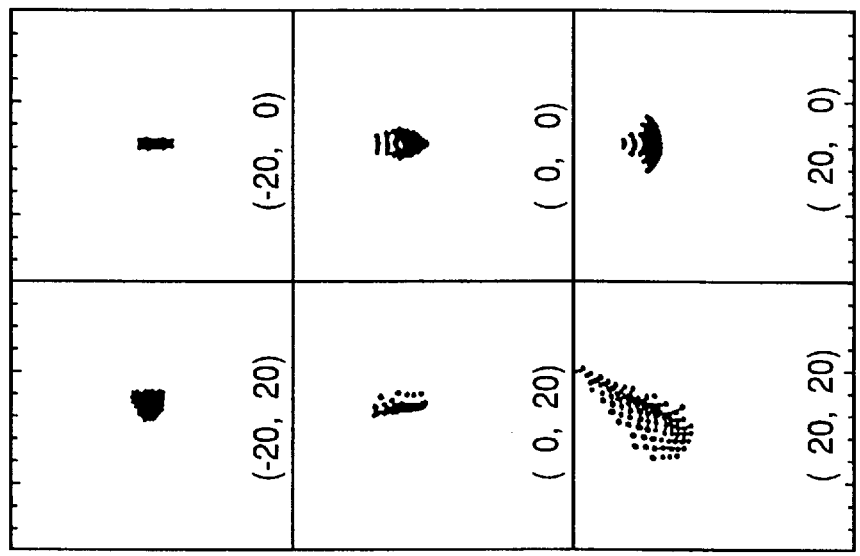
FIGS. 32A and 32B are spot diagrams obtained in the seventh embodiment when it is focused for the secondary image plane placed at the reference position and at the close position.
Figure 32A:
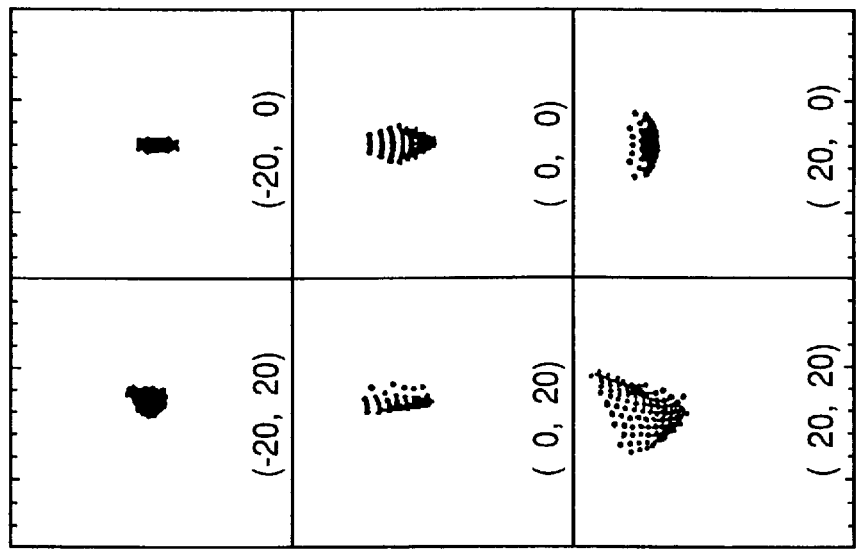
Figure 34A:
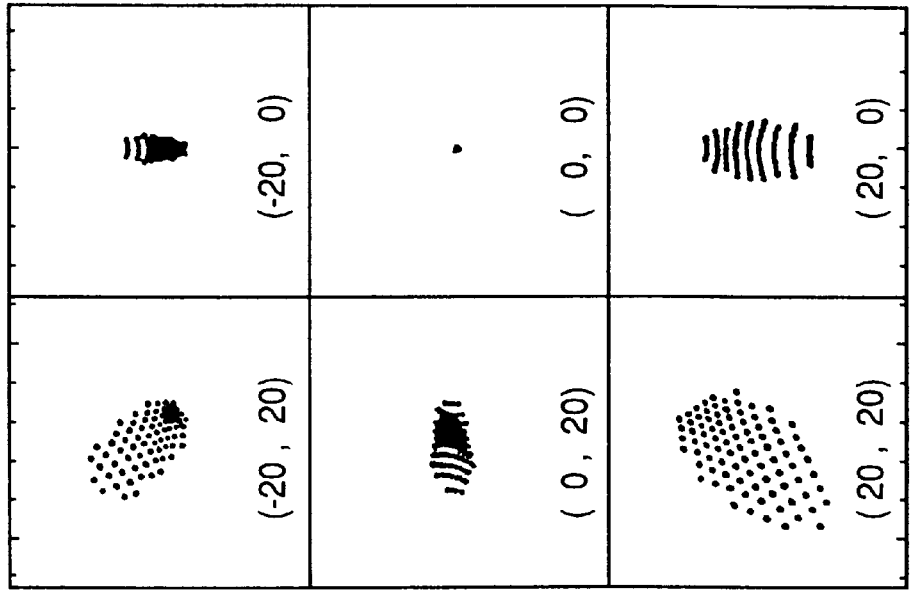
FIGS. 34A and 34B are spot diagrams obtained in the ninth embodiment when the projecting optical system is focused for the secondary image plane placed at the reference position and at the close position.
Figure 34B:
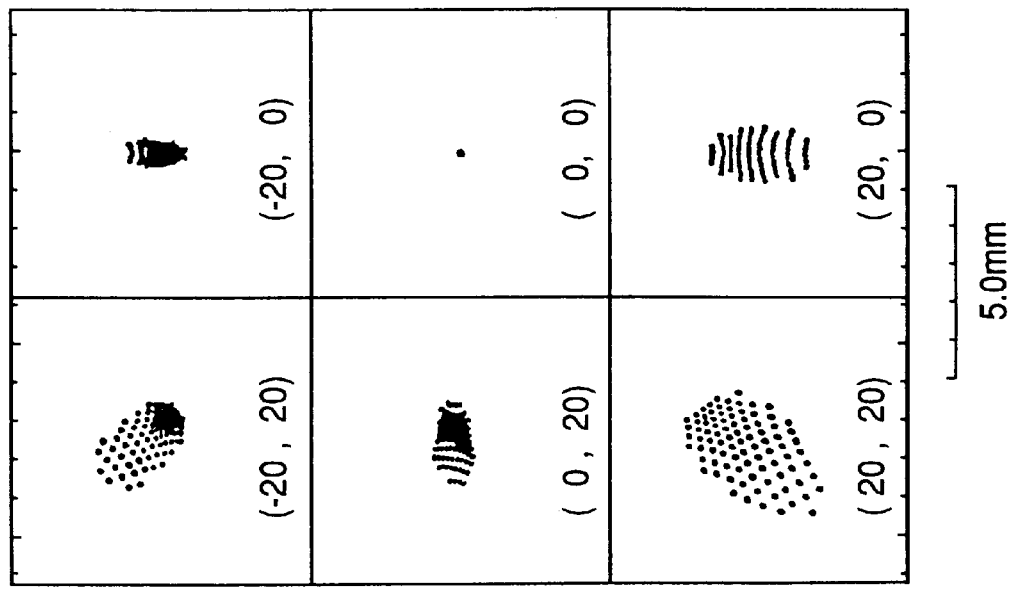

The imaging performance obtained in the sixth embodiment when the secondary image plane IS is placed at the reference position (FIG. 24A) and at the close position (FIG. 24B) is shown in FIGS. 30A and 30B, respectively, in the form of a set of spot diagrams. The imaging performance obtained in the seventh embodiment when the secondary image plane IS is placed at the reference position (FIG. 26A) and at the close position (FIG. 26B) is shown in FIGS. 32A and 32B, respectively, in the form of a set of spot diagrams. The imaging performance obtained in the eighth embodiment when the secondary image plane IS is placed at the reference position (FIG. 27A) and at the close position (FIG. 27B) is shown in FIGS. 32A and 32C, respectively, in the form of a set of spot diagrams. The imaging performance obtained in the ninth embodiment when the secondary image plane IS is placed at the reference position (FIG. 29A) and at the close position (FIG. 29B) is shown in FIGS. 34A and 34B, respectively, in the form of a set of spot diagrams. Each set of spot diagrams include spot diagrams corresponding, from the top right diagram downward and then from the top left diagram downward, to the object heights (Y, Z) of (−20, 0), (0, 0), (20, 0), (−20, 20), (0, 20), (20, 20).

Figure 31B:
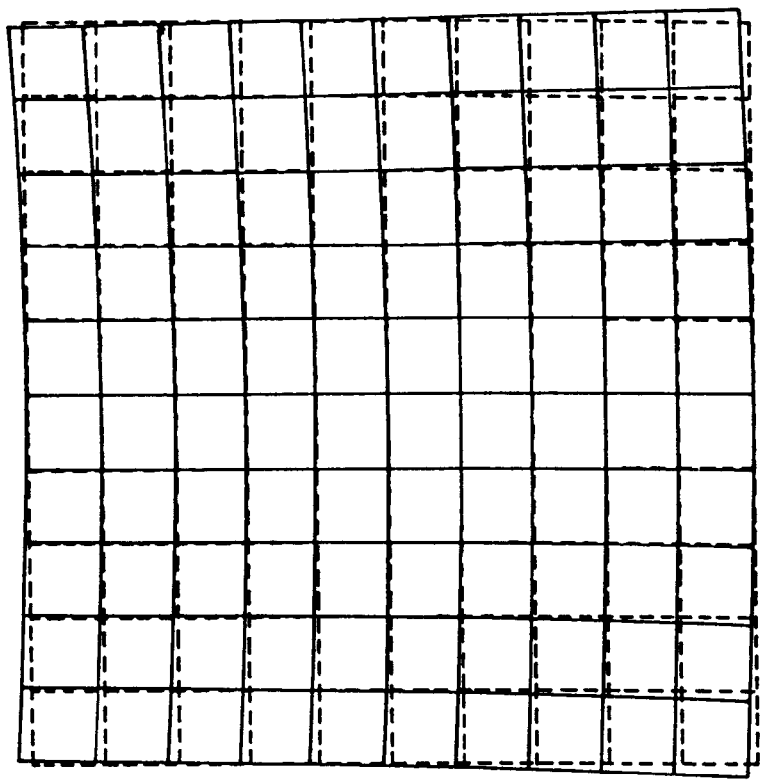
FIGS. 31A and 31B are diagrams showing the distortion observed in the sixth embodiment when the projecting optical system is focused for the secondary image plane placed at the reference position and at the close position.
Figure 31A:
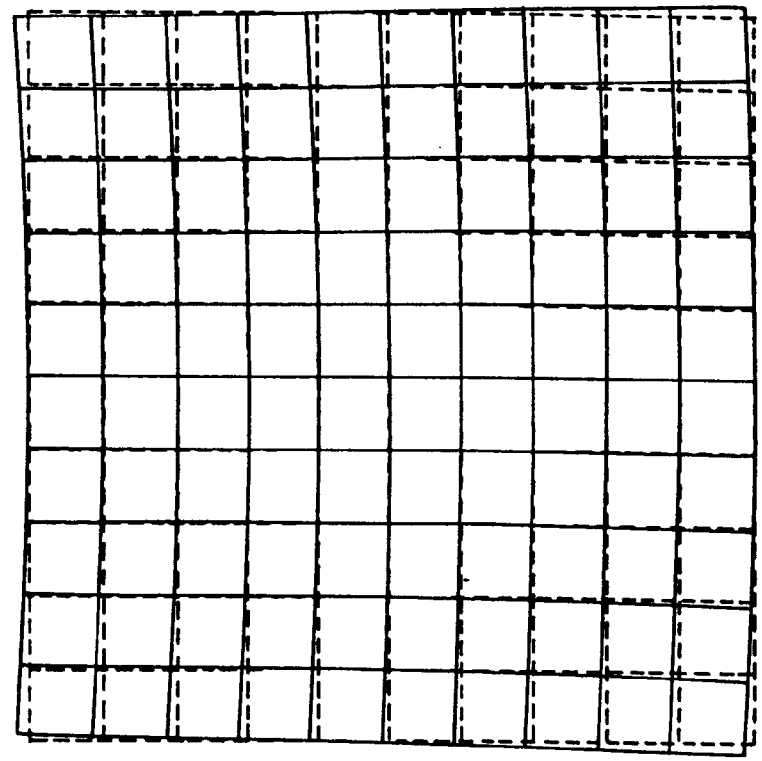

The distortion observed in the sixth embodiment when the secondary image plane IS is placed at the reference position (FIG. 24A) and at the close position (FIG. 24B) is shown in FIGS. 31A and 31B, respectively. In these distortion diagrams, solid lines represent the actually observed image including distortion, whereas broken lines represent the ideal image free from distortion. Here, the image display device placed on the primary image plane OS has a surface of 40 mm by 40 mm, and the size of the secondary image plane IS is ideally 160.1 mm by 163.4 mm when it is placed at the reference position, and 160.3 mm by 163.6 mm when it is placed at the close position.

The distortion observed in the seventh embodiment when the secondary image plane IS is placed at the reference position (FIG. 26A) and at the close position (FIG. 26B) is shown in FIGS. 33A and 33B, respectively. In these distortion diagrams, solid lines represent the actually observed image including distortion, whereas broken lines represent the ideal image free from distortion. Here, the image display device placed on the primary image plane OS has a surface of 40 mm by 40 mm, and the size of the secondary image plane IS is ideally 325.7 mm by 334.4 mm when it is placed at the reference position, and 312.9 mm by 321.3 mm when it is placed at the close position.

The distortion observed in the eighth embodiment when the secondary image plane IS is placed at the reference position (FIG. 27A) and at the close position (FIG. 27B) is shown in FIGS. 33A and 33C, respectively. In these distortion diagrams, solid lines represent the actually observed image including distortion, whereas broken lines represent the ideal image free from distortion. Here, the image display device placed on the primary image plane OS has a surface of 40 mm by 40 mm, and the size of the secondary image plane IS is ideally 325.7 mm by 334.4 mm (the same as in the seventh embodiment) when it is placed at the reference position, and 327.5 mm by 335.2 mm when it is placed at the close position.

Figure 35B:
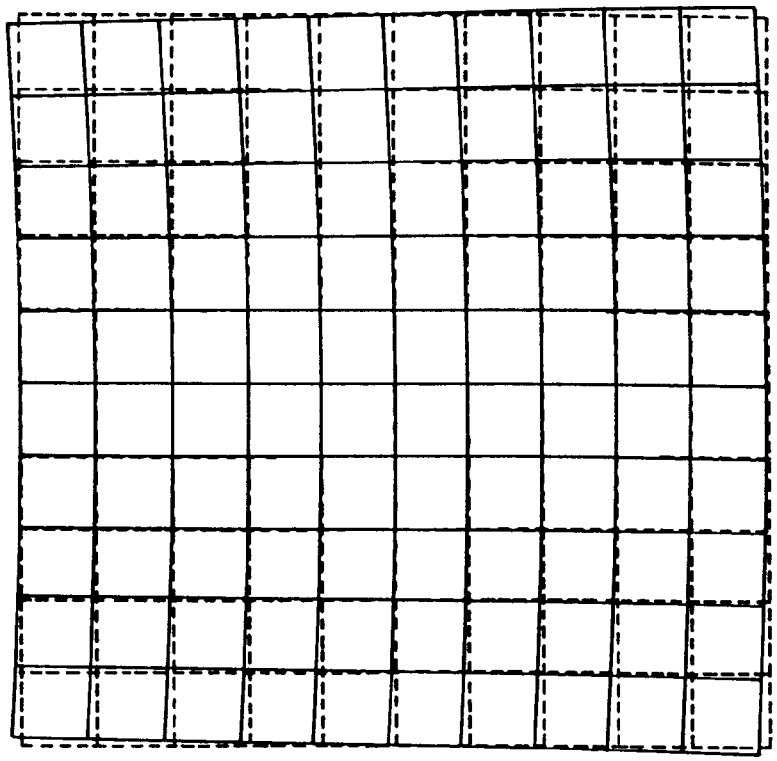
FIGS. 35A and 35B are diagrams showing the distortion observed in the ninth embodiment when the projecting optical system is focused for the secondary image plane placed at the reference position and at the close position.
Figure 35A:
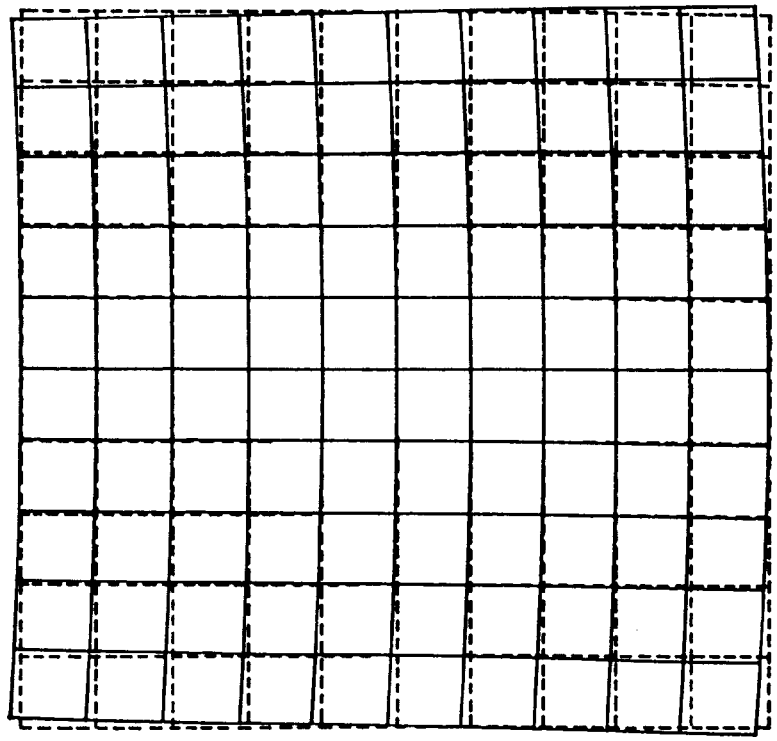

The distortion observed in the ninth embodiment when the secondary image plane IS is placed at the reference position (FIG. 29A) and at the close position (FIG. 29B) is shown in FIGS. 35A and 35B, respectively. In these distortion diagrams, solid lines represent the actually observed image including distortion, whereas broken lines represent the ideal image free from distortion. Here, the image display device placed on the primary image plane OS has a surface of 20 mm by 20 mm, and the size of the secondary image plane IS is ideally 269.2 mm by 266.7 mm when it is placed at the reference position, and 269.2 mm by 266.8 mm when it is placed at the close position.

In the sixth to ninth embodiments, the distortion factors are defined as follows. Since the primary image plane OS lies on the Y-Z plane, an object height can be represented with its coordinates (Y, Z) with respect to the center OP of the primary image plane OS. On the other hand, since the secondary image plane IS is rotated through an angle of θI in the X-Y plane with respect to the primary image plane OS, an image height is can be represented with its coordinates on the secondary image plane IS. Accordingly, if a coordinate system is defined which has its z-axis in the same direction as the Z-axis, its y-axis perpendicular to the z-axis and parallel to the secondary image plane IS, and its origin at the center PI of the secondary image plane IS, then an image height can be represented with its coordinates (y, z) in that coordinate system.

Assume that an ideal image height represented with its coordinates (y', z') corresponds to an object height represented with its coordinates (Y', Z'). Then, the actual image height on the secondary image plane IS can be expressed by its coordinates (y'+dy, z'+dz), where +dy represents the distortion in the y-axis direction and +dz represents the distortion in the z-axis direction. Since the ideal image height is given as the distance from the center PI of the secondary image plane IS to the point having the coordinates (y', z'), the ideal image height R can be defined as $R=(y'^2+z'^2)^{1/2}$. Accordingly, the distortion factor in the y-axis direction is defined as dy/R, and the distortion factor in the z-axis direction is defined as dz/R. Tables 14 to 16 list the distortion factors observed in the sixth embodiment, in the seventh and eighth embodiments, and in the ninth embodiment, respectively.

Figure 36:
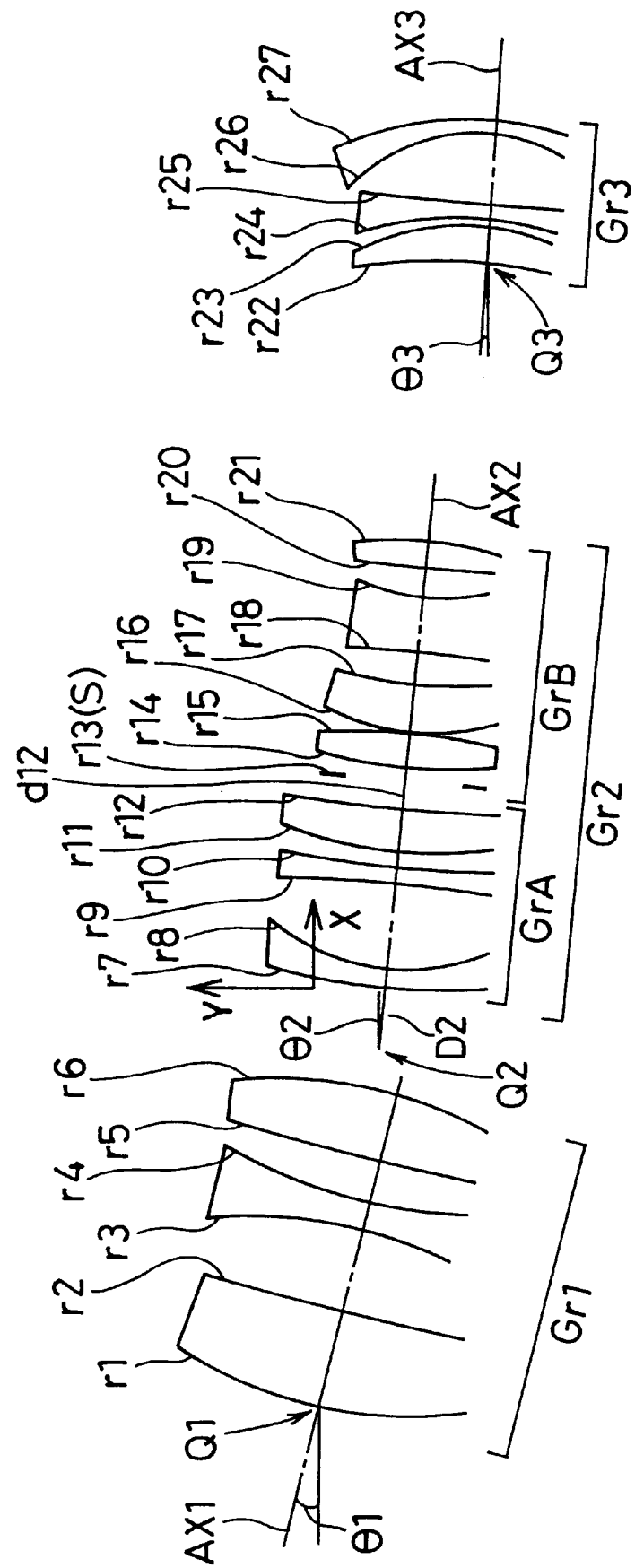
FIG. 36 is a diagram showing the lens arrangement of the projecting optical system of a tenth embodiment of the present invention, in its wide-angle end state.
Figure 42:
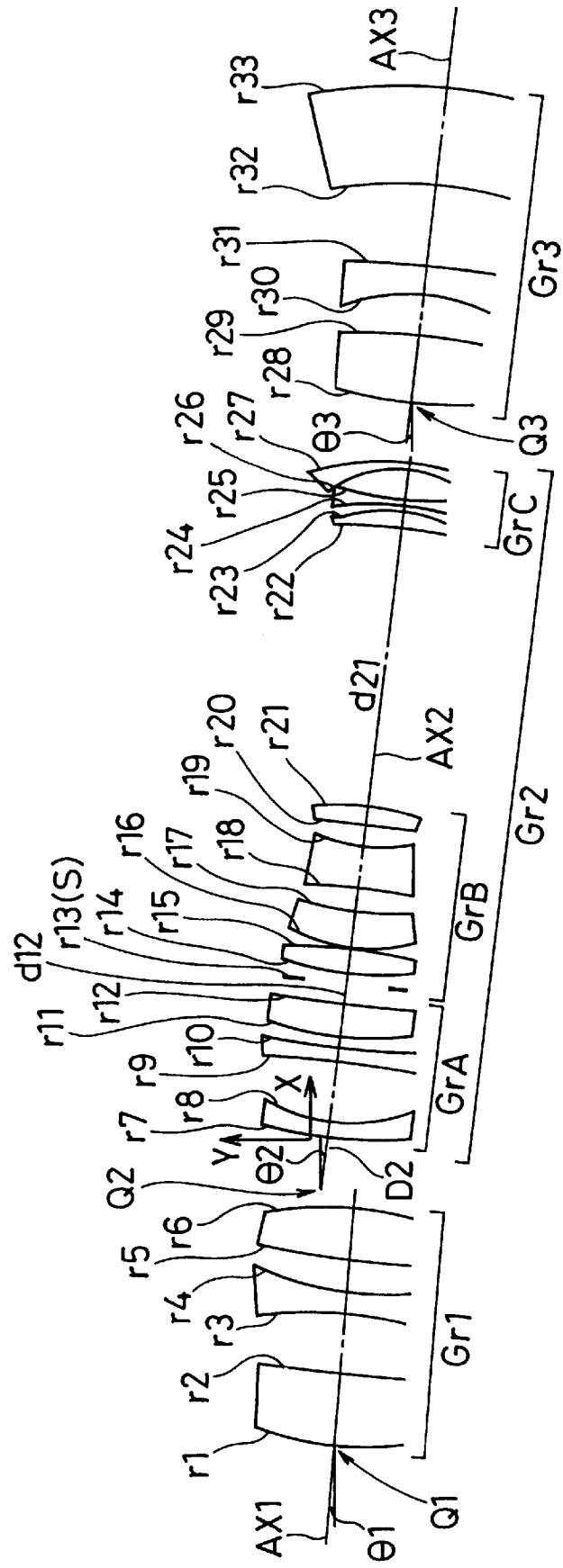
FIG. 42 is a diagram showing the lens arrangement of the projecting optical system of an eleventh embodiment of the present invention, in its wide-angle end state.

FIGS. 36 and 42 show the lens arrangement of the projecting optical systems (variable-magnification decentered optical systems) of tenth and eleventh embodiments, respectively, of the present invention, each figure illustrating the X-Y cross section of the projecting optical system. The projecting optical systems of the tenth and eleventh embodiments are both constructed as an optical system that is not symmetrical about its optical axis, and are each constituted of first, second, and third lens units, Gr1, Gr2, and Gr3, of which each is a centered optical system independent from the others. Accordingly, the optical axes (i.e. axes of symmetry) AX1, AX2, and AX3 of the first, second, and third lens units do not coincide with one another. In the lens arrangement diagrams FIGS. 36 and 42, the X-axis is perpendicular to the Y-axis, and the X-Y plane is parallel to the plane of the figures.

Figure 37A:
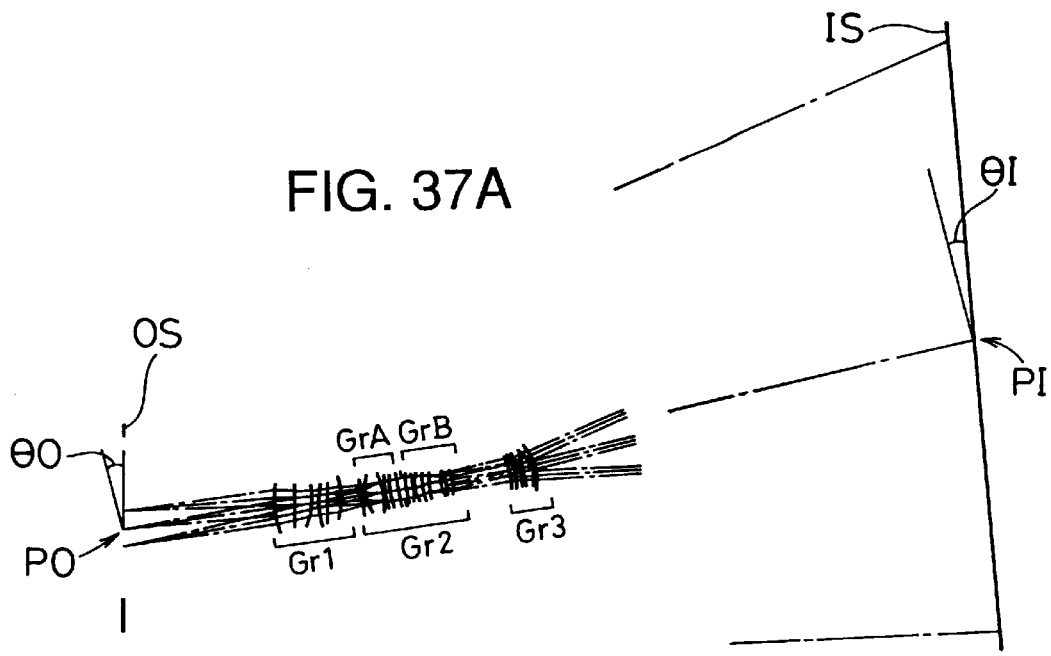
FIGS. 37A to 37C are diagrams showing the optical paths through the projecting optical system of the tenth embodiment, in different focal-length states.
Figure 37B:
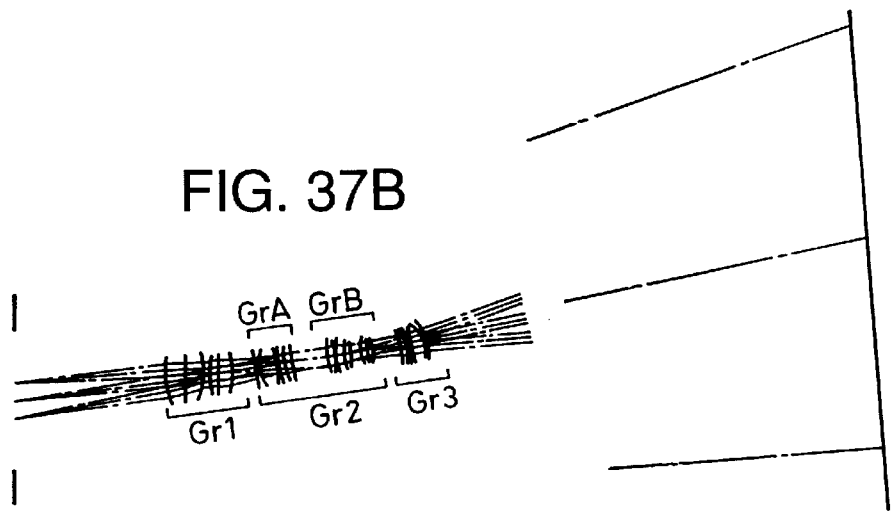
Figure 37C:
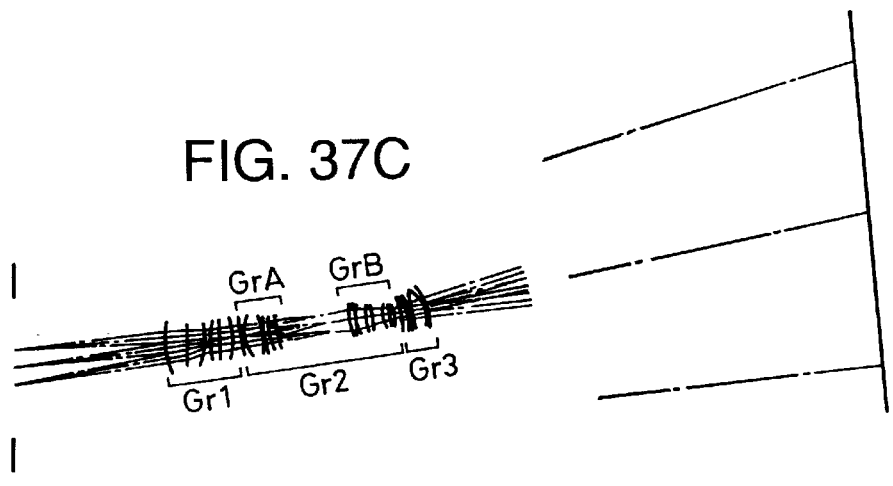
Figure 38A:
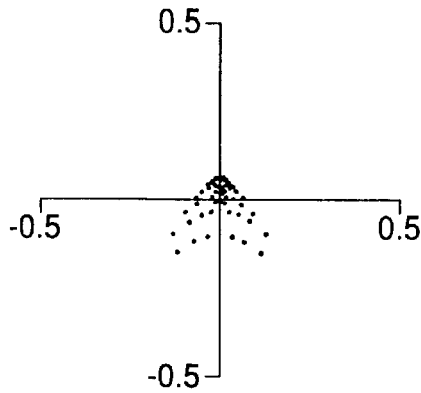
FIGS. 38A to 38F are spot diagrams obtained in the tenth embodiment, in its wide-angle end state.
Figure 38B:
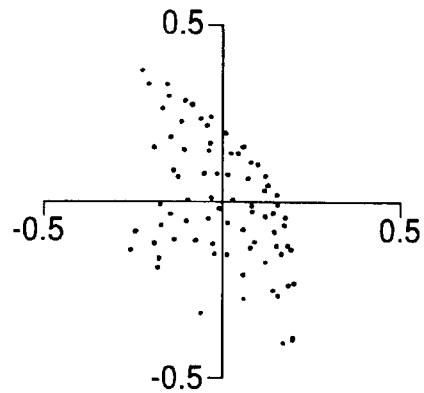
Figure 38C:
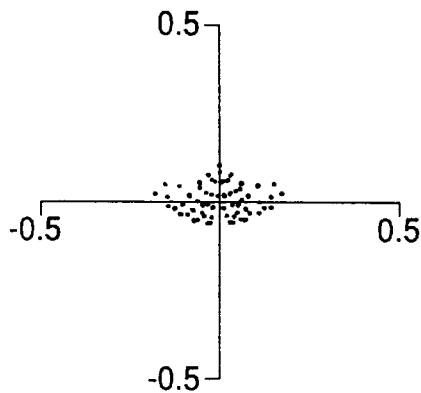
Figure 38D:
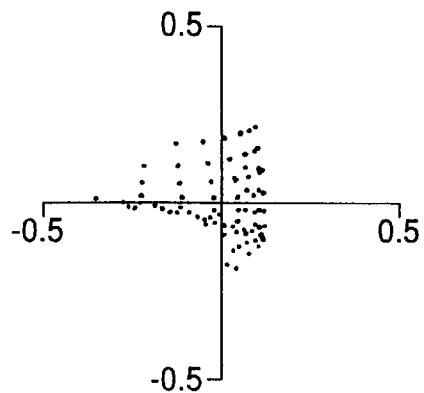
Figure 38E:
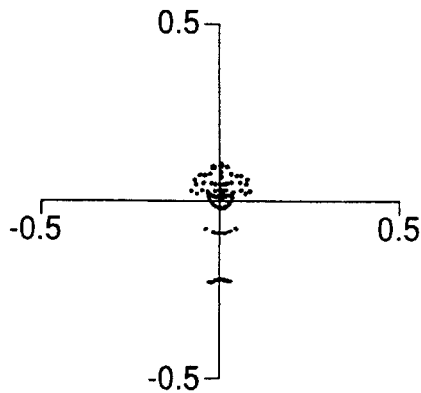
Figure 38F:
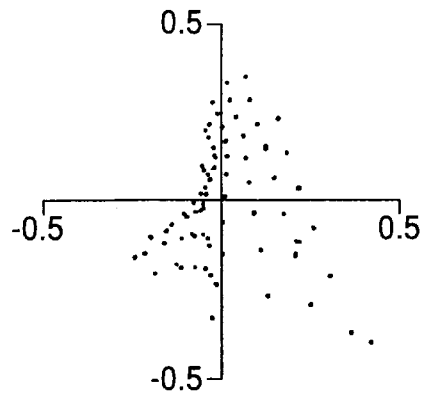
Figure 39A:
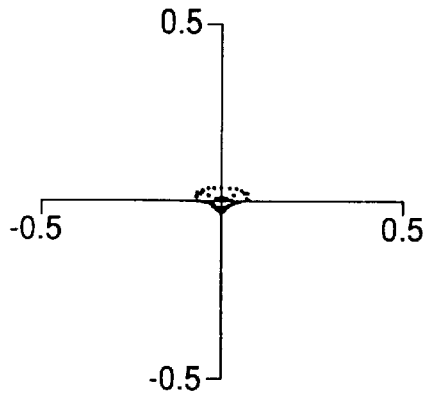
FIGS. 39A to 39F are spot diagrams obtained in the tenth embodiment, in its middle focal-length state.
Figure 39B:
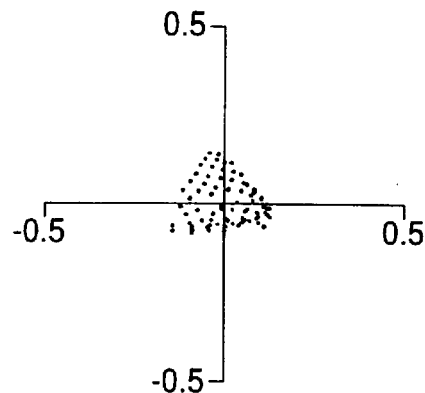
Figure 39C:
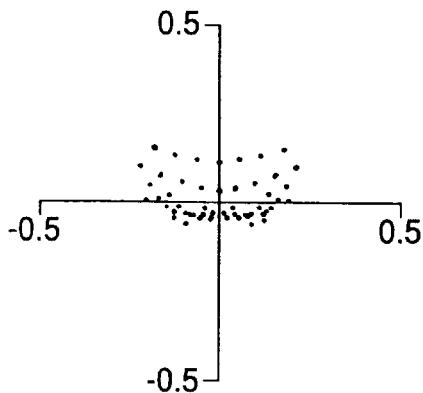
Figure 39D:
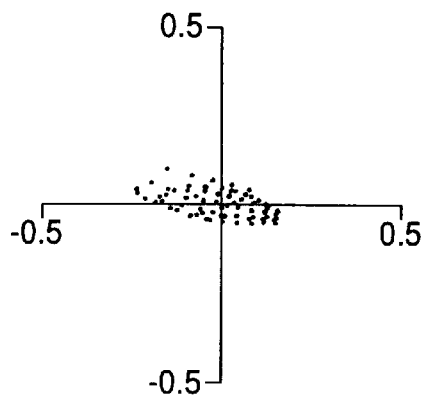
Figure 39E:
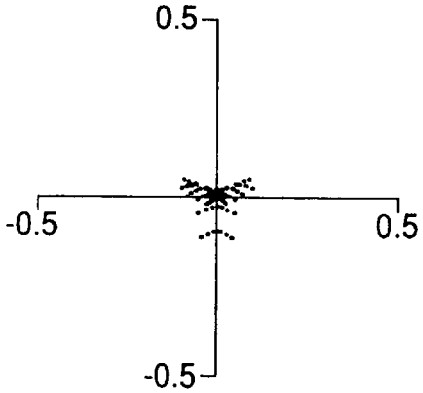
Figure 39F:
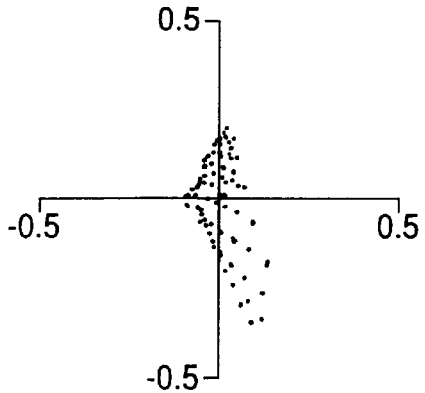
Figure 40A:
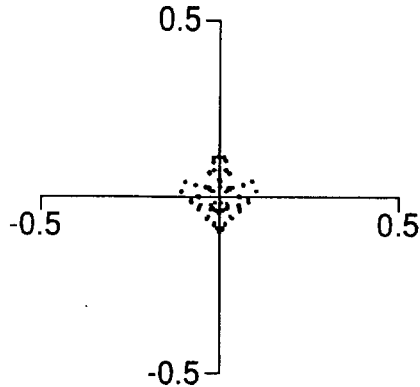
FIGS. 40A to 40F are spot diagrams obtained in the tenth embodiment, in its telephoto end state.
Figure 40B:
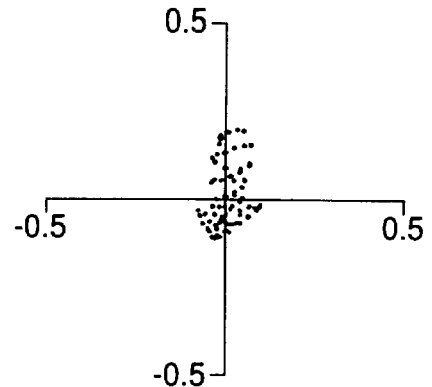
Figure 40C:
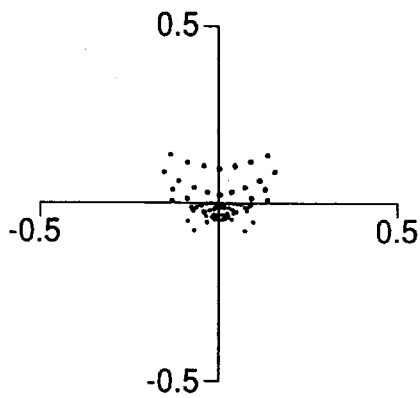
Figure 40D:
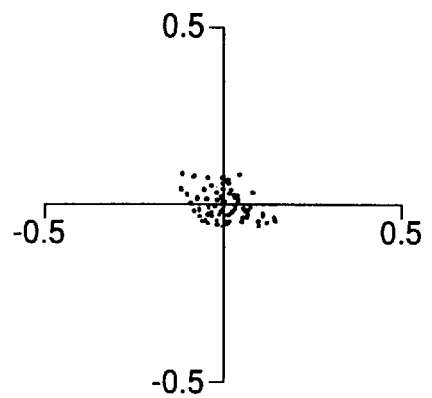
Figure 40E:
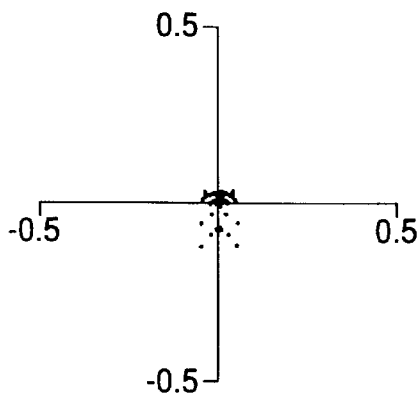
Figure 40F:
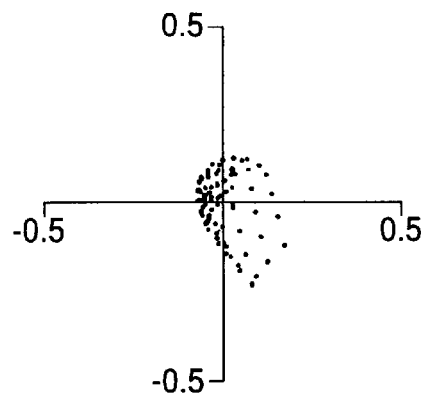
Figure 43A:
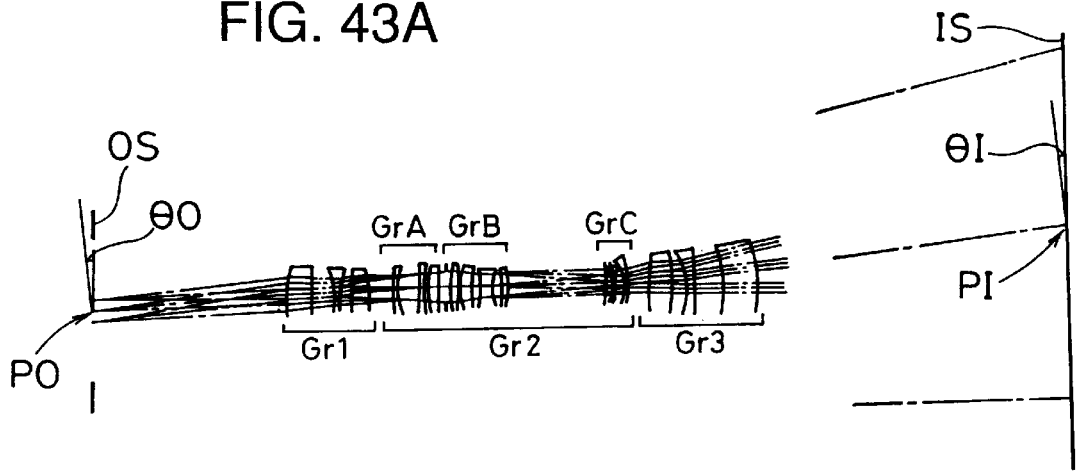
FIGS. 43A to 43C are diagrams showing the optical paths through the projecting optical system of the eleventh embodiment, in different focal-length states.
Figure 43B:
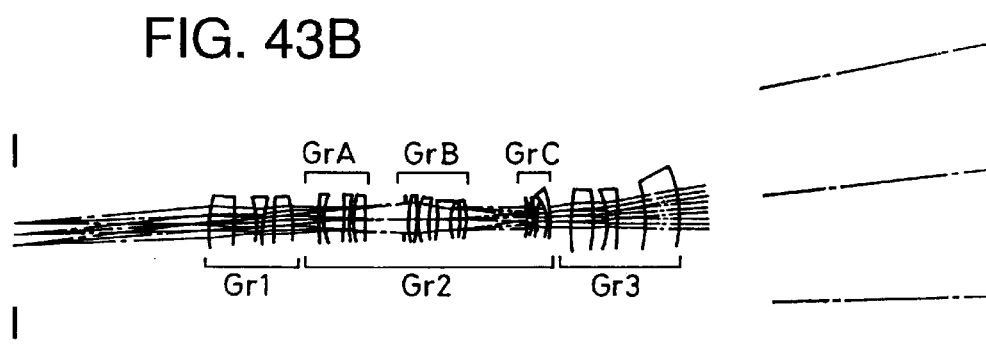
Figure 43C:
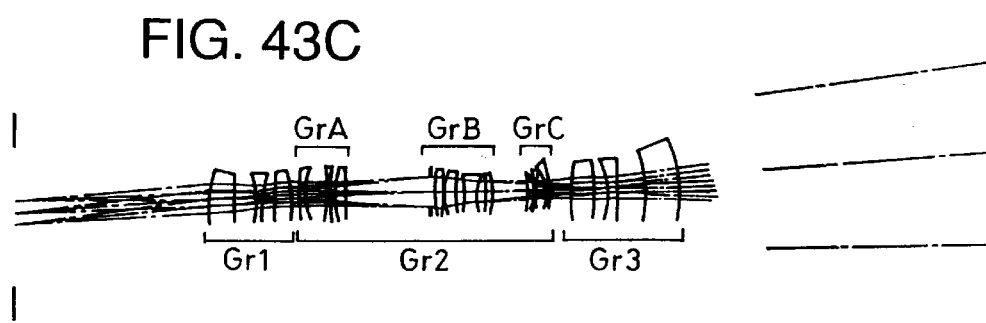
Figure 44A:
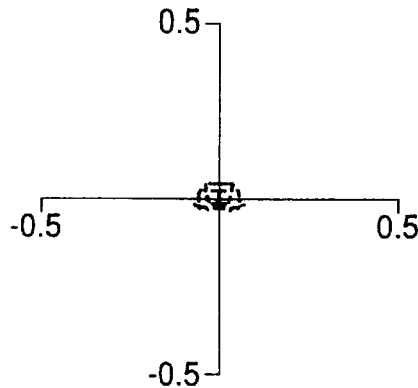
FIGS. 44A to 44F are spot diagrams obtained in the eleventh embodiment, in its wide-angle end state.
Figure 44B:
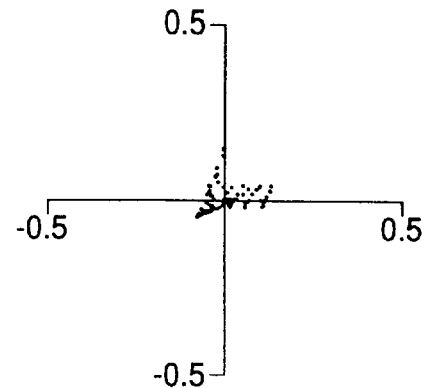
Figure 44C:
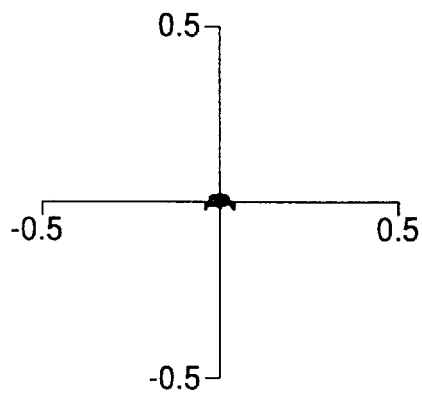
Figure 44D:
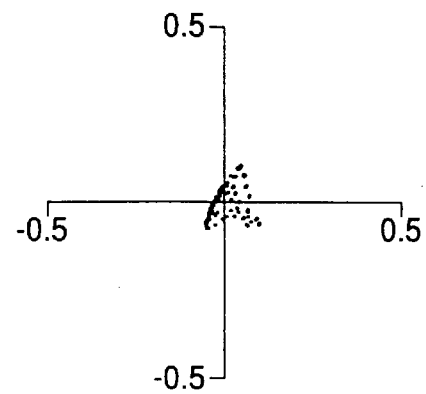
Figure 44E:
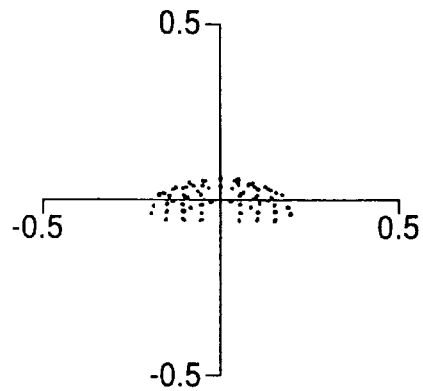
Figure 44F:
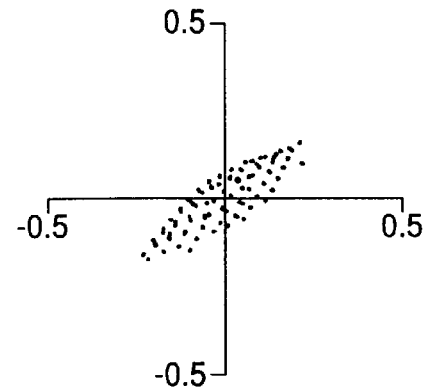
Figure 45A:
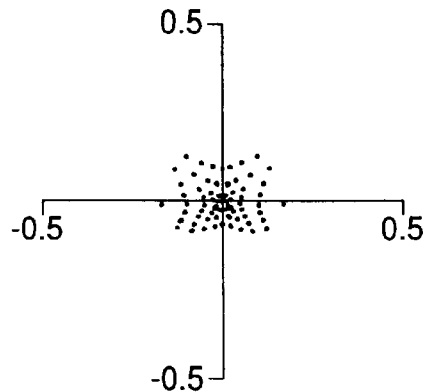
FIGS. 45A to 45F are spot diagrams obtained in the eleventh embodiment, in its middle focal-length state.
Figure 45B:
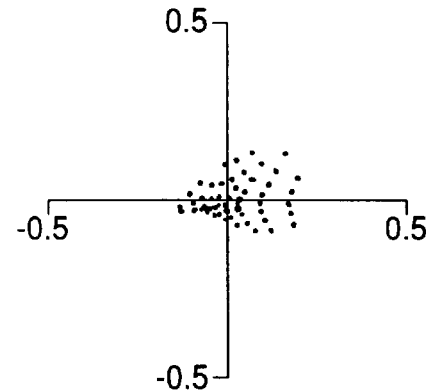
Figure 45C:
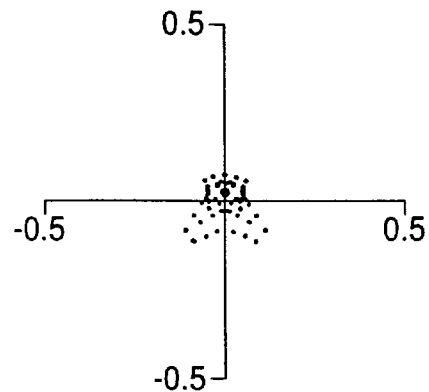
Figure 45D:
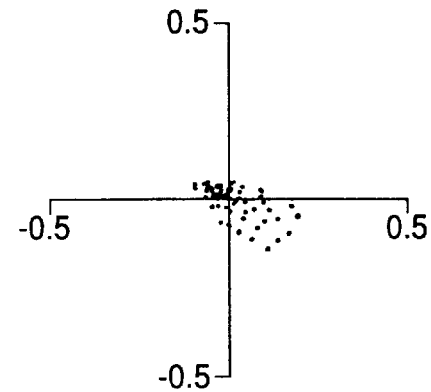
Figure 45E:
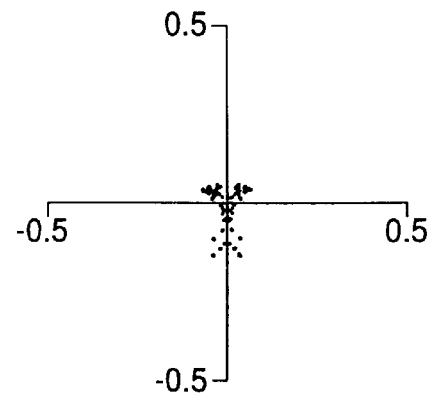
Figure 45F:
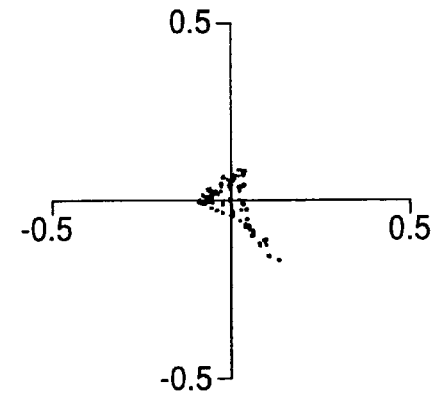
Figure 46A:
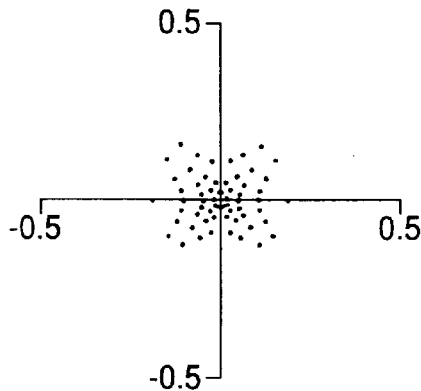
FIGS. 46A to 46F are spot diagrams obtained in the eleventh embodiment, in its telephoto end state.
Figure 46B:
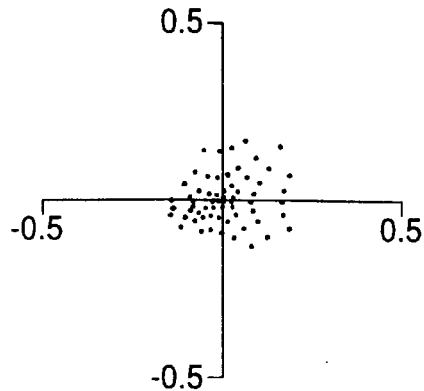
Figure 46C:
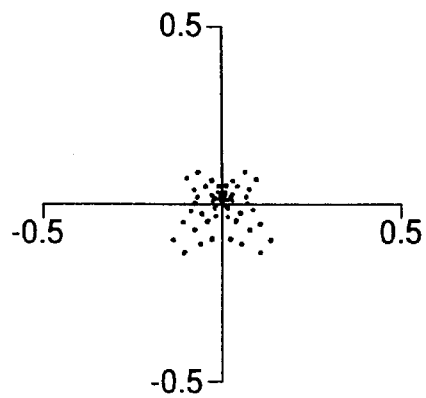
Figure 46D:
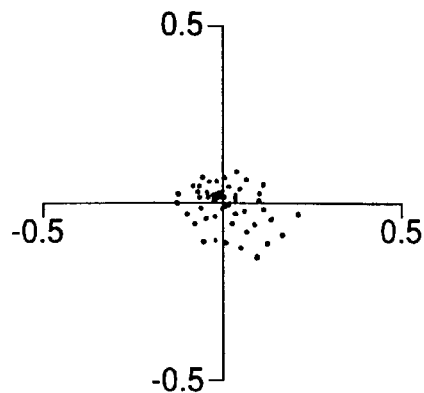
Figure 46E:
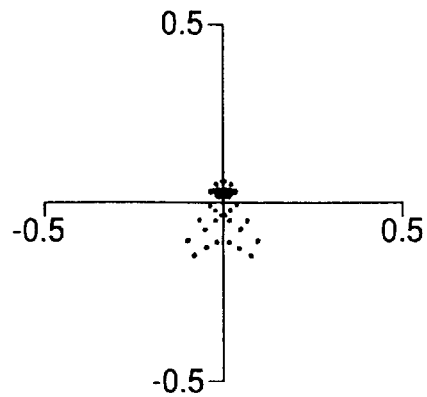
Figure 46F:
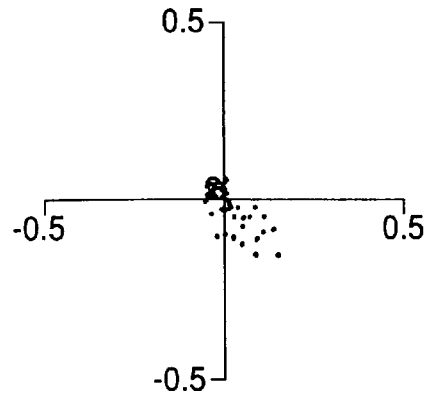

FIGS. 37A to 37C and 43A to 43C show the optical paths through the projecting optical systems of the tenth and eleventh embodiments, respectively. In these diagrams, OS represents a primary image plane realized, for example, as a surface of an image display device, and IS represents a secondary image plane on which an image is projected in each embodiment. Of these optical path diagrams, FIGS. 37A and 43A illustrate the optical paths observed in the wide-angle end state, FIGS. 37B and 43B illustrate the optical paths observed in the middle-focal-length state, and FIGS. 37C and 43C illustrate the optical paths observed in the telephoto end state.

In the lens arrangement diagrams FIGS. 36 and 42, ri (i=1, 2, 3, . . . ) represents the radius of curvature of the i-th surface from the primary image plane OS, and Q1 to Q3 represent the reference positions about which the lens units Gr1 to Gr3, respectively, are decentered. The vertex of the first surface of the second lens unit Gr2 is located an axial distance D2 away from the decentering reference position Q2 that lies on the optical axis AX2, and the vertices of the first surfaces of the first and third lens units Gr1 and Gr3 are located at the decentering reference positions Q1 and Q3, respectively. The first to third lens units Gr1 to Gr3 are arranged at angles to the optical axis of the projecting optical system as a whole, by being rotated clockwise about their respective decentering reference positions Q1 to Q3 in the X-Y plane. The angles that the optical axes AX1 to AX3 make with the X-axis in the X-Y plane are represented by θ1 to θ3, respectively.

Moreover, in the optical path diagrams FIGS. 37A to 37C and 43A to 43B, PO represents the center of the primary image plane OS, and PI represents the center of the secondary image plane IS. An image on the primary image plane OS is projected onto the secondary image plane IS such that the secondary image plane IS is inclined with respect to the primary image plane OS. The inclination angles that the primary image plane OS and the secondary image plane IS make with the Y-axis in the X-Y plane are represented by θO and θI, respectively.

The projecting optical system of the tenth embodiment is constituted of three lens units, that is, a first lens unit Gr1, a second lens unit Gr2 including an aperture diaphragm S, and a third lens unit. The first to third lens units Gr1 to Gr3 are decentered at inclination angles θ1 to θ3, respectively, with respect to the X-axis. The second lens unit Gr2 is a two-unit zoom optical system of a negative-positive configuration, composed of a first zoom lens unit GrA, and a second zoom lens unit GrB including the aperture diaphragm S. As shown in FIGS. 37A to 37C, zooming is achieved by moving the first zoom lens unit GrA having negative optical power and the second zoom lens unit GrB having positive optical power translationally along the optical axis AX2 at different movement speeds.

The projecting optical system of the eleventh embodiment is constituted of three lens units, that is, a first lens unit Gr1, a second lens unit Gr2 including an aperture diaphragm S, and a third lens unit. The first to third lens units Gr1 to Gr3 are decentered at inclination angles θ1 to θ3, respectively, with respect to the X-axis. The second lens unit Gr2 is a three-unit afocal zoom optical system of a negative-positive-negative configuration, composed of a first zoom lens unit GrA, a second zoom lens unit GrB including the aperture diaphragm S, and a third zoom lens unit GrC. As shown in FIGS. 43A to 43C, zooming is achieved by moving the first zoom lens unit GrA having negative optical power and the second zoom lens unit GrB having positive optical power translationally along the optical axis AX2 at different movement speeds.

As described above, in both of the tenth and eleventh embodiments, the projecting optical system includes at least one centered optical system that is arranged decentered, and a zoom optical system composed of a plurality of zoom lens units. The projecting optical systems of these embodiments are characterized in that they can continuously vary the image magnification (i.e. projection magnification) by moving the first and second zoom lens units GrA and GrB translationally, without changing the position of the secondary image plane IS.

As described above, by moving the first and second zoom lens units GrA and GrB translationally so that the image magnification is continuously varied without changing the position of the secondary image plane IS, it is possible to prevent trapezoid distortion from appearing in the projected image during zooming. Moreover, since zooming is achieved by the translational movement of the first and second zoom lens units GrA and GrB, driving them does not require the use of a complicated mechanism. That is, it is not necessary to use a complicated driving mechanism for achieving complicated movement, including rotation, of the first and second zoom lens units GrA and GrB. Thus, since zooming is achieved with a simple driving mechanism, it is possible to realize a compact and inexpensive projecting optical system.

As described previously, in the tenth and eleventh embodiments, the second lens unit Gr2, which is constructed as a centered optical system, serves as a zoom optical system including the first and second zoom lens units GrA and GrB that are moved translationally along the optical axis AX2. In variable-magnification decentered optical systems like the projection optical systems of these embodiments, it is preferable that their zoom optical system be constructed as a centered optical system, and that zooming be performed by moving zoom lens units along the optical axis of the zoom optical system. Such arrangement allows the zoom optical system (the second lens unit Gr2) to be designed in the same way as an ordinary zoom optical system in a centered optical system, and thus does not require special design of the lens barrel and of the driving mechanism for zooming. As a result, it is possible to realize an inexpensive projecting optical system having a simple lens barrel and a simple mechanism for zooming.

In the tenth and eleventh embodiments, while the first and second zoom lens units GrA and GrB are moved translationally for zooming, the position of the intermediate image formed by the light beam that has just exited from the second lens unit Gr2 is kept substantially at a fixed position. In variable-magnification decentered optical systems like the projection optical systems of these embodiments, it is preferable that the intermediate image formed by the light beam that has just exited from a zoom optical system be kept substantially at a fixed position (within a permissible range). Such arrangement helps reduce the variation, during zooming, of the position of the secondary image plane IS on which an image is projected by a fixed lens unit (the third lens unit Gr3) disposed on the exit side of the zoom optical system, and thus makes the correction of aberration easier.

When, as described above, the position of the intermediate image formed by the light beam that has just exited from the second lens unit Gr2 is kept substantially at a fixed position during zooming, it is preferable that trapezoid distortion be corrected near the region where the image magnification is high (specifically, in the region near the wide-angle end where the focal length is shortest and the difference between the sizes of the object and the projected image is largest) so that trapezoid distortion is not caused paraxially. Since the projection angle of view is narrow in the region where the image magnification is low (specifically, in the region near the telephoto end), such arrangement helps make trapezoid distortion, from which decentered optical systems tend to suffer, less conspicuous over the entire zoom range, and thus alleviates the restrictions on the optical design of such optical systems.

When the second lens unit Gr2 is constructed as a centered optical system and the position of the intermediate image formed by the light beam that has just exited from the second lens unit Gr2 is kept substantially at a fixed position, it is preferable, for the correction of trapezoid distortion, that the vanishing point of the image formed on the intermediated image plane (described in detail later with reference to FIG. 48) on the entrance side of the second lens unit Gr2 lie on the optical axis AX2 of the second lens unit Gr2. The vanishing point is a point at which the image magnification is infinitely low on account of trapezoid distortion, and is defined, within the secondary image plane IS on which trapezoid distortion is observed, as the point at which two sides of the trapezoid will cross each other if they are extended within that plane. When no trapezoid distortion is present, the vanishing point has an infinitely large object height on the primary image plane OS. Accordingly, in a decentered optical system constituted of a plurality of centered optical systems, the vanishing point of the image formed on the secondary image plane IS should ideally be formed at an infinitely large image height. This is achieved by arranging the decentered optical systems except the last one such that the image relayed by them has its vanishing point on the entrance side focal surface of the last centered optical system.

Figure 48:
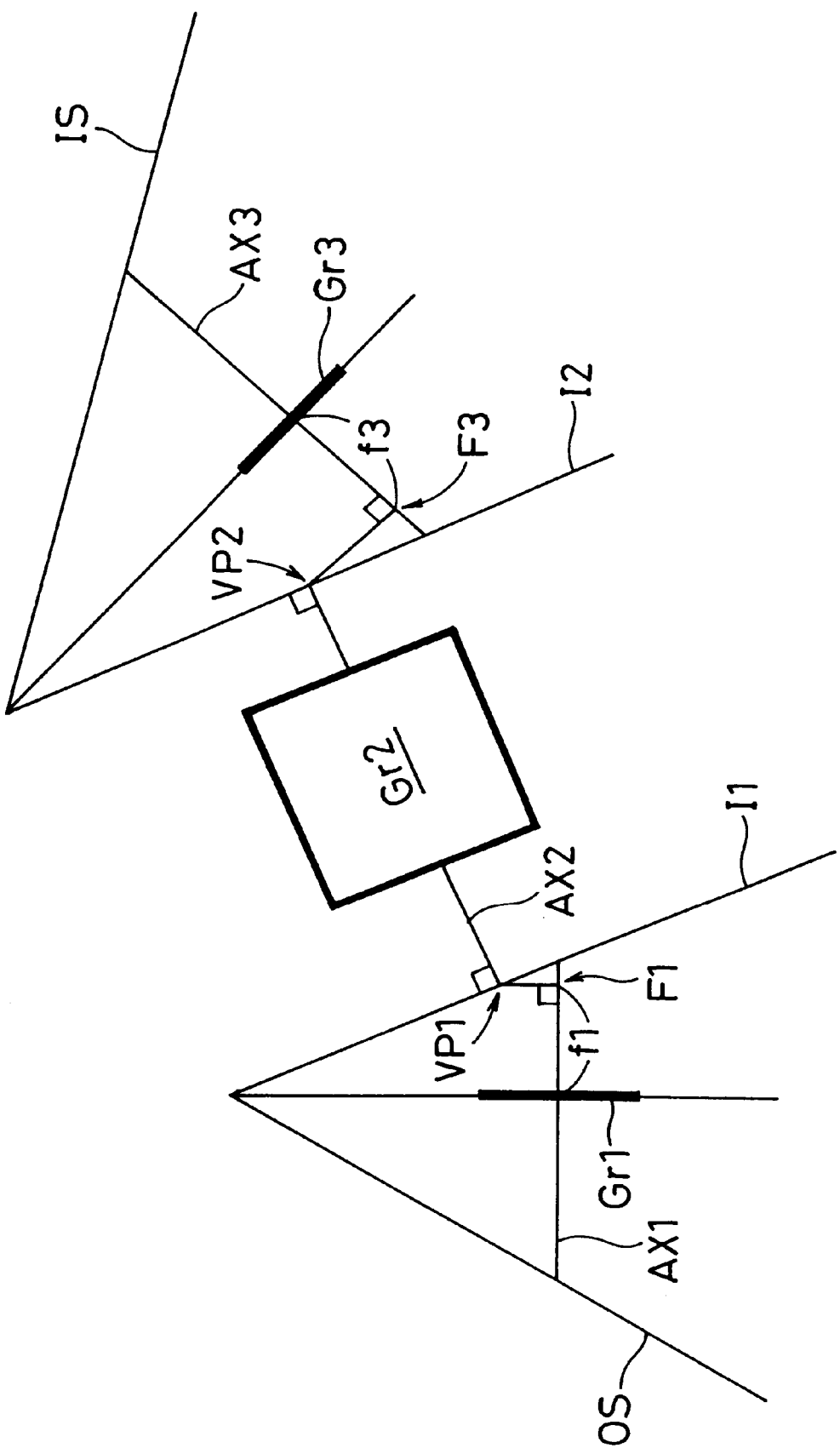
FIG. 48 is a diagram showing a desirable optical arrangement in which zooming does not cause variation of trapezoid distortion.

A more preferable optical arrangement in which zooming does not cause variation of trapezoid distortion will be described below, with reference to FIG. 48. In FIG. 48, I1 represents an intermediate image plane on which an intermediate image of the image formed on the primary image plane OS is formed by the first lens unit Gr1. This intermediate image plane I1 is determined in accordance with the shine-proof condition. I2 represents another intermediate image plane on which an intermediate image of the image formed on the intermediate image plane I1 is formed by the second lens unit Gr2. VP1 represents the vanishing point of the image formed on the intermediate image plane I1, and, within the intermediate image plane I1, the image magnification is lowest at this vanishing point VP1. VP2 represents the vanishing point of the image formed on the intermediate image plane I2 (that is, VP2 is the image of the vanishing point VP1), and, within the intermediate image plane I2, the image magnification is lowest at this vanishing point VP2. F1 represents the exit-side focal point of the first lens unit Gr1, and f1 represents the focal length of the first lens unit Gr1. F3 represents the entrance-side focal point of the third lens unit Gr3, and f3 represents the focal length of the third lens unit Gr3.

An image on the primary image plane OS is projected onto the intermediate image plane I1 by the first lens unit Gr1, and the image formed on the intermediate image plane I1 is projected onto the intermediate image plane I2 by the second lens unit Gr2 that is a centered zoom lens. Since the optical axis AX2 is perpendicular to the intermediate image plane I1, the intermediate image plane I2 is perpendicular to the optical axis AX2. Moreover, since the second lens unit Gr2 is a zoom lens (with constant conjugate lengths), the intermediate image plane I2 does not move during zooming. The image formed on the intermediate image plane I2 is then projected onto the secondary image plane IS by the third lens unit Gr3.

The second lens unit Gr2 is so disposed that the vanishing point VP1 of the image formed on the exit-side focal plane (at the focal point F1') of the first lens unit Gr1 lies on the optical axis AX2. Accordingly, the vanishing point VP2 is formed at the point where the optical axis AX2 crosses the intermediate image plane I2. On the other hand, the third lens unit Gr3 is so disposed that the vanishing point VP2 lies on the entrance-side focal plane (at the focal point F3) of the third lens unit Gr3. Since, as described above, the intermediate image plane I2 does not move during zooming, the vanishing point VP2 always lies on the entrance-side focal plane of the third lens unit Gr3. This means that, during zooming, the image of the vanishing point VP2 is always formed at an infinitely large image height on the secondary image plane IS, and thus that the secondary image plane IS can be kept free from trapezoid distortion over the entire zoom range.

When, as described above, the vanishing point VP1 of the image formed on the intermediate image plane I1 lies on the optical axis AX2, the vanishing point VP2, which lies on the optical axis AX2, does not move even if the image magnification on the intermediate image plane I2 varies during zooming. Accordingly, it is possible to correct trapezoid distortion properly over the entire zoom range without affecting the correction of trapezoid distortion by the succeeding third lens unit Gr3.

Although in FIG. 48, to simplify the explanation, the intermediate image planes I1 and I2 are illustrated as planes on which real images are formed, it would be readily understood that the same optical arrangement serves to correct trapezoid distortion even if virtual images are relayed through these intermediate image planes. An arrangement that relays virtual images is still more preferable, because it helps reduce the overall length of the lens system. Moreover, it would also be understood that, as long as an optical system is designed in accordance with FIG. 48 with respect to the arrangement of the intermediate image planes I1 and I2, the second lens unit Gr2, and the vanishing points VP1 and VP2, it is possible to correct trapezoid distortion over the entire zoom range even when the first and third lens units Gr1 and Gr3 are composed of a plurality of decentered lens units.

In the eleventh embodiment, the second lens unit Gr2 is an afocal optical system. In variable-magnification decentered optical systems, it is preferable that, as in the eleventh embodiment, the zoom optical system be realized with an afocal zoom optical system. In addition, it is preferable that the fixed lens unit (the first lens unit Gr1) disposed on the primary image plane OS side of the afocal optical system have a high magnification (preferably ×100 or higher), and that the fixed lens unit (the third lens unit Gr3) disposed on the secondary image plane IS side of the afocal optical system have a low magnification (preferably ×0.01 or lower).

Figure 49:
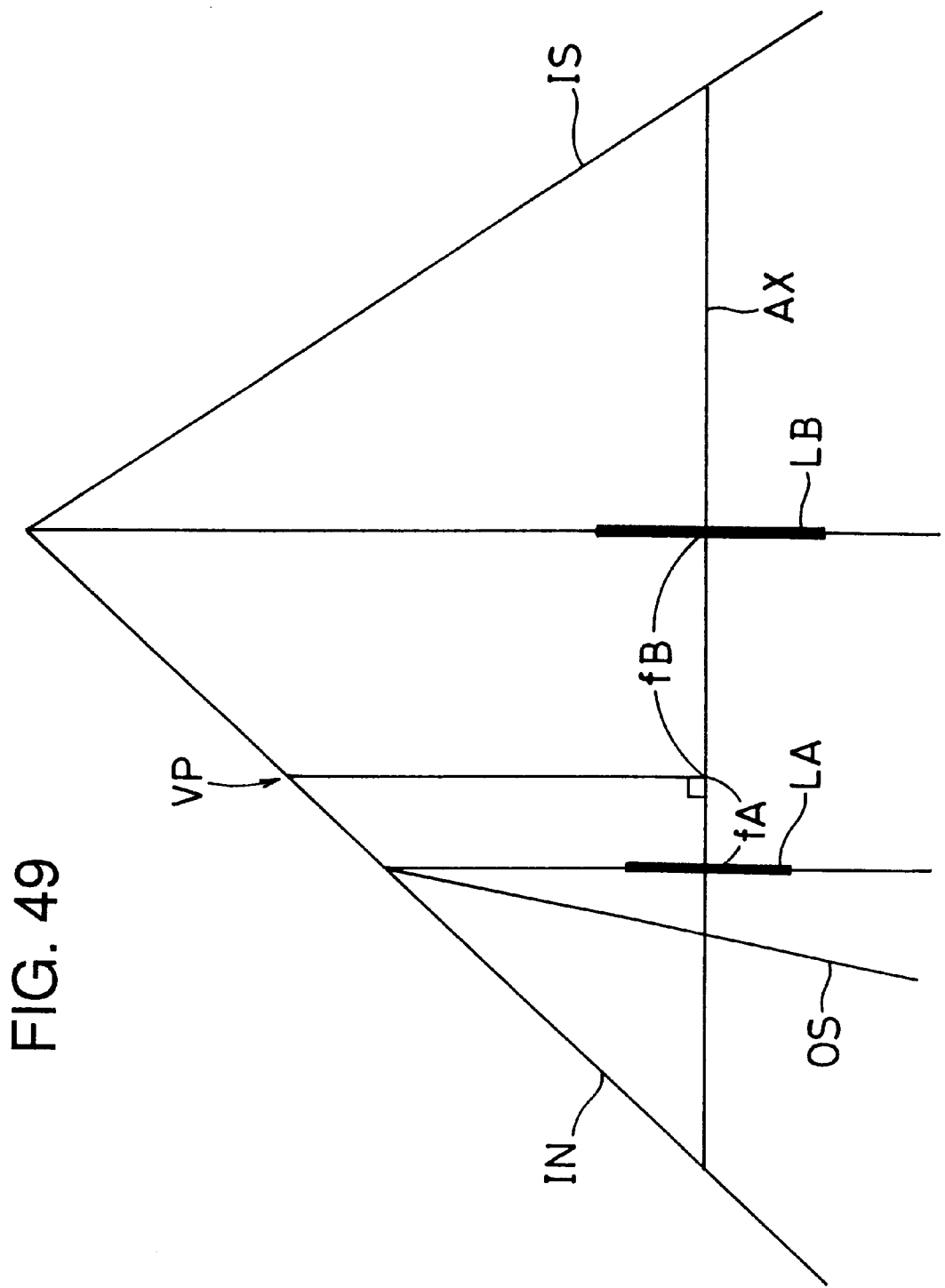
FIG. 49 is a diagram explaining the principle of the correction of trapezoid distortion by the use of an afocal optical system.

The principle of the correction of trapezoid distortion by the use of an afocal optical system will be described below, with reference to FIG. 49. FIG. 49 schematically shows the basic construction of an afocal optical system suitable for use in a projecting optical system according to the present invention.

This afocal optical system is constituted of a lens unit LA and a lens unit LB. In FIG. 49, fA represents the focal length of the lens unit LA, fB represents the focal length of the lens unit LB, and AX represents the optical axis of the afocal optical system. Moreover, IN represents an intermediate image plane (on which a virtual image is formed) determined in accordance with the shine-proof condition, and VP represents the vanishing point of the image formed on the intermediate image plane IN. At the vanishing point VP, the image magnification on the intermediate image plane IN is infinitely low on account of trapezoid distortion.

The vanishing point VP is located at the intersection between the exit-side focal plane of the lens unit LA and the intermediate image plane IN. On the other hand, the exit-side focal point of the lens unit LA coincides with the entrance-side focal point of the lens unit LB. Accordingly, the vanishing point VP always lies on the entrance-side focal plane of the lens unit LB. This allows the vanishing point VP to be magnified to an infinitely large image height by the lens unit LB, and thus trapezoid distortion is corrected.

As shown in FIG. 49, the use of an afocal optical system makes it possible to eliminate trapezoid distortion on the secondary image plane IS even if the intermediate image plane IN and the secondary image plane IS are not perpendicular to the optical axis AX of the afocal optical system. Moreover, if, as described previously, a fixed lens unit having a high magnification (the first lens unit Gr1) is disposed on the entrance side of the afocal optical system, the afocal optical system receives a substantially parallel light beam. This means that the intermediate image planes formed on both sides of the afocal optical system are located substantially at infinity. Under this condition, even when the afocal optical system is decentered to rotate the secondary image plane IS, a substantially parallel light beam is obtained from the afocal optical system. Furthermore, if, as described previously, a fixed lens unit having a low magnification (the third lens unit Gr3) is disposed on the exit side of the afocal optical system, that fixed lens unit receives a substantially parallel light beam irrespective of whether the afocal optical system is decentered or not. As a result, it is possible to correct aberration such as coma with a minimal number of lens elements (for example, it is possible to reduce the number of lens elements constituting the fixed lens units disposed on both sides of the afocal optical system).

In decentered optical systems, a light beam generally takes a path off the optical axis of a lens unit that is disposed decentered. This inconveniently requires that such lens unit have a larger lens diameter than when it is not decentered. To solve this problem, it is preferable to provide an aperture diaphragm within a zoom lens unit that is moved for zooming. In general, a zoom optical system includes a plurality of zoom lens units that are moved for zooming, and those lens units are located apart from one another at the wide-angle or telephoto end. If an aperture diaphragm is provided within a zoom lens unit that is moved for zooming, even an off-axial light beam (a light beam whose center is off the path leading to the center of the secondary image plane) is not allowed to take a path so distant from the optical axis of that zoom lens unit as when no aperture diaphragm is provided, and accordingly the zoom lens unit that is moved for zooming does not need to have a larger lens diameter. In the tenth and eleventh embodiments, since the second zoom lens unit GrB is provided with the aperture diaphragm S, it has a relatively small diameter.

In the tenth and eleventh embodiments, the first and second zoom lens units GrA and GrB that are moved for zooming are disposed next to each other. It is preferable that, as in these embodiments, a plurality of zoom lens units that are moved for zooming are disposed next to each other. In zoom lens units that are moved for zooming, a light beam passing therethrough tends to change its height and direction considerably as zooming is performed. Moreover, in general, as the distance between the zoom lens units is longer, the degree to which the light beam passing therethrough changes its height and direction is greater. Accordingly, if zoom lens units that are moved for zooming are disposed apart from each other, a light beam tends to take a path extremely distant from the optical axis in at least one zoom lens unit, and, in addition, the distance between the path and the optical axis varies greatly as zooming is performed. This necessitates that the zoom lens units have larger lens diameters so as to allow the passage of an off-axial light beam therethrough, or makes it difficult to suppress variation of aberration caused by zooming. These inconveniences can be overcome by arranging zoom lens units moved for zooming next to each other, and, in this way, it is possible to suppress variation of aberration caused by zooming.

As described previously, in the tenth embodiment, the second lens unit Gr2 is constituted of two, negative and positive, lens units and, in the eleventh embodiment, the second lens unit Gr2 is constituted of three, negative, positive, and negative, lens units. It is preferable that the zoom optical system include, as zoom lens units that are moved for zooming, at least one zoom lens unit having positive optical power and at least one negative zoom lens unit having negative optical power.

As described previously, in variable-magnification decentered optical systems used for oblique projection and provided with a zoom optical system, it is necessary that the intermediate image planes on both sides of the zoom optical system be kept substantially at fixed positions during zooming (see FIG. 48). However, if all zoom lens units that are moved for zooming have positive optical power, none of them can make a light beam diverge, and accordingly, in order to use a diverging light beam, it is necessary to form a real image in the zoom optical system. As long as a real image is formed in the zoom optical system, it is not possible to obtain a sufficiently wide magnification range without making the zoom optical system larger. By contrast, if all zoom lens units that are moved for zooming have negative optical power, none of them can make a light beam converge, and accordingly it is difficult to obtain a sufficiently wide magnification range. Moreover, if the zoom optical system is composed of positive or negative zoom lens units alone, the zoom optical system as a whole exhibits excessively positive or negative optical power, and thus it is difficult to correct curvature of field.

The above noted problems are mostly overcome if the zoom optical system includes, as zoom lens units that are moved for zooming, at least one zoom lens unit having positive optical power and at least one zoom lens unit having negative optical power. Such arrangement, therefore, makes it possible to realize a compact projecting optical system having a sufficiently wide magnification range, and makes it easy to correct curvature of filed.

Heretofore, the projecting optical systems of the tenth and eleventh embodiments have been described as enlargement projecting optical systems for projecting an image onto a screen, but they can be used as reduction projecting optical systems as well (for example, as taking optical systems for projecting an image onto film, or as image input optical systems for projecting an image onto a CCD or the like). In other words, both of these projecting optical systems can achieve zooming even when the primary and secondary image planes OS and IS are interchanged, without any modification in their construction Tables 17 and 18 list the construction data of the projecting optical systems of the tenth and eleventh embodiments (FIGS. 36 and 42), respectively. In Tables 17 and 18, ri (i=1, 2, 3, . . . ) represents the radius of curvature of the i-th surface from the primary image plane OS side, di (i=1, 2, 3, . . . ) represents the i-th axial distance from the primary image plane OS side, and Ni (i=1, 2, 3, . . . ) represents the refractive index (Nd) for d-lines of the i-th lens element from the primary image plane OS side.

In Tables 17 and 18, the position of each element is represented by its absolute coordinate values (X, Y, Z) in a coordinate system as shown in the corresponding lens arrangement diagram (FIGS. 36 and 42), that is, a coordinate system whose X- and Y-axes are perpendicular to each other (the X-Y plane is parallel to the plane of the figures) and whose Z-axis is perpendicular to both of the X- and Y-axes. As described previously, in the tenth and eleventh embodiments, the lens units Gr1 to Gr3 are each constructed as an independent centered optical system, and, the lens units Gr1 to Gr3 are arranged, decentered from one another, to form as a whole an optical system that is not symmetrical about its optical axis.

The decentering reference position Q1 is located at the vertex of the first surface (having a radius of curvature of r1) of the first lens unit Gr1. The decentering reference position Q2, which lies on the optical axis AX2, is located an axial distance D2 away from the vertex of the first surface (having a radius of curvature of r7) of the second lens unit Gr2. The decentering reference position Q3 is located at the vertex of the first surface (having a curvature of radius of r28) of the third lens unit Gr3. The coordinates (X, Y, Z) of the decentering reference position Q1 are represented as (X1, Y1, Z1), those of the decentering reference position Q2 as (X2, Y2, Z2), and those of the decentering reference position Q3 as (X3, Y3, Z3). The inclination angles $\theta1$ to $\theta3$ (°) of the optical axes AX1 to AX3 of the first to third lens units Gr1 to Gr3 are represented by the rotational angles (with clockwise rotation angles positive) through which the first to third lens units Gr1 to Gr3 are rotated about their respective decentering reference positions Q1 to Q3 in the X-Y plane with respect to the X-axis.

The coordinates (X, Y, Z) of the center PO of the primary image plane OS are represented as (XO, YO, ZO), and those of the center PI of the secondary image plane IS as (XI, YI, ZI). The inclination angle $\theta O$ (°) of the primary image surface OS and the inclination angle $\theta I$ (°) of the secondary image surface IS are represented by the rotation angles (with clockwise rotation angles positive) through which the primary and secondary image planes OS and IS are rotated about their centers PO and PI in the X-Y plane with respect to the Y-axis.

The primary image plane OS is realized as the display surface or the like of an image display device. The size of the display surface is represented with the coordinates (y, z) of its four corners in a coordinate system having its z-axis in the same direction as the Z-axis, having its y-axis parallel to the primary image surface OS, and having its origin at the center PO of the primary image surface OS . Specifically, the maximum and minimum y-coordinates of the display surface on the primary image plane OS are represented as ymax and ymin, and the maximum and minimum z-coordinates of the display surface on the primary image plane OS are represented as zmax and zmin.

In the construction data of the tenth and eleventh embodiments (Tables 17 and 18), the image magnification $\beta_z$ (in the Z-axis direction) and the axial distances D2, d12 and d21 that vary with the movement of the first and second zoom lens units GrA and GrB are each represented with three values obtained in different focal-length states as shown in the corresponding optical path diagrams (FIGS. 37A to 37C and 43A to 43B). Specifically, the values obtained in the wide-angle end state are marked with [W], those obtained in the middle-focal-length state are marked with [M], and those obtained in the telephoto end state are marked with [T].

The imaging performance obtained in the tenth embodiment when the projecting optical system is in the wide-angle end state [W] (FIG. 37A), in the middle-focal-length state [M] (FIG. 37B), and in the telephoto end state [T] (FIG. 37C) is shown in FIGS. 38A to 38F, 39A to 39F, and 40A to 40F, respectively, in the form of a set of spot diagrams (on a scale of ±0.5 mm). The imaging performance obtained in the eleventh embodiment when the projecting optical system is in the wide-angle end state [W] (FIG. 43A), in the middle-focal-length state [M] (FIG. 43B), and in the telephoto end state [T] (FIG. 43C) is shown in FIGS. 44A to 44F, 45A to 45F, and 46A to 46F, respectively, in the form of a set of spot diagrams (on a scale of ±0.5 mm). At the top of each spot diagram are noted the Y- and Z-coordinates of the corresponding imaging gravity point on the secondary image plane IS.

The distortion observed in the tenth and eleventh embodiments is shown in FIGS. 41A to 41C and 47A to 47C, respectively, with FIGS. 41A and 47A showing the distortion in the wide-angle end state [W] (FIGS. 37A and 43A), FIGS. 41B and 47B showing the distortion in the middle-focal-length state [M] (FIGS. 37B and 43B), and FIGS. 41C and 47C showing the distortion in the telephoto end state [T] (FIGS. 37C and 43C). In these distortion diagrams, solid lines represent the actually observed image including distortion, whereas broken lines represent the ideal image free from distortion. Here, the actually observed image refers to the image on the secondary image plane IS as seen from a direction perpendicular to the y'-z' plane of a coordinate system having its z'-axis in the same direction as the Z-axis, and having its y'-axis perpendicular to the z'-axis and parallel to the secondary image plane IS.

In the coordinate system defined just above, an image height can be represented with its coordinates (y', z') on the secondary image plane IS with respect to the center PI thereof. Accordingly, if it is assumed that an ideal image height having coordinates (y', z')=(a', b') corresponds to an object height having coordinates (y, z)=(a, b), then the coordinates of the actual image height on the secondary image plane IS are represented as (a'+dy', b'+dz'), where +dy' represents the distortion in the y'-axis direction and +dz' represents the distortion in the z'-axis direction. Since the ideal image height is given as the distance from the center PI of the secondary image plane IS to the point having the coordinates (a', b'), the ideal image height R can be defined as $R=(a'^2+b'^2)^{1/2}$. Accordingly, the distortion factor in the y'-axis direction is defined as dy'/R, and the distortion factor in the z'-axis direction is defined as dz'/R. Tables 19 and 20 list the distortion factors dy'/R and dz'/R observed in the tenth and eleventh embodiments, respectively, when the projection optical system is in the wide-angel end state [W], in the middle-focal-length state [M], and in the telephoto end state [T] (FIGS. 37A to 37C and 43A to 43C). Here, since ideal image points depend on the image magnification $\beta_z$ in the z'-direction (i.e. in the Z-direction), the coordinates of an ideal image height is represented as (a', b')=($\beta_z$·a, $\beta_z$·b).

TABLE 1

<<Embodiment 1>>

| | Radius of Curvature | Axial Distance | Refractive Index | Dispersion |
|---|---|---|---|---|
| <First Lens Unit> | | | | |
| r1 = | 26.174 | | | |
| | | 11.000 | 1.77250 | 49.77 |
| r2 = | 46.959 | | | |
| | | 5.000 | | |
| r3 = | −39.248 | | | |
| | | 2.000 | 1.59270 | 35.45 |
| r4 = | 200.590 | | | |
| | | 3.000 | | |
| r5 = | 235.088 | | | |
| | | 4.000 | 1.77250 | 49.77 |
| r6 = | −38.563 | | | |
| <Aperture Diaphragm> | | | | |
| | ∞ | | | |
| <Second Lens Unit> | | | | |
| r7 = | −12.385 | | | |
| | | 2.000 | 1.77250 | 49.77 |
| r8 = | −29.687 | | | |
| | | 10.000 | | |
| r9 = | −36.041 | | | |
| | | 9.000 | 1.69680 | 56.47 |
| r10 = | −27.066 | | | |
| | | 0.100 | | |

TABLE 1-continued

<<Embodiment 1>>

| | | | | |
|---|---|---|---|---|
| r11 = | −111.289 | | | |
| | | 11.000 | 1.69680 | 56.47 |
| r12 = | −52.149 | | | |
| | | 0.100 | | |
| r13 = | 1479.370 | | | |
| | | 12.000 | 1.69680 | 56.47 |
| r14 = | −96.109 | | | |
| | | 0.100 | | |
| r15 = | 112.093 | | | |
| | | 12.000 | 1.69680 | 56.47 |
| r16 = | −505.676 | | | |
| | | 0.100 | | |
| r17 = | 54.154 | | | |
| | | 11.000 | 1.69680 | 56.47 |
| r18 = | 96.657 | | | |

| <Positions> | X | Y | Z | ANG |
|---|---|---|---|---|
| Primary Image Plane | −580.000 | 0.000 | 0.000 | 18.000 |
| First Lens Unit | 0.000 | 0.000 | 0.000 | 4.982 |
| Aperture Diaphragm | 27.000 | 0.000 | 0.000 | 0.000 |
| Second Lens Unit | 39.000 | −4.424 | 0.000 | 10.510 |
| Secondary Image Plane | 120.000 | −11.041 | 0.000 | 4.103 |

TABLE 2

<<Embodiment 2>>

| | Radius of Curvature | Axial Distance | Refractive Index | Dispersion |
|---|---|---|---|---|
| <First Lens Unit> | | | | |
| r1 = | 27.800 | | | |
| | | 11.000 | 1.77250 | 49.77 |
| r2 = | 59.815 | | | |
| | | 5.000 | | |
| r3 = | −47.495 | | | |
| | | 2.000 | 1.59270 | 35.45 |
| r4 = | 189.405 | | | |
| | | 3.000 | | |
| r5 = | −910.034 | | | |
| | | 4.000 | 1.77250 | 49.77 |
| r6 = | −41.281 | | | |
| <Aperture Diaphragm> | | | | |
| | ∞ | | | |
| <Second Lens Unit> | | | | |
| r7 = | 479.676 | | | |
| | | 3.000 | 1.51680 | 64.20 |
| r8 = | −268.229 | | | |
| <Third Lens Unit> | | | | |
| r9 = | −12.138 | | | |
| | | 2.000 | 1.83350 | 21.00 |
| r10 = | −27.148 | | | |
| | | 10.000 | | |
| r11 = | −34.306 | | | |
| | | 9.000 | 1.69680 | 56.47 |
| r12 = | −27.145 | | | |
| | | 0.100 | | |
| r13 = | −112.515 | | | |
| | | 11.000 | 1.69680 | 56.47 |
| r14 = | −52.438 | | | |
| | | 0.100 | | |
| r15 = | 590.797 | | | |
| | | 12.000 | 1.69680 | 56.47 |
| r16 = | −107.350 | | | |
| | | 0.100 | | |
| r17 = | 110.893 | | | |
| | | 12.000 | 1.69680 | 56.47 |
| r18 = | −664.187 | | | |
| | | 0.100 | | |

TABLE 2-continued

<<Embodiment 2>>

| | | | | |
|---|---|---|---|---|
| r19 = | 59.588 | | | |
| | | 11.000 | 1.69680 | 56.47 |
| r20 = | 110.552 | | | |

| <Positions> | X | Y | Z | ANG |
|---|---|---|---|---|
| primary Image Plane | −580.000 | 0.000 | 0.000 | 18.000 |
| First Lens Unit | 0.000 | 0.000 | 0.000 | 4.982 |
| Aperture Diaphragm | 27.000 | 0.000 | 0.000 | 0.000 |
| Second Lens Unit | 29.000 | 0.000 | 0.000 | 5.531 |
| Third Lens Unit | 39.000 | −3.814 | 0.000 | 10.949 |
| Secondary Image Plane | 120.000 | −11.093 | 0.000 | 3.996 |

TABLE 3

<<Embodiment 3>>

| | Radius of Curvature | Axial Distance | Refractive Index | Dispersion |
|---|---|---|---|---|
| <First Lens Unit> | | | | |
| r1 = | 25.236 | | | |
| | | 11.000 | 1.77250 | 49.77 |
| r2 = | 40.201 | | | |
| | | 5.000 | | |
| r3 = | −44.156 | | | |
| | | 2.000 | 1.59270 | 35.45 |
| r4 = | 83.739 | | | |
| | | 3.000 | | |
| r5 = | 52.063 | | | |
| | | 4.000 | 1.77250 | 49.77 |
| r6 = | −49.542 | | | |
| <Aperture Diaphragm> | | | | |
| | ∞ | | | |
| <Second Lens Unit> | | | | |
| r7 = | −13.930 | | | |
| | | 6.000 | 1.83350 | 49.77 |
| r8 = | −16.457 | | | |
| <Third Lens Unit> | | | | |
| r9 = | −13.644 | | | |
| | | 10.000 | 1.83350 | 21.00 |
| r10 = | −23.511 | | | |
| | | 0.100 | | |
| r11 = | −42.392 | | | |
| | | 9.000 | 1.69680 | 56.47 |
| r12 = | −32.918 | | | |
| | | 0.100 | | |
| r13 = | −123.197 | | | |
| | | 1.000 | 1.83350 | 21.00 |
| r14 = | 176.614 | | | |
| | | 16.000 | 1.69680 | 56.47 |
| r15 = | −64.308 | | | |
| | | 0.100 | | |
| r16 = | 139.243 | | | |
| | | 12.000 | 1.69680 | 56.47 |
| r17 = | −136.832 | | | |
| | | 0.100 | | |
| r18 = | 54.308 | | | |
| | | 11.000 | 1.69680 | 56.47 |
| r19 = | 207.855 | | | |

| <Positions> | X | Y | Z | ANG |
|---|---|---|---|---|
| Primary Image Plane | −580.000 | 0.000 | 0.000 | 30.000 |
| First Lens Unit | 0.000 | 0.000 | 0.000 | 0.000 |
| Aperture Diaphragm | 27.000 | 0.000 | 0.000 | 0.000 |
| Second Lens Unit | 36.029 | −2.708 | 0.000 | 4.064 |
| Third Lens Unit | 46.761 | 4.077 | 0.000 | 14.216 |
| Secondary Image Plane | 117.000 | −11.623 | 0.000 | −1.488 |

TABLE 4

<<Embodiment 4>>

<Primary Image Plane>

X = −129.700
Y = 0.00000
Z = 0.00000
ANG = 0.00000
ymax = 20.0000, ymin = −20.0000
zmax = 20.0000, zmin = −20.0000

<First Lens Unit>

X = 0.00000
Y = 0.00000
Z = 0.00000
ANG = 0.00000

| | Radius of Curvature | Axial Distance | Refractive Index |
|---|---|---|---|
| r1 = | 80.622 | | |
| | | 12.702 | 1.76500 |
| r2 = | −207.716 | | |
| | | 0.544 | 1.00000 |
| r3 = | 57.486 | | |
| | | 9.073 | 1.76500 |
| r4 = | 137.219 | | |
| | | 4.536 | 1.00000 |
| r5 = | −227.078 | | |
| | | 7.349 | 1.51100 |
| r6 = | 33.679 | | |
| | | 0.000 | 1.00000 |

<Second Lens Unit>

X = 77.754
Y = 0.00000
Z = 0.00000
ANG = 0.00000

| | Radius of Curvature | Axial Distance | Refractive Index |
|---|---|---|---|
| ∞ (Aperture Diaphragm, Aperture Radius = 10.000) | | | |
| | | 39.982 | 1.00000 |
| r7 = | −90.695 | | |
| | | 9.796 | 1.75600 |
| r8 = | −82.199 | | |
| | | 6.357 | 1.00000 |
| r9 = | −77.101 | | |
| | | 9.596 | 1.75600 |
| r10 = | −469.473 | | |
| | | 4.878 | 1.00000 |
| r11 = | −415.372 | | |
| | | 20.991 | 1.75600 |
| r12 = | −107.691 | | |
| | | 1.639 | 1.00000 |
| r13 = | 2557.741 | | |
| | | 18.751 | 1.75600 |
| r14 = | −349.002 | | |
| | | 0.000 | 1.00000 |

<Secondary Image Plane>

X = 683.583
Y = 0.00000
Z = 0.00000
ANG = 0.00000

TABLE 5

| Inclination of Secondary Image Plane | grp14.ANG | IMG.X | IMG.Y | IMG.Z | IMG.ANG |
|---|---|---|---|---|---|
| 0° | 0.000 | 683.583 | 0.000 | 0.000 | 0.000 |
| 10° | −10.000 | 686.632 | 35.726 | 0.000 | −10.000 |
| 20° | −20.000 | 696.861 | 70.367 | 0.000 | −20.000 |

TABLE 6

| Image Height | Inclination of Secondary Image Plane | | | | | |
|---|---|---|---|---|---|---|
| | 0° | | 10° | | 20° | |
| [mm] | dy/r | dz/r | dy/r | dz/r | dy/r | dz/r |
| (20, 0) | −0.0050 | 0.0000 | −0.0060 | 0.0000 | −0.0005 | 0.0000 |
| (−20, 0) | 0.0050 | 0.0000 | 0.0048 | 0.0000 | 0.0060 | 0.0000 |
| (20, 20) | −0.0077 | −0.0077 | 0.0007 | −0.0198 | 0.0155 | −0.0379 |
| (0, 20) | 0.0000 | −0.0050 | 0.0115 | −0.0103 | 0.0240 | −0.0259 |
| (−20, 20) | 0.0077 | −0.0077 | 0.0157 | 0.0026 | 0.0246 | −0.0051 |

TABLE 7

<<Embodiment 5>>

<Primary Image Plane>

X = −60.700
Y = 0.000
Z = 0.000
ANG = 0.000
ymax = 10.0000, ymin = −10.0000
zmax = 10.0000, zmin = −10.0000

<First Lens Unit>

X = 0.00000
Y = 0.00000
Z = 0.00000
ANG = 0.00000

| | Radius of Curvature | Axial Distance | Refractive Index |
|---|---|---|---|
| r1 = | 36.045 | | |
| | | 9.500 | 1.70000 |
| r2 = | 118.267 | | |
| | | 8.000 | 1.00000 |
| r3 = | −46.391 | | |
| | | 2.780 | 1.57800 |
| r4 = | 40.574 | | |
| | | 3.000 | 1.00000 |
| r5 = | 124.230 | | |
| | | 6.630 | 1.70800 |
| r6 = | −46.972 | | |
| | | 9.540 | 1.00000 |
| ∞ (Aperture Diaphragm, Aperture Radius = 7.00000) | | | |
| | | 19.400 | 1.00000 |
| r7 = | 148.242 | | |
| | | 19.890 | 1.70800 |
| r8 = | −307.921 | | |
| | | 12.000 | 1.00000 |
| r9 = | −120.049 | | |
| | | 8.3400 | 1.57800 |
| r10 = | 161.098 | | |
| | | 24.000 | 1.00000 |
| r11 = | −423.472 | | |
| | | 28.500 | 1.70000 |
| r12 = | −109.096 | | |
| | | — | 1.00000 |

TABLE 7-continued

<<Embodiment 5>>

<Second Lens Unit>

X = 20.0000
Y = 0.00000
Z = 0.00000
ANG = 0.0000

| | Radius of Curvature | Axial Distance | Refractive Index |
|---|---|---|---|
| | | 150.000 | 1.00000 |
| r13 = | 2487.853 | | |
| | | 10.000 | 1.70000 |
| r14 = | 254.693 | | |
| | | 25.000 | 1.00000 |
| r15 = | −225.611 | | |
| | | 5.000 | 1.70000 |
| r16 = | 1357.448 | | |
| | | 60.000 | 1.00000 |
| r17 = | −1615.694 | | |
| | | 60.000 | 1.70000 |
| r18 = | −171.560 | | |
| | | 0.000 | 1.00000 |

<Secondary Image Plane>

X = 3634.560
Y = 0.000
Z = 0.00000
ANG = 0.000

TABLE 8

| Inclination of Secondary Image Plane | grp17.ANG | IMG.X | IMG.Y | IMG.Z | IMG.ANG |
|---|---|---|---|---|---|
| 0° | 0.000 | 3634.560 | 0.000 | 0.000 | 0.000 |
| 6.687° | −10.000 | 3590.690 | 216.520 | 0.000 | 6.687 |

TABLE 9

| Image Height | Inclination of Secondary Image Plane | | | |
|---|---|---|---|---|
| | 0° | | 6.687° | |
| [mm] | dy/r | dz/r | dy/r | dz/r |
| (10, 0) | −0.0009 | 0.0000 | −0.0484 | 0.0000 |
| (−10, 0) | 0.0009 | 0.0000 | 0.0359 | 0.0000 |
| (10, 10) | −0.0013 | −0.0013 | −0.0343 | −0.0067 |
| (0, 10) | 0.0000 | −0.0009 | −0.0026 | −0.0057 |
| (−10, 10) | 0.0013 | −0.0013 | 0.0244 | −0.0012 |

TABLE 10

Inclination of Secondary Image Plane

| Inclination of Secondary Image Plane | grp14.ANG | IMG.X | IMG.Y | IMG.Z | IMG.ANG | OBJ.Y |
|---|---|---|---|---|---|---|
| 0° | 0.000 | 683.583 | 0.000 | 0.000 | 0.000 | 0.000 |
| 10° | −10.000 | 686.632 | 35.726 | 0.000 | −10.000 | 10.000 |
| 20° | −20.000 | 696.861 | 70.367 | 0.000 | −20.000 | 20.000 |

TABLE 11

<<Embodiment 6>>

<Primary Image Plane OS>

PO . . .   XO = −129.700
　　　　　YO = 0.000
　　　　　ZO = 0.000
θO = 0.000
Ymax = 20.000, Ymin = −20.000
Zmax = 20.000, Zmin = −20.000

<Gr1>

P1 . . .   X1 = 0.000
　　　　　Y1 = 0.000
　　　　　Z1 = 0.000
θ1 = 0.000

| Radius of Curvature | Axial Distance | Refractive Index |
|---|---|---|
| r1 = 80.622 | | |
| | d1 = 12.702 | N1 = 1.76500 |
| r2 = −207.716 | | |
| | d2 = 0.544 | |
| r3 = 57.486 | | |
| | d3 = 9.073 | N2 = 1.76500 |
| r4 = 137.219 | | |
| | d4 = 4.536 | |
| r5 = −227.078 | | |
| | d5 = 7.349 | N3 = 1.51100 |
| r6 = 33.679 | | |

<Gr2>

P2 . . .   X2 = 77.754
　　　　　Y2 = 0.000
　　　　　Z2 = 0.000
θ2 = −20.000

| Radius of Curvature | Axial Distance | Refractive Index |
|---|---|---|
| r7 = ∞ (Aperture Diaphragm S, Aperture Radius = 10.000) | | |
| | d7 = 39.982(A)~29.982(B) | |
| r8 = −90.695 | | |
| | d8 = 9.796 | N4 = 1.75600 |
| r9 = −82.199 | | |
| | d9 = 6.357 | |
| r10 = −77.101 | | |
| | d10 = 9.596 | N5 = 1.75600 |
| r11 = −469.473 | | |
| | d11 = 4.878 | |
| r12 = −415.372 | | |
| | d12 = 20.991 | N6 = 1.75600 |
| r13 = −107.691 | | |
| | d13 = 1.639 | |
| r14 = 2557.741 | | |
| | d14 = 18.751 | N7 = 1.75600 |
| r15 = −349.002 | | |

<Secondary Image Plane IS>

PI . . .   XI = 694.049(A)~687.465(B)
　　　　　YI = 75.722(A)~66.946(B)

TABLE 11-continued

<<Embodiment 6>>

ZI = 0.000(A)~0.000(B)
θI = −20.000

TABLE 12

<<Embodiments 7 and 8>>

<Primary Image Plane OS>

PO . . .   XO = −129.700
　　　　　YO = 0.000
　　　　　ZO = 0.000
θO = 0.000
Ymax = 20.000, Ymin = −20.000
Zmax = 20.000, Zmin = −20.000

<Gr1>

P1 . . .   X1 = 0.000
　　　　　Y1 = 0.000
　　　　　Z1 = 0.000
θ1 = 0.000

| Radius of Curvature | Axial Distance | Refractive Index |
|---|---|---|
| r1 = 80.622 | | |
| | d1 = 12.702 | N1 = 1.76500 |
| r2 = −207.716 | | |
| | d2 = 0.544 | |
| r3 = 57.486 | | |
| | d3 = 9.073 | N2 = 1.76500 |
| r4 = 137.219 | | |
| | d4 = 4.536 | |
| r5 = −227.078 | | |
| | d5 = 7.349 | N3 = 1.51100 |
| r6 = 33.679 | | |

<Gr2>

P2 . . .   X2 = 77.754
　　　　　Y2 = 0.000
　　　　　Z2 = 0.000
θ2 = −20.000

| Radius of Curvature | Axial Distance | Refractive Index |
|---|---|---|
| r7 = ∞ (Aperture Diaphragm S, Aperture Radius = 10.000) | | |
| | d7 = 39.982 | |
| r8 = −90.695 | | |
| | d8 = 9.796 | N4 = 1.75600 |
| r9 = −82.199 | | |
| | d9 = 6.357 | |
| r10 = −77.101 | | |
| | d10 = 9.596 | N5 = 1.75600 |
| r11 = −469.473 | | |
| | d11 = 4.878 | |
| r12 = −415.372 | | |
| | d12 = 20.991 | N6 = 1.75600 |
| r13 = −107.691 | | |
| | d13 = 1.639 | |

TABLE 12-continued

<<Embodiments 7 and 8>>

| | | |
|---|---|---|
| r14 = 2557.741 | | |
| | d14 = 18.752 | N7 = 1.75600 |
| r15 = −349.002 | | |

<Gr3>

P3 . . .  X3 = 214.009(A)~232.803(B),~214.009(C)
Y3 = 4.593(A)~11.433(B),~4.593(C)
Z3 = 0.000(A)~0.000(B),~0.000(C)
θ3 = −20.000

| Radius of Curvature | Axial Distance | Refractive Index |
|---|---|---|
| r16 = −905.289 | | |
| | d16 = 20.000 | N8 = 1.70000 |
| r17 = 404.173 | | |
| | d17 = 50.000(A)~50.000(B),~40.000(C) | |
| r18 = 381.401 | | |
| | d18 = 35.000 | N9 = 1.70000 |
| r19 = 5254.50 | | |
| | d19 = 40.000(A)~40.000(B),~50.000(C) | |
| r20 = −12228.736 | | |
| | d20 = 50.000 | N10 = 1.70000 |
| r21 = 2421.366 | | |

<Secondary Image Plane IS>

PI . . .  XI = 1277.750(A)~1218.040(B),~1263.260(C)
YI = 166.647(A)~153.767(B),~161.213(C)
ZI = 0.000(A)~0.000(B),~0.000(C)
θI = −20.000

TABLE 13

<<Embodiment 9>>

<<Primary Image Plane OS>>

PO . . .  XO = −129.700
YO = 0.000
ZO = 0.000
θO = 0.000
Ymax = 20.000, Ymin = −20.000
Zmax = 20.000, Zmin = −20.000

<Gr1>

P1 . . .  X1 = 0.000
Y1 = 0.000
Z1 = 0.000
θ1 = 0.000

| Radius of Curvature | Axial Distance | Refractive Index |
|---|---|---|
| r1 = 80.622 | | |
| | d1 = 12.702 | N1 = 1.76500 |
| r2 = −207.716 | | |
| | d2 = 0.544 | |
| r3 = 57.486 | | |
| | d3 = 9.073 | N2 = 1.76500 |
| r4 = 137.219 | | |
| | d4 = 4.536 | |
| r5 = −227.078 | | |
| | d5 = 7.349 | N3 = 1.51100 |
| r6 = 33.679 | | |

<Gr2>

P2 . . .  X2 = 77.754
Y2 = 0.000
Z2 = 0.000

TABLE 13-continued

<<Embodiment 9>>

θ2 = −20.000

| Radius of Curvature | Axial Distance | Refractive Index |
|---|---|---|
| r7 = ∞ (Aperture Diaphragm S, Aperture Radius = 10.000) | | |
| | d7 = 39.982 | |
| r8 = −90.695 | | |
| | d8 = 9.796 | N4 = 1.75600 |
| r9 = −82.199 | | |
| | d9 = 6.357 | |
| r10 = −77.101 | | |
| | d10 = 9.596 | N5 = 1.75600 |
| r11 = −469.473 | | |
| | d11 = 4.878 | |
| r12 = −415.372 | | |
| | d12 = 20.991 | N6 = 1.75600 |
| r13 = −107.691 | | |
| | d13 = 1.639 | |
| r14 = 2557.741 | | |
| | d14 = 18.752 | N7 = 1.175600 |
| r15 = −349.002 | | |

<Gr3>

P3 . . .  X3 = 220.969(A)~240.723(B)
Y3 = 12.683(A)~15.812(B)
Z3 = 0.000(A)~0.000(B)
θ3 = −9.000

| Radius of Curvature | Axial Distance | Refractive Index |
|---|---|---|
| r16 = −258.159 | | |
| | d16 = 10.000 | N8 = 1.70000 |
| r17 = 263.089 | | |
| | d17 = 60.000 | |
| r18 = 1101.819 | | |
| | d18 = 35.000 | N9 = 1.70000 |
| r19 = −1117.542 | | |
| | d19 = 20.000 | |
| r20 = 1570.200 | | |
| | d20 = 70.000 | N10 = 1.70000 |
| r21 = −381.633 | | |

<Secondary Image Plane IS>

PI . . .  XI = 1449.520(A)~1416.720(B)
YI = 178.414(A)~173.220(B)
ZI = 0.000(A)~0.000(B)
θI = −26.600

TABLE 14

<<Distortion Factors Observed in Embodiment 6>>

| | Secondary Image Plane Position | | | |
|---|---|---|---|---|
| Object Height | (A) Reference Position | | (B) Close-up Position | |
| [mm] | dy/R | dz/R | dy/R | dz/R |
| (20, 0) | −0.0008 | 0.0000 | 0.0009 | 0.0000 |
| (−20, 0) | 0.0046 | 0.0000 | 0.0046 | 0.0000 |
| (20, 20) | 0.0126 | −0.0224 | 0.0162 | −0.0223 |
| (0, 20) | 0.0235 | −0.0042 | 0.0235 | −0.0042 |
| (−20, 20) | 0.0234 | 0.0101 | 0.0234 | 0.0101 |

TABLE 15

<<Distortion Factors Observed in Embodiments 7 and 8>>

| Object Height | Secondary Image Plane Position | | | | | |
|---|---|---|---|---|---|---|
| | (A) Reference Position | | (B) Close-up Position | | (C) Close-up Position | |
| [mm] | dy/R | dz/R | dy/R | dz/R | dy/R | dz/R |
| (20, 0) | 0.0130 | 0.0000 | 0.0173 | 0.0000 | 0.0050 | 0.0000 |
| (−20, 0) | 0.0068 | 0.0000 | 0.0074 | 0.0000 | 0.0037 | 0.0000 |
| (20, 20) | 0.0332 | −0.0123 | 0.0385 | −0.0094 | 0.0241 | −0.0182 |
| (0, 20) | 0.0264 | −0.0016 | 0.0268 | −0.0012 | 0.0248 | −0.0032 |
| (−20, 20) | 0.0255 | 0.0117 | 0.0259 | 0.0118 | 0.0232 | 0.0118 |

TABLE 16

<<Distortion Factors Observed in Embodiment 9>>

| Object Height | Secondary Image Plane Position | | | |
|---|---|---|---|---|
| | (A) Reference Position | | (B) Close-up Position | |
| [mm] | dy/R | dz/R | dy/R | dz/R |
| (20, 0) | 0.0068 | 0.0000 | 0.0051 | 0.0000 |
| (−20, 0) | 0.0022 | 0.0000 | 0.0029 | 0.0000 |
| (20, 20) | 0.0248 | −0.0135 | 0.0228 | −0.0153 |
| (0, 20) | 0.0249 | 0.0015 | 0.0248 | 0.0003 |
| (−20, 20) | 0.0177 | 0.0177 | 0.0189 | 0.0159 |

TABLE 17

<<Embodiment 10>>

<Primary Image Plane OS (14 mm by 14 mm square)>

PO . . . XO = −85.171
YO = 0.000
ZO = 0.000
θO = 13.473
ymax = 7, ymin = −7
zmax = 7, zmin = −7

<Gr1>

P1 . . . X1 = −30.000
Y1 = −1.145
Z1 = 0.000
θ1 = 12.888

| Radius of Curvature | Axial Distance | Refractive Index |
|---|---|---|
| r1 = 30.329 | | |
| | d1 = 7.125 | N1 = 1.70000 |
| r2 = 514.864 | | |
| | d2 = 6.000 | |
| r3 = −28.207 | | |
| | d3 = 2.085 | N2 = 1.57800 |
| r4 = 39.206 | | |
| | d4 = 3.000 | |
| r5 = 210.110 | | |
| | d5 = 4.973 | N3 = 1.70800 |
| r6 = −29.961 | | |

<Gr2>

P2 . . . X2 = −5.000
Y2 = −5.635
Z2 = 0.000
θ2 = 4.257
D2 = 5.000[W]~5.924[M]~0.572[T]

TABLE 17-continued

<<Embodiment 10>>

| Radius of Curvature | Axial Distance | Refractive Index |
|---|---|---|
| r7 = 43.616 | | |
| | d7 = 1.400 | N4 = 1.67003 |
| r8 = 16.000 | | |
| | d8 = 6.100 | |
| r9 = −89.833 | | |
| | d9 = 1.200 | N5 = 1.74400 |
| r10 = 90.321 | | |
| | d10 = 1.100 | |
| r11 = 29.006 | | |
| | d11 = 3.200 | N6 = 1.70055 |
| r12 = 125.790 | | |
| | d12 = 2.000[W]~11.348[M]~24.232[T] | |
| r13 = ∞ (Aperture Diaphragm S, Aperture Radius = 4) | | |
| | d13 = 1.000 | |
| r14 = 34.146 | | |
| | d14 = 2.400 | N7 = 1.69100 |
| r15 = −65.639 | | |
| | d15 = 0.150 | |
| r16 = 16.183 | | |
| | d16 = 3.500 | N8 = 1.62280 |
| r17 = 34.134 | | |
| | d17 = 2.300 | |
| r18 = −117.051 | | |
| | d18 = 4.000 | N9 = 1.80518 |
| r19 = 15.140 | | |
| | d19 = 2.100 | |
| r20 = 151.683 | | |
| | d20 = 2.000 | N10 = 1.63980 |
| r21 = −24.783 | | |

<Gr3>

P3 . . . X3 = 52.407
Y3 = −11.444
Z3 = 0.000
θ3 = 3.438

| Radius of Curvature | Axial Distance | Refractive Index |
|---|---|---|
| r22 = −36.414 | | |
| | d22 = 2.500 | N11 = 1.70055 |
| r23 = −16.628 | | |
| | d23 = 0.700 | |
| r24 = −21.501 | | |
| | d24 = 1.000 | N12 = 1.74400 |
| r25 = 7981.674 | | |
| | d25 = 5.000 | |
| r26 = −12.826 | | |
| | d26 = 1.000 | N13 = 1.67003 |
| r27 = −21.275 | | |

<Secondary Image Plane IS>

PI . . . XI = 612.449
YI = 1.536
ZI = 0.000
θI = 8.821
βz = −16.06[W]~−11.67[M]~−8.48[T]

TABLE 18

<<Embodiment 11>>

<Primary Image Plane OS (6 mm by 6 mm square)>

PO . . . XO = −85.171
YO = 0.000
ZO = 0.000
θO = 5.618

TABLE 18-continued

<<Embodiment 11>> ymax = 3, ymin = −3
zmax = 3, zmin = −3

<Gr1>

P1 ... X1 = −30.000
        Y1 = −2.704
        Z1 = 0.000
θ1 = 5.648

| Radius of Curvature | Axial Distance | Refractive Index |
|---|---|---|
| r1 = 29.122 | | |
| | d1 = 7.125 | N1 = 1.70000 |
| r2 = 259.634 | | |
| | d2 = 6.000 | |
| r3 = −34.045 | | |
| | d3 = 2.085 | N2 = 1.57800 |
| r4 = 30.563 | | |
| | d4 = 3.000 | |
| r5 = 87.859 | | |
| | d5 = 4.973 | N3 = 1.70800 |
| r6 = −35.272 | | |

<Gr2>

P2 ... X2 = −5.000
        Y2 = −1.139
        Z2 = 0.000
θ2 = 6.217
D2 = 5.000[W]~5.924[M]~0.572[T]

| Radius of Curvature | Axial Distance | Refractive Index |
|---|---|---|
| r7 = 43.616 | | |
| | d7 = 1.400 | N4 = 1.67003 |
| r8 = 16.000 | | |
| | d8 = 6.100 | |
| r9 = −89.833 | | |
| | d9 = 1.200 | N5 = 1.74400 |
| r10 = 90.321 | | |
| | d10 = 1.100 | |
| r11 = 29.006 | | |
| | d11 = 3.200 | N6 = 1.70055 |
| r12 = 125.790 | | |
| | d12 = 2.000[W]~11.294[M]~24.104[T] | |
| r13 = ∞ (Aperture Diaphragm S, Aperture Radius = 4) | | |
| | d13 = 1.000 | |
| r14 = 32.893 | | |
| | d14 = 2.400 | N7 = 1.69100 |
| r15 = −68.245 | | |
| | d15 = 0.150 | |
| r16 = 16.011 | | |
| | d16 = 3.500 | N8 = 1.62280 |
| r17 = 34.207 | | |
| | d17 = 2.300 | |
| r18 = −108.225 | | |
| | d18 = 4.000 | N9 = 1.80518 |
| r19 = 15.185 | | |
| | d19 = 2.100 | |
| r20 = 161.817 | | |
| | d20 = 2.000 | N10 = 1.63980 |
| r21 = −25.266 | | |
| | d21 = 27.572[W]~17.353[M]~9.896[T] | |
| r22 = −50.100 | | |
| | d22 = 1.600 | N11 = 1.70055 |
| r23 = −15.475 | | |
| | d23 = 0.550 | |
| r24 = −28.090 | | |
| | d24 = 0.600 | N12 = 1.74400 |
| r25 = 48.182 | | |
| | d25 = 3.050 | |
| r26 = −10.229 | | |
| | d26 = 0.700 | N13 = 1.67003 |

TABLE 18-continued

<<Embodiment 11>> r27 = −22.325

<Gr3>

P3 ... X3 = 72.000
        Y3 = −9.595
        Z3 = 0.000
θ3 = 5.526

| Radius of Curvature | Axial Distance | Refractive Index |
|---|---|---|
| r28 = 58.991 | | |
| | d28 = 6.630 | N14 = 1.70800 |
| r29 = −60.294 | | |
| | d29 = 4.000 | |
| r30 = −18.319 | | |
| | d30 = 2.780 | N15 = 1.57800 |
| r31 = −79.557 | | |
| | d31 = 8.000 | |
| r32 = −38.309 | | |
| | d32 = 9.500 | N16 = 1.70000 |
| r33 = −41.221 | | |

<Secondary Image Plane IS>

PI ... XI = 471.844
        YI = −0.402
        ZI = 0.000
θI = 6.000
βz = −15.65[W]~−11.40[M]~−8.28[T]

TABLE 19

<<Distortion Factors Observed in Embodiment 10>>

| Object Height | [W] | | [M] | | [T] | |
|---|---|---|---|---|---|---|
| [mm] | dy'/R | dz'/R | dy'/R | dz'/R | dy'/R | dz'/R |
| (7, 0) | 0.0041 | 0.0000 | 0.0019 | 0.0000 | 0.0003 | 0.0000 |
| (−7, 0) | 0.0212 | 0.0000 | 0.0040 | 0.0000 | −0.0082 | 0.0000 |
| (7, 7) | −0.0011 | −0.0090 | −0.0004 | −0.0071 | 0.0003 | −0.0055 |
| (0, 7) | 0.0051 | −0.0108 | 0.0031 | −0.0057 | 0.0017 | −0.0018 |
| (−7, 7) | 0.0248 | −0.0196 | 0.0069 | −0.0065 | −0.0051 | 0.0026 |

TABLE 20

<<Distortion Factors Observed in Embodiment 11>>

| Object Height | [W] | | [M] | | [T] | |
|---|---|---|---|---|---|---|
| [mm] | dy'/R | dz'/R | dy'/R | dz'/R | dy'/R | dz'/R |
| (3, 0) | −0.0010 | 0.0000 | −0.0005 | 0.0000 | −0.0003 | 0.0000 |
| (−3, 0) | 0.0090 | 0.0000 | 0.0039 | 0.0000 | 0.0004 | 0.0000 |
| (3, 3) | −0.0007 | 0.0006 | −0.0006 | 0.0003 | −0.0006 | 0.0002 |
| (0, 3) | 0.0010 | −0.0010 | 0.0001 | −0.0005 | −0.0004 | −0.0001 |
| (−3, 3) | 0.0081 | −0.0037 | 0.0033 | −0.0018 | 0.0002 | −0.0005 |

What is claimed is:

1. A projecting optical system for projecting an image formed on a primary image plane obliquely onto a secondary image plane while reducing or enlarging the image, comprising:

an aperture diaphragm; and two or more optical systems decentered from each other, wherein the following condition is satisfied:

$$-0.3 < \frac{Sr}{Se} < \frac{1}{|\beta r|}$$

where

Sr represents a sum of optical powers of each lens element in said optical systems disposed on an enlarged image plane side of the aperture diaphragm, Se represents a sum of optical powers of each lens element in said optical systems disposed on a reduced image plane side of the aperture diaphragm, and βr represents a magnification of a reduced image plane side part of the projecting optical system.

2. A projecting optical system in accordance with claim 1, wherein the following conditions are additionally satisfied:

$$\theta_r < \theta_e$$
$$\theta_r < \theta_s$$

where $\theta_e$ represents an average value of an angle between a normal to the enlarged image plane and an axis of symmetry of the optical systems disposed on the enlarged image plane side of the aperture diaphragm and forming a centered optical system, $\theta_r$ represents an average value of an angle between the normal to the enlarged image plane and an axis of symmetry of the optical systems disposed on the reduced image plane side of the aperture diaphragm and forming a centered optical system, and $\theta_s$ represents an angle between the enlarged image plane and the reduced image plane.

3. A projecting optical system in accordance with claim 1, wherein the projecting optical system has a reduced image side pupil at a position opposite to the aperture diaphragm across the reduced image plane.

4. A projecting optical system for projecting an image formed on a primary image plane onto a secondary image plane, comprising:

an aperture diaphragm; and optical systems including a partial optical system capable of being decentered rotationally, said partial optical system being capable of being decentered rotationally by a pivoting movement of said partial optical system so that an optical axis thereof is inclined with respect to an optical axis of a remaining portion of said optical systems;

wherein, for a rotational decentering of the partial optical system in conjunction with a rotation of at least one of the primary and secondary image planes, an image distortion on the secondary image plane is substantially unchanged.

5. A projecting optical system in accordance with claim 4, wherein the partial optical system is capable of being rotated about a center located approximately at a position of an aperture diaphragm image formed by the partial optical system.

6. A projecting optical system in accordance with claim 4, wherein the partial optical system is capable of being rotated about a center located approximately at a position of the aperture diaphragm.

7. A projecting optical system in accordance with claim 4, wherein the partial optical system substantially satisfies an f-θ characteristic.

8. A projecting optical system in accordance with claim 4, wherein a first portion of said optical systems are disposed on a primary image plane side of the aperture diaphragm and substantially satisfy an f-θ characteristic, and a second portion of said optical systems are disposed on a secondary image plane side of the aperture diaphragm and substantially satisfy an f-θ characteristic.

9. A projecting optical system in accordance with claim 4, wherein the partial optical system is substantially an afocal optical system.

10. A projecting optical system in accordance with claim 4, wherein the image distortion on the second image plane is substantially unchanged for a translational movement of the primary image plane.

11. A projecting optical system for projecting an image formed on a primary image plane obliquely onto a secondary image plane, comprising:

two or more partial optical systems decentered from each other; and a focusing optical system included and movably disposed in one of the partial optical systems, the focusing optical system being adapted to move to achieve focusing with the secondary image plane being kept inclined at a fixed angle to the primary image plane, said focusing optical system comprising a quantity of optical elements which is less than a quantity of optical elements in said one of the partial optical systems.

12. A projecting optical system in accordance with claim 11, wherein the focusing optical system is substantially an afocal optical system, said afocal optical system having substantially zero optical power.

13. A projecting optical system in accordance with claim 11, wherein the focusing optical system is disposed at the secondary image plane side end of the projecting optical system.

14. A projecting optical system in accordance with claim 11, wherein the partial optical systems including the focusing optical system form a centered optical system whose optical axis is substantially perpendicular to the secondary image plane.

15. A projecting optical system in accordance with claim 11, wherein said focusing optical system is adapted to move along an axis of said one of the partial optical systems to achieve focusing.

16. A projecting optical system for projecting an image formed on a primary image plane obliquely onto a secondary image plane, comprising:

two or more partial optical systems decentered from each other; and two or more zoom optical systems each included and movably disposed in different ones of the partial optical systems, the zoom optical systems being adapted to move to continuously vary an image magnification with the secondary image plane being kept in a fixed position.

17. A projecting optical system in accordance with claim 16, wherein the zoom optical systems form a centered optical system and are adapted for movement along an optical axis of the centered optical system.

18. A projecting optical system in accordance with claim 16, wherein an intermediate image formed by a light beam exiting from the zoom optical systems is maintained in a substantially fixed position.

19. A projecting optical system in accordance with claim 16, wherein the zoom optical systems are substantially afocal optical systems.

* * * * *

UNITED STATES PATENT AND TRADEMARK OFFICE
CERTIFICATE OF CORRECTION

PATENT NO. : 6,123,425
DATED : September 26, 2000
INVENTOR(S) : Soh Ohzawa

Page 1 of 1

It is certified that error appears in the above-identified patent and that said Letters Patent is hereby corrected as shown below:

Front page [75] Inventor,
Delete "Toyonaka,", and insert --Toyonaka-Shi, Osaka,--.

Column 4,
Line 54, delete "lose", and insert --close--.
Line 61, after "when", insert --it--.
Line 61, after "is", insert --focused--.

Column 44,
Line 2, delete "are", and insert --is--.
Line 4, delete "satisfy", and insert --satisfies--.
Line 5, delete "are", and insert --is--.
Line 7, delete "satisfy", and insert --satisfies--.

Signed and Sealed this

Third Day of July, 2001

*Attest:*

Nicholas P. Godici

NICHOLAS P. GODICI
*Attesting Officer*    *Acting Director of the United States Patent and Trademark Office*